(12) United States Patent
Bremers

(10) Patent No.: US 6,901,380 B1
(45) Date of Patent: May 31, 2005

(54) MERCHANDISING SYSTEM METHOD, AND PROGRAM PRODUCT UTILIZING AN INTERMITTENT NETWORK CONNECTION

(75) Inventor: Robert C. Bremers, Louisville, CO (US)

(73) Assignee: Dataforce, Inc., Louisville, CO (US)

( * ) Notice: Subject to any disclaimer, the term of this patent is extended or adjusted under 35 U.S.C. 154(b) by 599 days.

(21) Appl. No.: 09/658,286

(22) Filed: Sep. 8, 2000

Related U.S. Application Data

(60) Provisional application No. 60/189,755, filed on Mar. 16, 2000, and provisional application No. 60/153,410, filed on Sep. 10, 1999.

(51) Int. Cl.$^7$ ............................................. G06F 17/60
(52) U.S. Cl. ...................................... 705/27; 707/100
(58) Field of Search ................. 705/27, 26; 707/120, 707/100

(56) References Cited

U.S. PATENT DOCUMENTS

| | | | |
|---|---|---|---|
| 4,194,242 A | | 3/1980 | Robbins |
| 5,319,542 A | * | 6/1994 | King et al. .................... 705/27 |
| 5,592,375 A | | 1/1997 | Salmon et al. |
| 5,694,551 A | * | 12/1997 | Doyle et al. ................... 705/26 |
| 5,710,887 A | | 1/1998 | Chelliah et al. |
| 5,758,328 A | | 5/1998 | Giovannoli |
| 5,758,337 A | * | 5/1998 | Hammond ...................... 707/6 |
| 5,842,178 A | | 11/1998 | Giovannoli |
| 5,848,421 A | * | 12/1998 | Brichta et al. ............... 707/200 |

(Continued)

FOREIGN PATENT DOCUMENTS

| | | | | |
|---|---|---|---|---|
| EP | 0 697 669 A2 | * | 2/1996 | ........... G06F/17/60 |
| WO | WO 94/28497 | * | 12/1994 | ........... G06F/15/22 |
| WO | WO 97/22943 | * | 6/1997 | ......... G06F/163/00 |

OTHER PUBLICATIONS

"Tools for creating a web storefron" (Rudich, Joe. Sep./Oct. 1999. Link–up).*

"Booting Up your business" (Pachetti, Nick. Apr. 19, 1999. Time).*

"So you want to sell online? Some pitfalls to avoid" (Pluvinage, Vincent. Jul. 1999. HP Chronicle).*

(Continued)

*Primary Examiner*—Jeffrey A. Smith
*Assistant Examiner*—Sabrina Chang
(74) *Attorney, Agent, or Firm*—Hensley Kim & Edgington, LLC

(57) ABSTRACT

A business application integrates a company's internal business systems with an e-commerce web site, so that company personnel can manage their business with a business application that seamlessly exports relevant, up-to-date data to a web site designed to interact with customers across the Web. The business application provides business functions for manipulating merchandising data stored in a merchandising database. In addition, to accommodate an intermittent connection to the Internet or otherwise to the web hosting server, the business application supports the generation of a replica, from the merchandising database, that can be exported to a web hosting server. A web application executing at the web hosting server generates web pages based on merchandising data stored in the partial replica. The customer can provide feedback, possibly representing purchase orders or customer information changes, for example, that can be automatically entered into the company's business system. Alternatively, the customer can download a client replica, generated from the partial replica at the web hosting server, for use during periods of disconnection from the web hosting server. Thereafter, the client replica and the partial replica can be synchronized to update each other with modified data. Furthermore, the partial replica and the merchandising database can also be synchronized.

31 Claims, 27 Drawing Sheets

U.S. PATENT DOCUMENTS

| | | | |
|---|---|---|---|
| 5,884,309 A | | 3/1999 | Vanechanos, Jr. |
| 5,884,325 A | * | 3/1999 | Bauer et al. ................ 707/201 |
| 5,895,454 A | | 4/1999 | Harrington |
| 5,897,622 A | | 4/1999 | Blinn et al. |
| 5,960,411 A | * | 9/1999 | Hartman et al. .............. 705/26 |
| 6,055,513 A | | 4/2000 | Katz et al. |
| 6,055,516 A | * | 4/2000 | Johnson et al. ............... 705/27 |
| 6,058,373 A | | 5/2000 | Blinn et al. |
| 6,076,091 A | | 6/2000 | Fohn et al. |
| 6,081,789 A | | 6/2000 | Purcell |
| 6,219,680 B1 | * | 4/2001 | Bernardo et al. ........ 715/501.1 |
| 6,411,960 B1 | * | 6/2002 | Fisher ....................... 707/102 |

OTHER PUBLICATIONS

"www.yourcompany.com" (Zarowin, Stanley. May 1999. Journal of Accountancy).*
Web pages "store.yahoo.com"—excised from web.archive. org. Dated Mar. 2, 1999 [A], Feb. 8, 1999 [B], Feb. 21, 1999 [C].*
"The online Selling Game" (Abel, Aimee. Sep. 1999. Home Office Computing).*
"Take a Load Off" (Ray, Garrett N. Sep. 2, 1996. Computerworld).*
"Get Ready for Cyber–selling" (Johnson, Gail. Aug. 1999. Electrical Wholesaling).*
"Tools for creating a web storefront" (Rudich, Joe. Sep./Oct. 1999. Link–up).*
"Booting Up your Business" (Pachetti, Nick. Apr. 19, 1999. Time).*
"So You Want to Sell Online? Some Pitfalls to Avoid" (Pluvinage, Vincent. Jul. 19999. HP Chronicle).*
"www.yourcompany.com" (Zarowin, Stanley. May 1999. Journal of Accounting).*
"Data Watch: E–commerce: The Emerging Force" (Dataquest. Feb. 15, 1999).*
"Using the Web to Make a Sale" (Karve, Anita. Network Magazine).*

Articles from ZDNet PC Magazine, as follows.
"HyperMart", Neil Randall, http://www.zdnet.com/pcmag/stories/review/0,6755,2629075,00.html. 2 pages.
"WebSphere Commerce Suite 4.1 Start Edition (with WebSphere Commerce Studio)", Richard V. Dragan, http://www.zdnet.com/pcmag/stories/reviews/0,6755,2629083,00.html, 3 pages.
"Microsoft Commerce Server 2000", Richard V. Dragan, http://www.zdnet.com/pcmag/stories/review/0,6755,2629082,88.html, 3 pages.
"Web Store", Nelson King, http://www.zdnet.com/pcmag/stories/review/0,6755,2629076,00.html, 2 pages.
"eCongo powered commerce", Heath H. Herel, http://www.zdnet.com/pcmag/stories/review/0,6755,2629071,00.html, 2 pages.
"eStoreManager", Nelson King, http://www.zdnet.com/pcmag/stories/reviews/0,6755,2629072,00.html, 2 pages.
"Analysis: Midrange Solutions", Richard V. Dragan, http://www.zdnet.com/pcmag/stories/reviews/0,6755,2633559,00.html, 2 pages.
"Analysis: Entry–level Solutions", Matthew P. Graven, http://www.zdnet.com/pcmag/stories/reviews/0,6755,2630094,00.html, 3 pages.
"Summary of Features: Entry–level", http://www.zdnet.com/pcmag/stories/reviews/0,6755,2630088,00.html, 2 pages.
http://www.highpoint.com/, HighPoint Systems: "About HighPoint"; "Appliance Software"; "Catalog Manager"; "Press Releases & Articles"; "Smart Appliance Server"; "Software Products"; "Web Store", consisting of 21 pages, Sep. 14, 2000.
*Inside The E–Business*, Integrating Systems, "Real ecommerce means extending connections", by Nuala Moran.
*Harvard Business Review*, May–Jun. 2000, "E–Hubs: The New B2B Marketplaces", by Kaplan and Sawhney, pp. 98–109+cover.

* cited by examiner

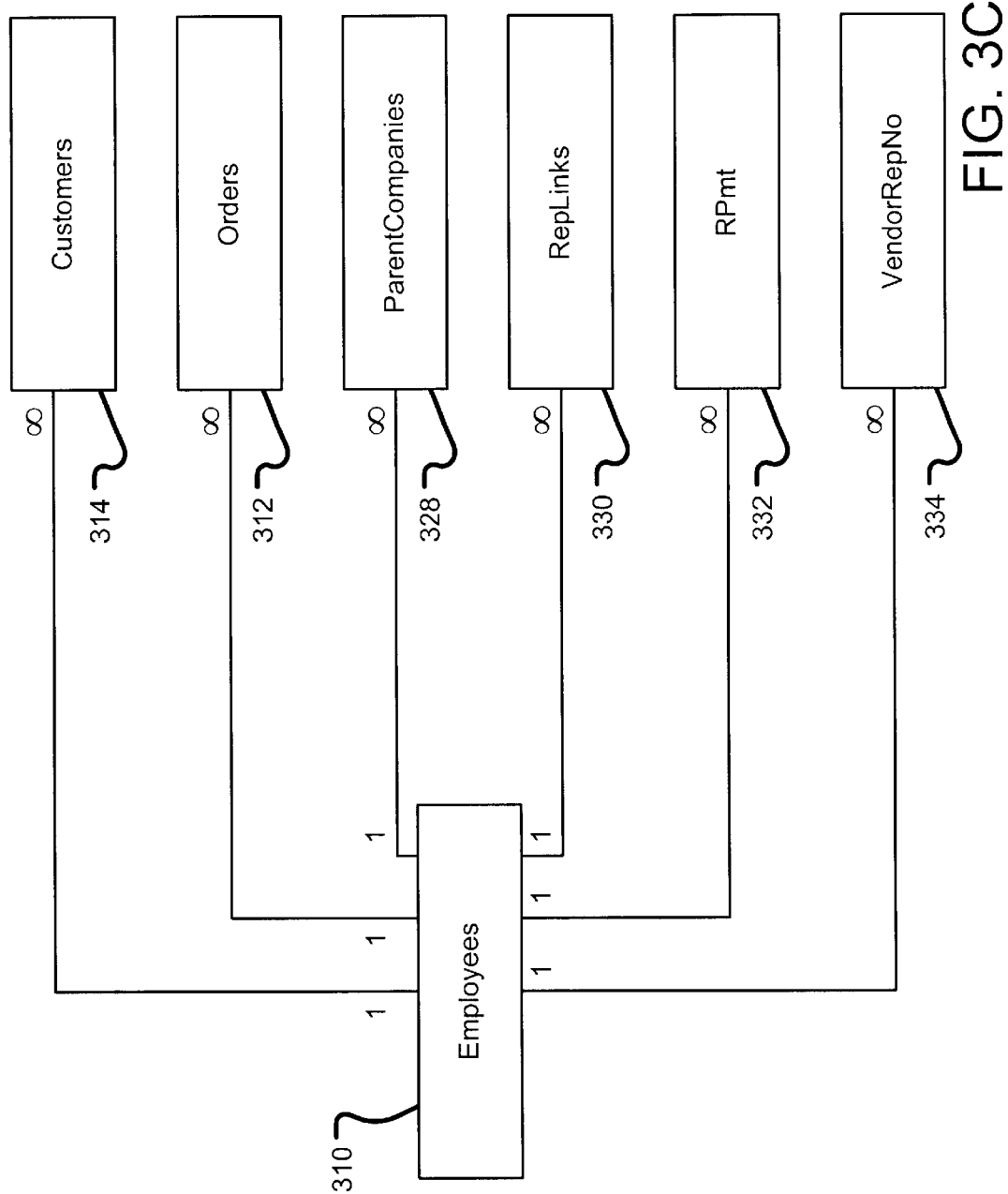

1900

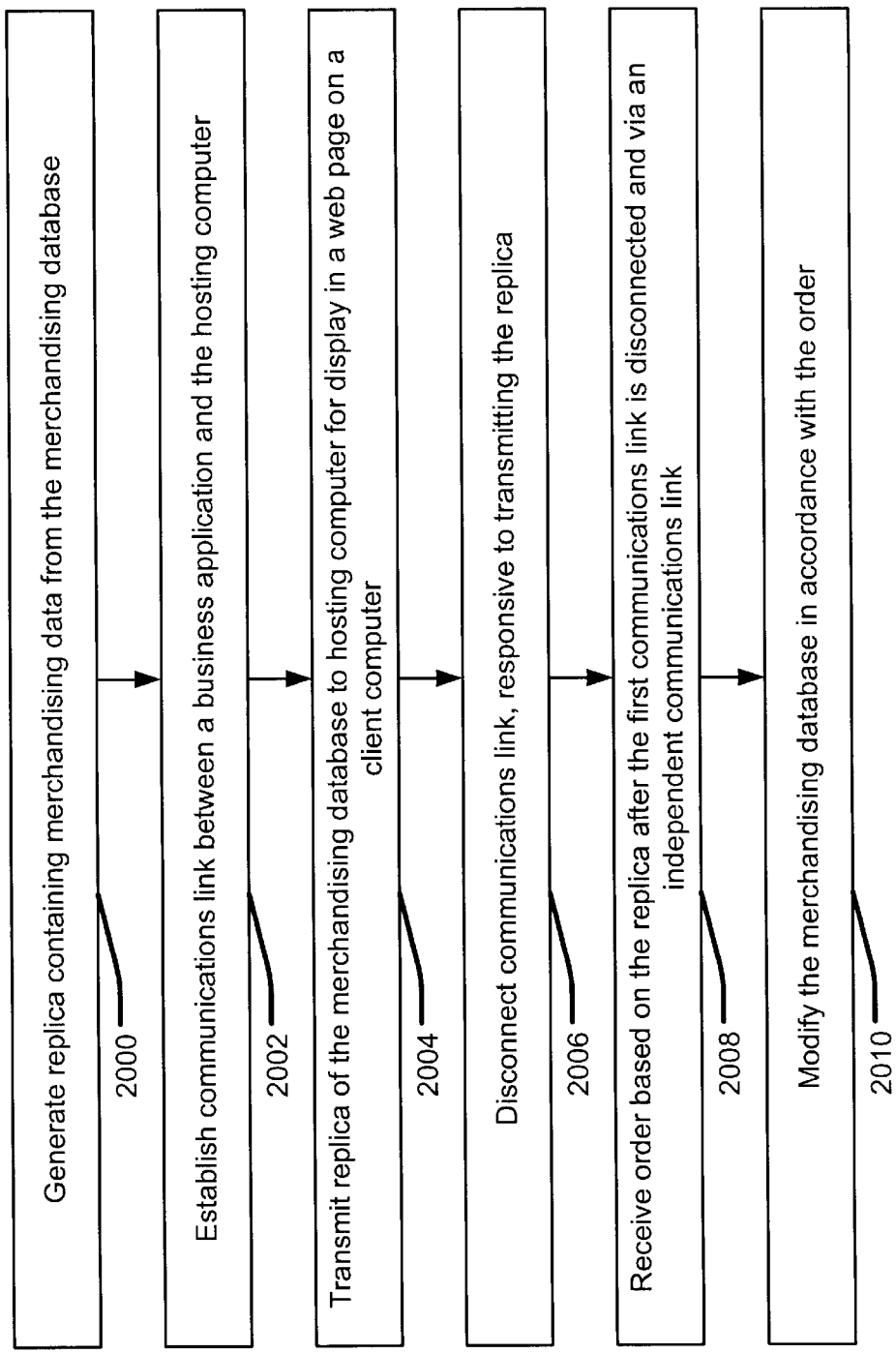

MERCHANDISING SYSTEM METHOD, AND PROGRAM PRODUCT UTILIZING AN INTERMITTENT NETWORK CONNECTION

CROSS-REFERENCE TO RELATED APPLICATIONS

The present application claims benefit of U.S. Provisional Patent Application No. 60/153,410 entitled "A MERCHANDISING SYSTEM TO ACCEPT AND RELAY PURCHASE ORDERS ONLINE WITH METHODS FOR MAINTAINING THE DATABASE UTILIZING AN INTERMITTENT CONNECTION" and filed Sep. 10, 1999, and U.S. Provisional Patent Application No. 60/189,755, entitled "MERCHANDISING SYSTEM UTILIZING A CLIENT REPLICA FOR ACCEPTING AND RELAYING ORDERS" and filed Mar. 16, 2000, both of which are incorporated herein by reference for all that they disclose and teach.

TECHNICAL FIELD

The invention relates generally to electronic commerce systems, and more particularly to a merchandising system utilizing an intermittent network connection.

BACKGROUND OF THE RELATED ART

Electronic commerce ("e-commerce") is relevant to many segments of the economy. For many years, companies have used Electronic Data Interchange (EDI) technology to communicate data, such as purchase orders, invoices, and electronic payments, via a communication network with other companies. Because EDI relies on contractually established procedures and interfaces, EDI primarily addresses a predetermined set of company-to-company transactions. Furthermore, setup and maintenance of EDI systems can be an expensive prospect, often precluding its use by smaller companies.

In the past, the communications connections between companies have included dial-up access and direct connections between the companies' networks. Furthermore, the technical sophistication that is required to support an EDI system is significant. With the advent of the Internet, more companies have easy access to the Web sites and extranets of other companies, promising to lower the costs of EDI for the foreseeable future. Nevertheless, cost and technical requirements remain significant obstacles preventing some companies from employing EDI.

Another more recently developing segment of e-commerce involves retailers and customers. In the retailing segment of e-commerce, a customer can go online to access a retailer's e-commerce web site to conduct business, such as researching and purchasing products and services, managing their financial assets, and obtaining technical support. The web site provides an interface to data, such as customer data, product data, and transaction data, and applications, such as a purchase application or a credit card processing application. It is said that most retailers must now have an Internet presence to be competitive players in their markets. However, the costs and technical complexity of developing and maintaining an e-commerce web site also prevent some retailers from doing business on the Web.

A third segment of e-commerce relates to wholesale transactions between vendors and retailers. For example, a grocery store may order a shipment of cheese from a cheese vendor, such as KRAFT or a small specialty cheese supplier/distributor. For some vendors, particularly smaller vendors, the grocer places such orders through a wholesale broker, who represents multiple vendors. Typically, such orders are placed via telephone calls or faxes between the grocer and the broker, who calls or faxes the vendor to place the order. While a large vendor may have the resources to maintain an e-commerce web site for such orders, smaller vendors and brokers tend to be left out of the e-commerce world because of cost and technical complexity issues.

Typically, an e-commerce website is hosted on a web server computer. Some companies internally maintain the web server and develop the software executing on the web server. Alternatively, many companies exist to provide such Web hosting services to a wide variety of businesses. Likewise, the development of web pages and application executed on the web server can also be contracted out to web development companies. However, to smaller companies, the costs and/or technical sophistication required to establish and maintain a web presence, even with the assistance of these Web hosting and development companies, may prevent their participation in the e-commerce revolution. Often, the economies of scale that would initially allow such a larger company to invest the resources into developing and maintaining an e-commerce solution are not available to a smaller company. Even approaches that allow a company to access and maintain its e-commerce web site (on another company's web hosting server) through a browser interface present financial obstacles (e.g., significant storage, connection, and bandwidth charges) and technical obstacles (e.g., the time and substantial technical understanding to make customizations through an interface that is not the same as the company's standard business application's interface). Accordingly, another approach for providing an easy, low-cost e-commerce solution is desirable.

SUMMARY OF THE INVENTION

The above and other problems are solved by a system that integrates a company's internal business systems with an e-commerce web site, so that company personnel can manage their business with a business system that seamlessly imports and/or exports relevant, up-to-date data to a web site designed to interact with customers across the Web. Furthermore, an embodiment of such a system may provide feedback, possibly representing purchase orders or customer information changes, for example, that can be automatically entered into the company's business system.

In one embodiment of the present invention, a user can maintain the web site data and display characteristics (e.g., web site fonts, layout, images, etc.), as well as process consumer and vendor transactions, without having to maintain the data and operation via an alternative user interface. For example, the business application can provide the exclusive interface to the merchandising data, web site display characteristics, and order processing. In such an embodiment, no intermediary or translation module is required to map data (more particularly, data in given tables, rows, and fields) into alternative data configuration for use on the web site. Instead, the databases associated with the business application and the replica used by a web application at the web site may be consistent (and still need not be identical) so as to facilitate rapid synchronization. For example, in one embodiment, only marked differences between the merchandising database and the replica are synchronized, thereby reducing the time and bandwidth required for synchronization, although the present invention is by no means limited to this particular embodiment.

In one embodiment of the present invention, a merchandising system for processing a customer order in association with a Web hosting computer, a client computer, and a business application computer is provided. The Web hosting computer and the business application computer are intermittently connected by a communications link. A merchandising database contains order data. A web host interface establishes the communications link with the web hosting computer. A replica generator executes on the business application computer to filter out at least the order data from the merchandising database, to create a replica, and to transmit the replica to the web hosting computer across the intermittent connection. A web application executes on the web hosting computer to generate an order guide that displays data from the replica on the client computer system.

In another embodiment of the present invention, a merchandising system for processing a customer order in association with a Web hosting computer, a client computer, and a business application computer is provided. The Web hosting computer and the business application computer are intermittently connected by a communications link. A merchandising database contains order data and display characteristic parameters. A business application accesses the merchandising database and generates a replica of at least a portion of the merchandising database. A web application receives the replica at the Web hosting computer and generates an order guide displaying data from the replica on the client computer system. The order guide includes display characteristics configured in accordance with display characteristic parameters recorded in the replica.

In another embodiment of the present invention, a method of processing orders using a merchandising database storing merchandising data is provided. The orders are generated responsive to at least one selection entered at a client computer coupled to a Web hosting computer. A replica is generated containing at least some of the merchandising data from the merchandising database. A communications link is established between a business application computer system executing a business application and the Web hosting computer. The replica of the merchandising database is transmitted to the Web hosting computer for display in a web page on a client computer. The communications link is disconnected between the business application computer system and the Web hosting computer, responsive to the operation of transmitting the replica. An order based on the replica and originating at the client computer is received after the disconnecting operation via an independent communications link. The merchandising database is modified in accordance with the order.

In other implementations of the present invention, articles of manufacture are provided as computer program products. One embodiment of a computer program product provides a computer program storage medium readable by a computer system and encoding a computer program for executing a computer process for processing orders using a merchandising database storing merchandising data. Another embodiment of a computer program product may be provided in computer data signal embodied in a carrier wave by a computing system and encoding the computer program for processing orders using a merchandising database storing merchandising data. The computer program product encodes a computer program for executing on a computer system a computer process for processing orders using a merchandising database storing merchandising data. The orders are generated responsive to at least one selection entered at a client computer coupled to a Web hosting computer. A replica is generated containing at least some of the merchandising data from the merchandising database. A communications link is established between a business application computer system executing a business application and the Web hosting computer. The replica of the merchandising database is transmitted to the Web hosting computer for display in a web page on a client computer. The communications link is disconnected between the business application computer system and the Web hosting computer, responsive to the operation of transmitting the replica. An order based on the replica and originating at the client computer is received after the disconnecting operation via an independent communications link. The merchandising database is modified in accordance with the order.

These and various other features as well as other advantages, which characterize the present invention, will be apparent from a reading of the following detailed description and a review of the associated drawings.

BRIEF DESCRIPTION OF THE DRAWINGS

FIG. 3A-3K illustrate an exemplary database schema of a merchandising database in an embodiment of the present invention.

FIG. 20 depicts operations for processing orders using a merchandising database in an embodiment of the present invention.

DETAILED DESCRIPTION OF EMBODIMENTS OF THE INVENTION

Figure 1:
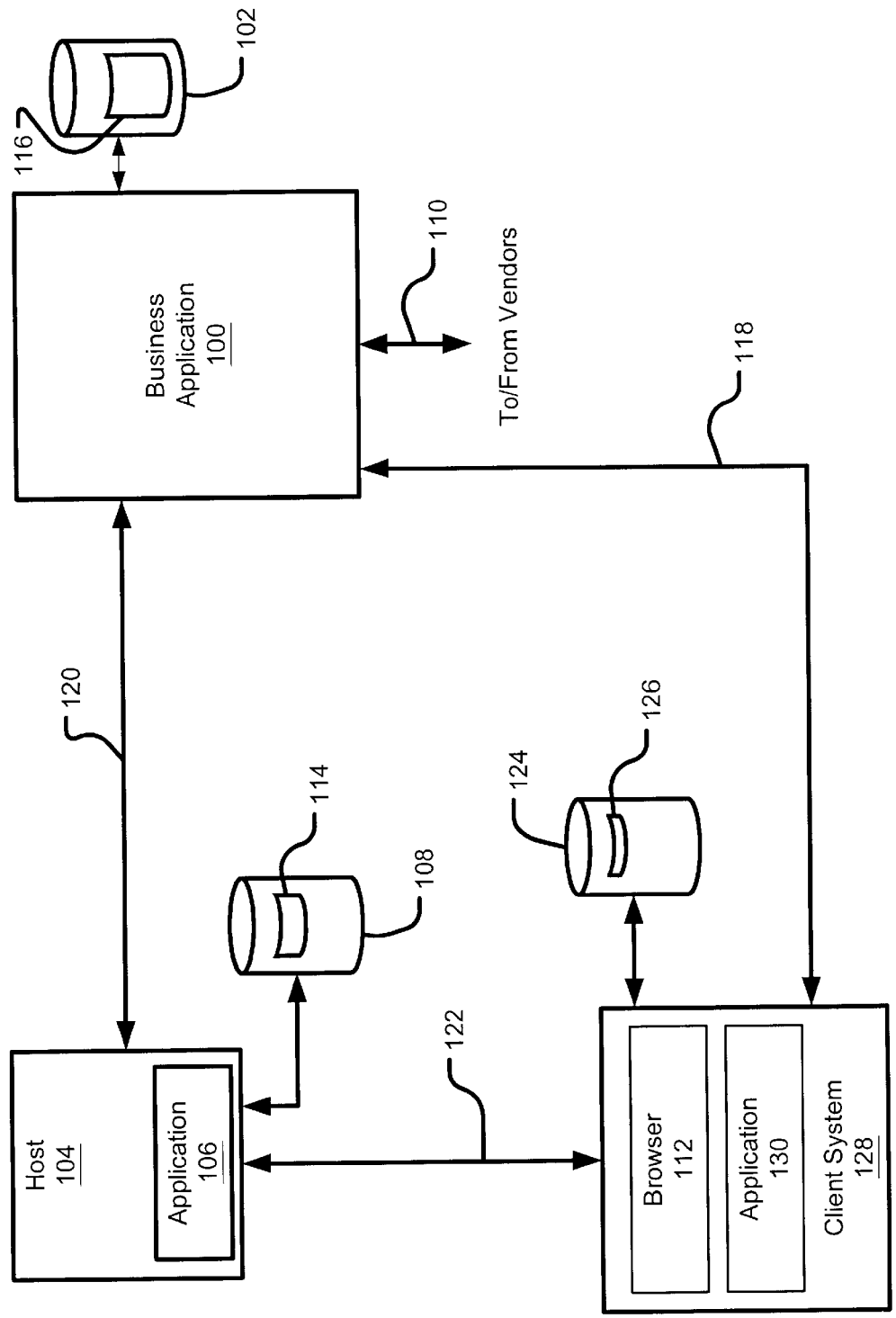
FIG. 1 illustrates a merchandising system in an embodiment of the present invention.

FIG. 1 illustrates a merchandising system in an embodiment of the present invention. An exemplary business application 100 assists a user in performing important business functions, such as taking orders, tracking commissions, managing a product catalog, and managing customer relationships. For example, a user may be an employee of a broker agency, having one or more independent sales representatives who represent vendors in wholesale transactions in a given geographic or demographic market. Although an independent sales representative (or "broker") is discussed in association with an exemplary embodiment of the present invention, other users are contemplated with the scope of the present invention, including without limitation manufacturers, distributors, and retailers. In addition, some specific users and consumers of embodiments of the present invention may include without limitation retailers providing web-based shopping list, recipe, or bridal registry support, rack jobbers, construction project managers, hardware stores helping home owners with organizing home repair or improvement projects, adventure outfitters organizing and outfitting an outing, and travel vendors or travel integrators providing a complete solution for travelers.

For clarification of the exemplary embodiment involving the broker agency, it should be understood that a broker agency typically employees for contracts with one or more independent sales representatives. Another term for a broker, provided by the U.S. Department of Labor, is a "manufacturer's agent", wherein a broker agency is a "manufacturer's agency". Each sales representative represents a set of manufacturers, distributors, or service providers to other entities in a supply chain. In a concrete example, a representative may represent a specialized tea vendor in wholesale transactions with a regional retailer (e.g., grocery store or tea shop). The retailer would contact the representative and place an order for a given tea. The representative would then contact the vendor to place the order and have the tea shipped to the retailer. Each of the parties to the transaction (i.e., the retailer, the representative, and the vendor) gain benefit from this relationship. For example, the retailer can contact a representative to order a variety of products from multiple vendors, rather than contacting each vendor individually. The vendors receive marketing and customer contact services through the brokerage in exchange for a commission provided to the brokerage and the representatives for each order.

Continuing with the example of a broker agency, the business application 100 provides the broker agency with an interface to the agency's business, such as data relating to vendors, customers, orders, products, prices, commissions, and individual agents/representatives employed by the agency. Such data may be stored in a merchandising database 116 of storage medium 102, which is coupled to the business application 100. The business application 100 also provides important business functionality, such as conditions tracking, order processing, reporting, and automated pricing. The business function capabilities of an exemplary business application are discussed in more detail relative to other Figures in this description.

The business application 100 may also include a communications link 110 for communicating with the computer systems of one or more vendors. The communications link 110 represents a logical or physical data link between two or more entities. In embodiments of the present invention, a communications link may include without limitation the Internet, the WAN, a LAN, a broadband network, a satellite or otherwise wireless communications link (e.g., such as wireless link supporting WAP, the Wireless Application Protocol), a dial-up connection, and other known communications links. Through the communications link 110, the business application 100 may receive relevant merchandising data from each vendor the agency represents. Exemplary merchandising data may include without limitation product and service catalogs, invoices, price lists, status of orders, payment terms, shipping terms, and communications from the vendor. The merchandising data communicated by communications link 110 may be stored by the business application 100 in the merchandising database 116 along with other business and merchandising data generated by or collected from other sources.

In addition, the business application 100 also allows the agency to export a relevant portion (i.e., a filtered replica 114) of its merchandising database 116 to a storage medium 108 of a Web hosting server 104 to support an e-commerce application 106, which executes on the server 104. The filtered or partial replica 110 is a subset of the merchandising database 116 and may also be considered another merchandising database in its own right. For example, in the illustrated embodiment, the replica is used to support a consumer's placement of orders. As such, historical order details are not required through an e-commerce application 106 and may be filtered out when the replica is generated. Replicas may contain a unique identifier to assist in determining the level of trust associated with the replica and its user. Such an identifier may be encrypted, signed, or authenticated by certificate. In addition, although a partial replica is associated with the illustrated embodiment in FIG. 1, it should be understood that some embodiments of the present invention may employ a full replica (i.e., including all data from the merchandising database 116) at the web hosting server 104, depending on the configuration of the merchandising database and the operational requirements of the e-commerce application or the structural requirements of a client replica 126.

The e-commerce application 106 provides the agency with the capability of marketing products for the agency-represented vendors to a larger market (i.e., potentially unrestricted by geographical limitations). In addition, the e-commerce application 106 presents the agency with the opportunity to market products and process orders more efficiently than via the traditional telephone and fax communication channels.

When the business application 100 exports the filtered replica 114 to the Web hosting server 104 via a communications link 120, the application 100 preferably connects with the server 104 via an intermittent connection (i.e., the connection is established during the transfer of data between the business application 100 and the Web hosting server 104, and thereafter terminated). Alternatively, the connection may remain in place while communications over the connection are intermittent. By maintaining intermittent connections or communications, the agency may save communication charges and preserve resources by updating the filtered replica 114 periodically, rather than continuously. For example, the filtered replica 114 can represent a "snapshot" of a relevant subset of the business and merchandising data exported from the merchandizing database 116.

It should be understood that a connection between a business application computer system and a Web hosting computer may be logical in nature and does not imply a physical connection. Indeed, wireless communications are also contemplated within the scope of the present invention. In contrast to a physical connection, a logical connection can be established between two computers on the basis of various communication protocols in which the sender and the receiver are identified in accordance with a predefined scheme. For example, TCP/IP ("Transmission Control Protocol/Internet Protocol") connections employ an addressing scheme in which a communications link is established between a sender and a receiver on the basis of unique address assigned to both. As such, the sender can transmit a message addressed to the receiver into the Internet. Within the Internet, routers direct the message to the appropriate receiver based on the message's destination address.

An alternative communications link can be established by email, in which addressing is based on an email address of a receiver. Although some email systems may be based on TCP/IP addressing at one level of the communications protocol stack (e.g., the email addresses of the sender and receiver may sometimes be resolved to individual TCP/IP addresses), email itself is based on a different type of addressing (e.g., "receiving@destination.com"). In fact, email origins and destinations, and indeed some forms of email itself, need not be based on TCP/IP addressing. As such, the TCP/IP connection between the Web hosting computer and the business application computer is deemed to be an independent communications link to that established by email. In addition, individual logical connections, separated by one or more intermittent disconnections, are deemed to be independent communications links. Alternative communications links may also be employed, including without limitation telephone communications, fax communications, dial-up connections, wireless communications including wireless Internet connections and satellite links, and postal mail.

In an embodiment of the present invention, a retailer or other purchasing entity (e.g., a "customer" or a customer's representative) may use a browser 112 on client system 128 to access via a communications link 122 a web page generated or otherwise provided by the e-commerce application 106. Through this web page interface, the customer may browse product information, place or modify orders, and communicate with the agency or vendors associated with the merchandising information (e.g., product numbers, descriptions, available quantities, lead times, back orders, inventory characteristics, etc.) of the partial replica 114 stored in the storage media 108.

In an alternative embodiment, another replica 126 may be exported from the replica 114 and stored on client storage medium 124. This embodiment allows a customer to take advantage of an intermediate connection with the host 104. The replica 126 may be full or partial, depending on the given application of the system. Once exported to the client system, the replica 126 can be accessed by a client-based application 130. Such an application 130 can allow the customer to read or modify the replica 126 or select items for ordering via communications link 118, which provides a logical connection between the client system 128 and the business application 100 that is independent of the logical connection between the host 104 and the business application 100. The partial replicas 126 and 114 also support bi-directional synchronization there between.

In one embodiment, the communications links 118, 120, and 122 may be Internet connection through an Internet Service Provider (ISP) or some other network access point. Alternatively, direct dial-up connections or any other direct or indirect connections to the host server 104, the browser 112, and the business application 100 are contemplated within the scope of the present invention. It should be understood, however, that although three separate communication links are shown in FIG. 1, all of the communication links may include Internet connections through one or more network access points or service providers. For example, in one configuration, the communications link 122 may be an Internet connection through the customer's ISP to the host server 104, while the communications link 118 may be the Internet connection to the customer's ISP coupled to an email communication through the ISP's mail server or some other mail service. This example, however, should not be read to limit such a mail service from being hosted on the server 104.

The partial replica 114 can also be bi-directionally synchronized with the merchandising database 116 with sufficient frequency, despite the intermediate connection, to maintain adequate consistency between the two sets of data. For example, if a user merely read accesses the merchandising database 116 or if a customer merely read accesses the partial replica 114, no synchronization is necessary. Likewise, if the customer places an order for one item based on an available quantity represented in the partial replica, the application 106 can flag that one item as tentatively purchased while the order is communicated to the business application 100 via communications link 118. If the order is consummated within the business application 100 and the merchandising database 116, a synchronization between the business merchandising database and the partial replica 114 can occur upon the next scheduled synchronization event, in response to an acknowledgement of the order from the vendor, or in response to another asynchronous event that triggers a synchronization (e.g., an inventory update received from a vendor). At the time of the synchronization, modifications in either or both of the merchandising database 116 and the partial replica 114 can be communicated via communications link 120 to maintain consistency between the two databases.

In an embodiment of the present invention, an order generally consists of two parts: (1) an order header, and (2) line item details. The order header may include without limitation shipment and payment information, such as parties to the order, a shipping address, a billing address, payment terms, order date, contact phone numbers, and a cancel date. In the line item details portion of an order, information such as an order identifier, an item or product number, the quantity, the price, and other order options (e.g., color or size) may be included for each product ordered. Other information may also be included within the order header and line item details within the scope of the present invention.

Figure 2:
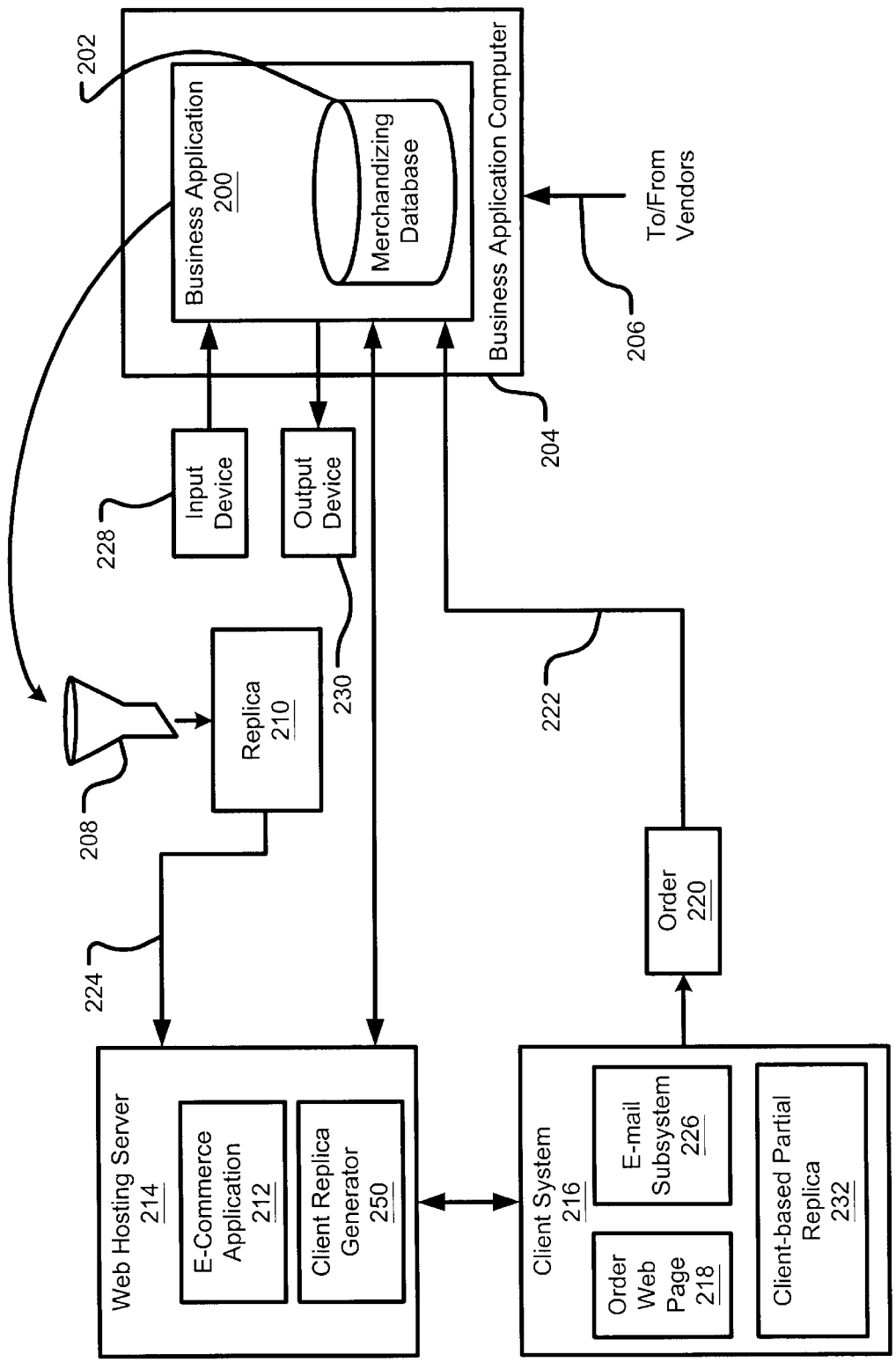
FIG. 2 illustrates more details of a merchandising system in an embodiment of the present invention.

FIG. 2 illustrates more details of a merchandising system in an embodiment of the present invention. The business application 200 is coupled to the merchandising database storing merchandising data at a business application computer 204. The merchandising database 202 is manipulated through the business application 200 in the course of the agency's business operations. An authorized representative or administrator who has an account in the business application 200 may interact with the business application 200 by way of an input device 228 (e.g., the keyboard, a balance, the touch screen, or a microphone) and an output device 230 (e.g., a monitor, a printer, or a speaker). The broker agency may continue to receive retailer's orders by phone and fax, entering the orders into the merchandising database 202 via the business application 200. Alternatively, orders may be received electronically, such as via e-mail, HTTP (hypertext transport protocol) communications, ftp (file transfer protocol), dial-up connections, and other electronic communication means via a communications link 222. In an embodiment of the present invention, electronically received orders may be entered into the merchandising database 202 automatically, and the orders may be transferred to the appropriate vendors automatically via a communications link 206 (e.g., a network connection, a phone line, a fax line, etc.).

In an embodiment of the present invention, incoming orders may be processed by the business application 200 to detect and potentially resolve variances before being authorized and communicated to a vendor. Variances can be detected based on expected value (e.g., variances may include an order having an amount greater than a given credit limit or a lapsed shipping date). A notice of a variance may be presented to a business user for resolution (e.g., authorizing a higher credit limit or modifying the shipping date).

A filtering process (i.e. used in a replication operation), represented by the funnel symbol 208, processes the merchandising data in the merchandising database 202 and generates a replica 210 of some or all of the merchandising data. The merchandising database 202 can include a wide variety of merchandising data, some of which is unnecessary to the operation of an e-commerce application 212. Accordingly, the replica 210 is preferably, although not necessarily, smaller than the original merchandising database 202. The filtering process, therefore, minimizes the bandwidth required to transmit the replica to the Web hosting server 214 and minimizes the storage space occupied by the replica at the Web hosting server 214. The replica 210 is then transferred via a communications link 224 for storage in a storage medium of the Web hosting server 214. Because use of communication channels and Web hosting servers are commonly charged on a communications bandwidth/time basis and a storage space basis, respectively, generation and transmission of (and synchronization with) the minimized replica 224 is a more cost-effective Web-resident representation of relevant merchandising data than the entire merchandising database 202.

The filtering processing may also be employed during synchronization so that only fields included in both the merchandising database 202 and the replica 224 are synchronized, and furthermore, fields that are not to be included in one or the other are removed from the appropriate database 116 or replica 114. For example, in one embodiment of the present invention, order details are omitted from the replica 114 during replication and synchronization. However, between synchronization, order details from new orders may be placed by consumers via the web site and thereafter recorded in the replica 114. Accordingly, during synchronization, the new order details in the replica 114 are added to the merchandising database 116 and deleted from the replica 114. In this manner, orders can be communicated via the synchronization operation through the replica without historical order details being perpetually maintained in the replica 114. Alternatively, orders may be communicated to the business application 200 via an independent communication link, such as email.

In an alternative embodiment of the present invention, a client replica generator 250 can be executed on the Web hosting server 214 upon request from a customer using the client system 216. The client replica generator 250 can generate a client replica (see client replica 126 in FIG. 1) that is recorded at the client system 216. Accordingly, once the client replica is recorded at the client system 216, the client system 216 can disconnect from the Web hosting server 214 and continue to have access to appropriate merchandising data recorded in the client replica. If changes are made to the data in the client replica, the customer can trigger a synchronization between the partial replica 210 at the Web hosting server 214 and the client replica at the client system 216. Thereafter, the partial replica 210 can also be synchronized with the merchandising database 202 for processing by the business application 200. This process accommodates intermittent connections between the business application 200 and the Web hosting server 214, as well as between the Web hosting server 214 and the client system 216.

In an embodiment of the present invention, a retailer or other purchasing entity may use a browser on a client system 216 to access one or more web pages 218 generated by the e-commerce application 212. Through this web page interface, the purchaser may browse product information, place or modify orders, and communicate with the agency or vendors associated with the product information of the replica 210, which is preferably stored in a storage medium coupled to or within the Web hosting server 214. A client-based replica 232 in the client system 216 may also be exported from and synchronized with the web-hosting server 214 to support intermittent connection there between.

Figure 13:
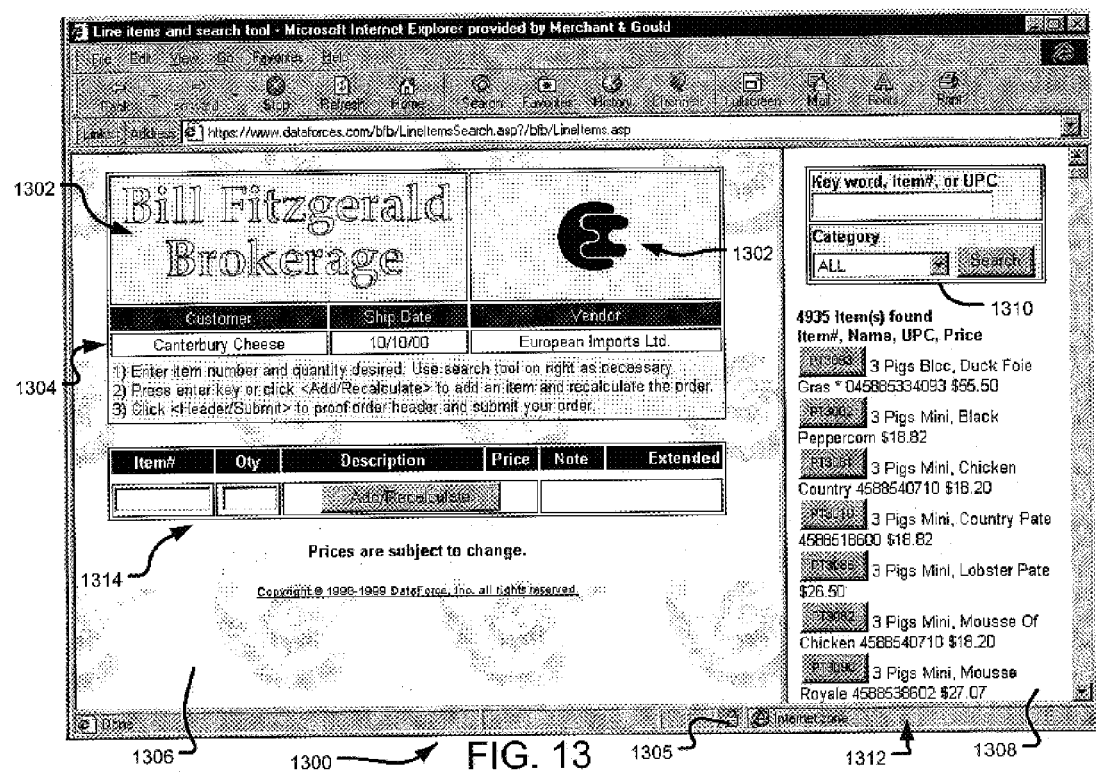
FIG. 13 depicts a screenshot of an "Order" web page in an embodiment of the present invention.
Figure 14:
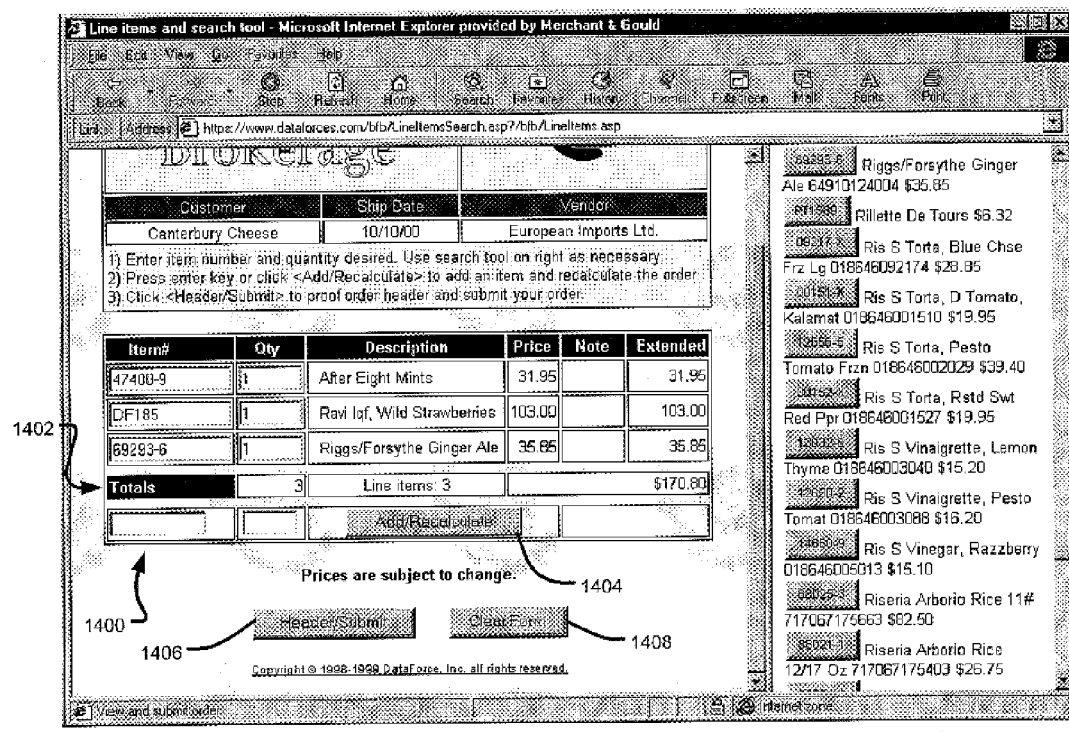
FIG. 14 depicts screenshot of an "Order" web page populated with selected products in an embodiment of the present invention.
Figure 15:
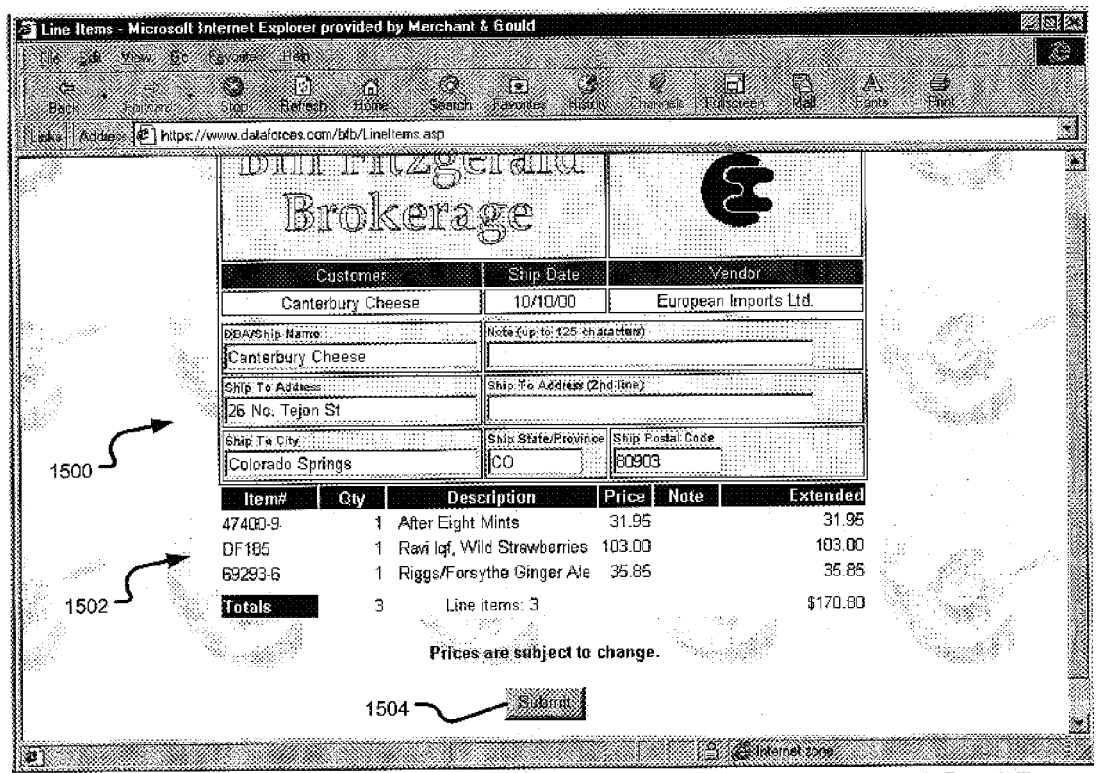
FIG. 15 depicts a screenshot of an "Order Review" web page in an embodiment of the present invention.

The e-commerce application 212 in the illustrated embodiment employs an Active Server Page (ASP) that is coupled to the replica data to dynamically generate the web page 218. Alternatively, other means of generating authoring language data (e.g., data in formats such as Hypertext Markup Language (HTML), Standard Generalized Markup Language (SGML), Jscript, Java, Extensible Markup Language and (XML)) and communicating with back end databases and applications (i.e., Common Gateway Interface (CGI)) are contemplated within the scope of the present invention. Screenshots of exemplary web pages are illustrated in FIGS. 13 through 15. The customer can access the merchandising data stored in the replica 210 on the Web hosting server 214 and submit an order 220 to the business application 200.

It should be understood at the communications link 222 by which the order 220 is transferred to the business application 200 may be independent of or different than the communications link 224. This distinction is particularly important when the communications link 224 is used to establish an intermittent connection between the business application 200 and the Web hosting server 214. A purchaser may access the merchandising data in the replica 210 on the Web hosting server 214 and place orders to the business application 200 even when the business application 200 is not connected to the Web hosting server 214. Alternatively, the communications link 222 may be the same as the communications link 224, particularly if the connection between the business application 200 and the Web hosting server 214 is active (i.e., not terminated).

In one embodiment of the present invention, the order 220 is communicated to the business application 200 through an e-mail subsystem 226. For example, the purchaser submits the order 220 through the web page 218, and an e-mail subsystem 226 causes the order 226 to be included in an e-mail message addressed to an authorized entity that has an account in the business application 200. It should be understood that the email subsystem 226 in an embodiment of the present invention can be coupled to an email server via a network connection to assist in the delivery of the order 220. It should also be understood that the web page 218 may be a displayed representation of authoring language data received from the Web hosting server (e.g., in a Hypertext Transport Protocol (HTTP) response).

Figure 7:
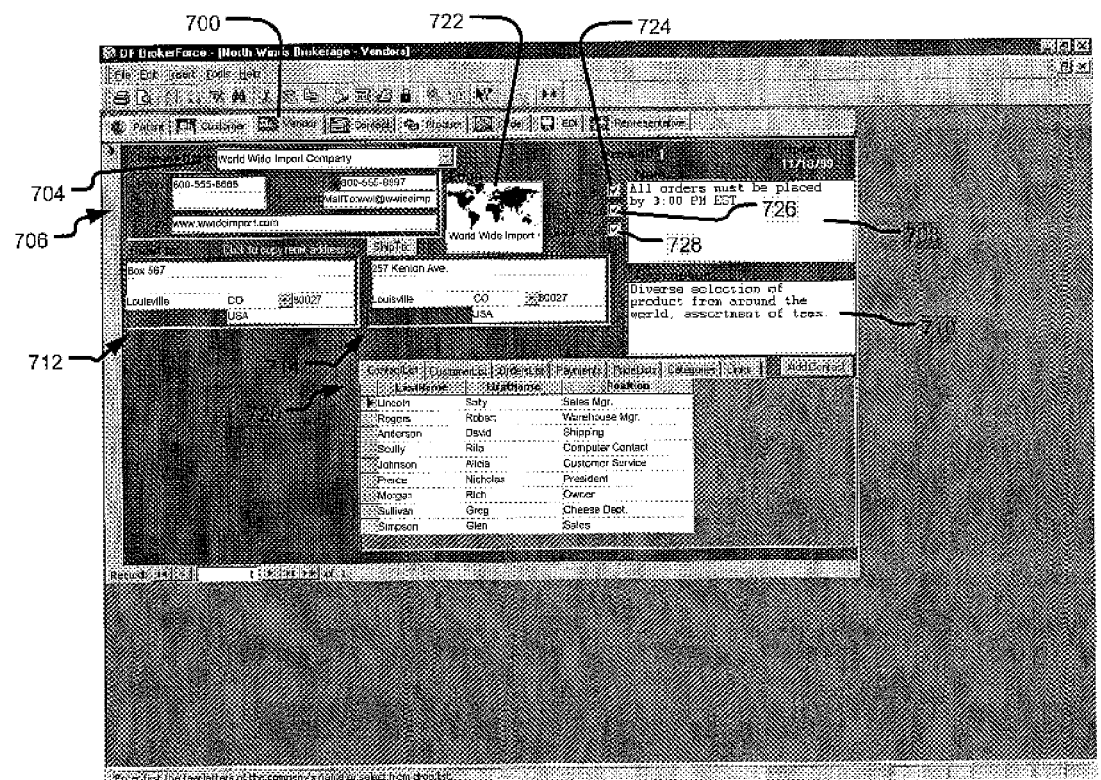
FIG. 7 depicts a business application screenshot of a "Vendor" window in an embodiment of the present invention.

In a vendor setup operation (e.g., the process of adding a new vendor to the merchandising database 202 for display the "Vendor" window shown in FIG. 7), an indication can also be specified to cause a copy of an order (e.g., an email order) to be sent directly to the vendor in the vendor's chosen format, essentially duplicating the order being sent to the business application 200. In an alternative embodiment, an indication can be specified that causes a copy of the order to be sent to the customer or the appropriate representative as the order is sent to the vendor.

FIG. 3A-3K illustrate an exemplary database schema of a merchandising database in an embodiment of the present invention. Each block represents a table in the relational merchandising database of an embodiment of the present invention. Alternative embodiments may include fewer tables, different tables, or additional tables in accordance with the data needs and functional needs of the merchandising system. In addition, aspects of the present invention may be implemented in other database forms, including a flat database.

Each block is marked in association with a "1" or a "∞". If two blocks are connected by a line having a "1" on one block and a "∞" on the other block, the connection represents a "one-to-many" relationship. Alternative, if the connection is marked with a "1" on each side, the connection represents a "one-to-one" relationship. In a relational database, unique identifiers associated with given table rows are used to relate data in one table to data in another. A "one-to-one" indicates that a Table A can have only one matching record in Table B, and each record in Table B can have only one matching recording in Table A. A "one-to-many" relationship indicates that a record in Table A can have many matching records in Table B, but a record in Table B can have only one matching record in Table A.

Figure 3A:
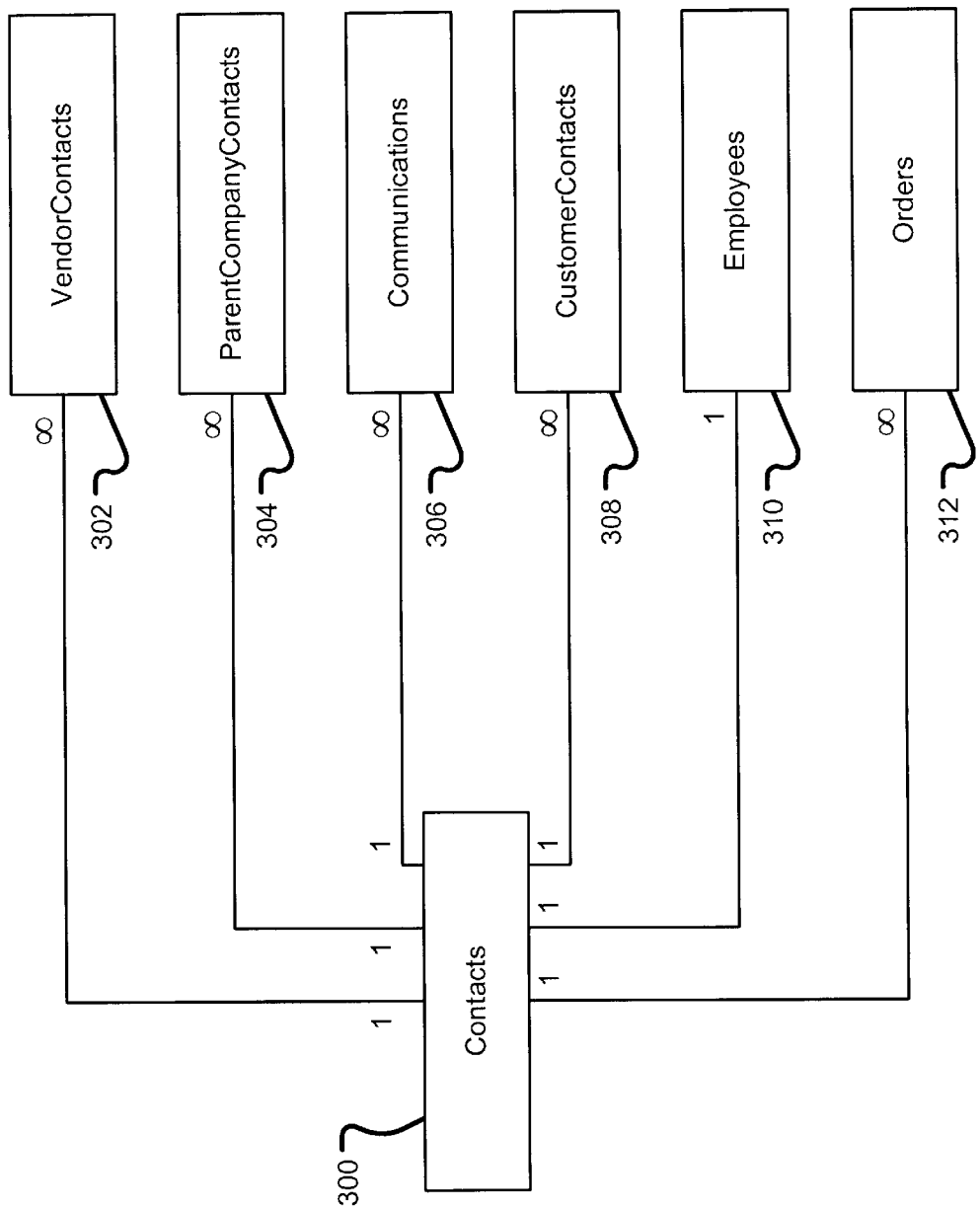

FIG. 3A depicts table relationships associated with a "Contacts" table in an embodiment of the present invention. A "Contacts" table 300 may contain information relating to various contacts, including without limitation some of the information displayed in FIG. 8. A "VendorContacts" table 302 includes references to the Contacts table 300 (e.g., unique identifiers of rows in the Contacts table 300) identifying those contacts in the Contacts table 300 that are related to vendors. A "ParentCompanyContacts" table 304 includes references to the Contacts table 300 identifying those contacts in the Contacts table 300 that are related to a given parent company. A "Communications" table 306 includes contains information relating to the Communications fields 818 of FIG. 8 and references data in the Contacts table 300. A "CustomerContacts" table 308 includes references to the Contacts table 300 and a "Customers" table (see Customers table 314 in FIG. 3B) identifying those contacts in the Contacts table 300 that are related to a referenced customer in Customers table 314 of FIG. 3B. An "Employees" table 310 includes references to the Contacts table 300 to identify those contacts in the Contacts table 300 that are related to a given employees of the business (e.g., the brokerage), such as manufacturer's agents. An "Orders" table 312 includes some of the information relating to the "Order" window of FIG. 10 and references the Contacts table 300 to identify those contacts in the Contacts table 300 that are related to a given order.

Figure 3B:
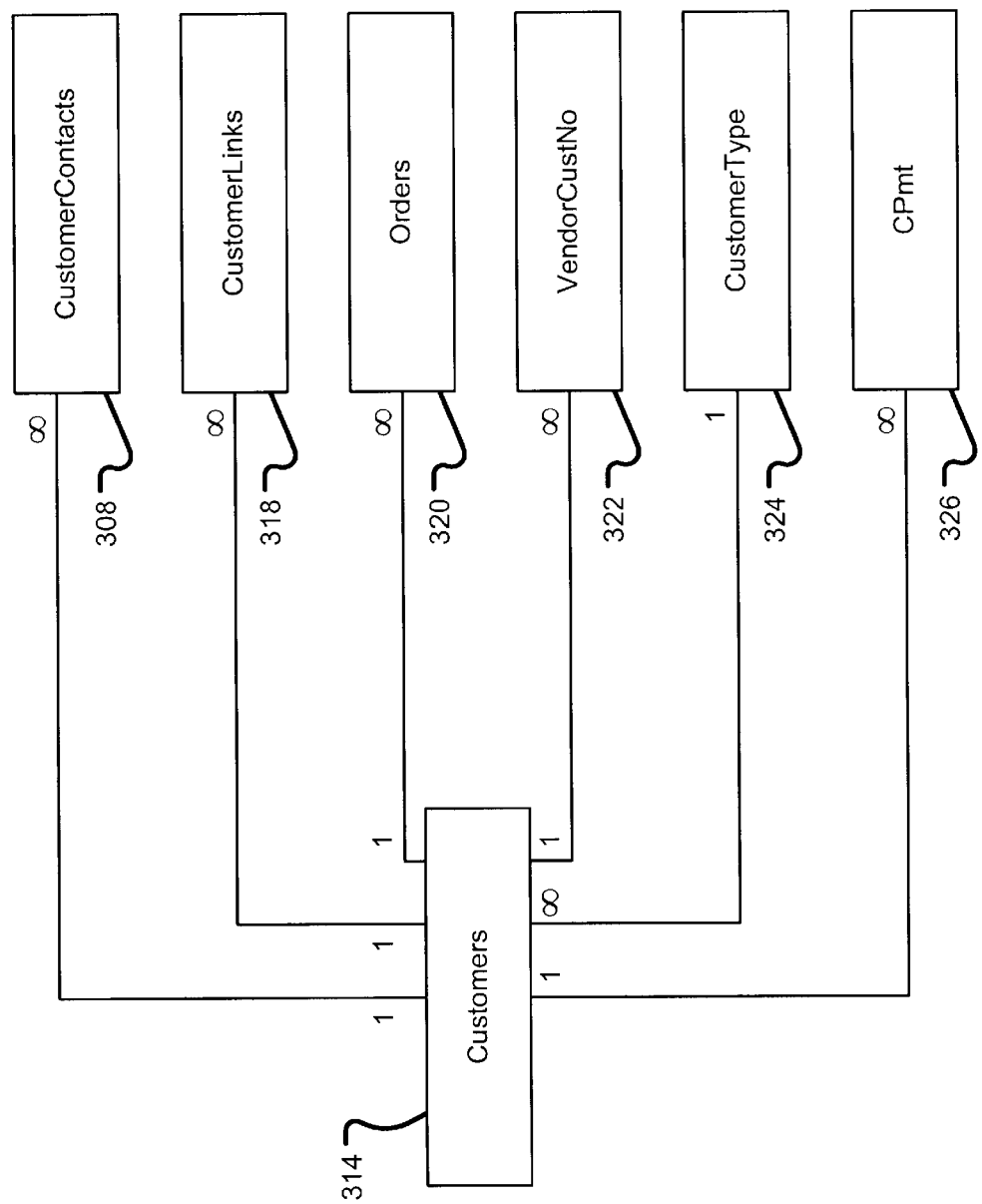

FIG. 3B depicts table relationships associated with a "Customers" table in an embodiment of the present invention. A "Customers" table 314 may contain information relating to various Customers, including without limitation some of the information displayed in FIG. 6. A "Customer-Contacts" table 308 (also shown in FIG. 3A) includes references to the Customers table 314 and the Contacts table 300 of FIG. 3A identifying those customers in the Customers table 314 that are related to contacts in the Contacts table 300 of FIG. 3A. A "CustomerLinks" table 316 includes information relating the URLinks, such as data displayed by the Links" tab 622. The Order table 312 (see also FIG. 3A) also references the data in the Customers table 314. A "VendorCustNo" table 322 includes contains information relating to the "Cust#" tab 624 of FIG. 6 and references data in the Customers table 314. A "CustomerType" table 324 includes data indicating the customer type (see Customer Type field in fields 610 of FIG. 6) and references to the Customers table 314. A "CPmt" table 326 includes data relating to customer payments on given orders.

FIG. 3C depicts table relationships associated with an "Employees" table in an embodiment of the present invention. An "Employees" table 310 may contain information relating to various Customers, including without limitation some of the data associated with FIG. 12. A "Customers" table 314 (also shown in FIG. 3B) includes references to the Employees table 310 as well as other tables and identifies those customers related to employees in the Employees table 310. For example, an employee may be a manufacturer's agent working for a brokerage. Accordingly, the employee may be associated with one or more of the brokerage's customers through on-site visits, orders, or other means. The "Orders" table 312 includes references to employee data in the Employees table 310. A "ParentCompanies" table 328 includes data relating to the parent companies accessible through the "Parent" window in FIG. 5, and references the Employees table 310, as represented by the "ParentList tab 1212 of FIG. 12. A "RepLinks" table 330 includes URLinks to web sites and data associated with a given employee and references the given employees in the Employees table 310. The "RPmt" table 332 includes data relating to commission payments to employees (e.g., representatives) and references the appropriate employee data in the Employee table 310. The "VendorRepNo" table 334 includes data identifying the employee using a vendor's identifier and references the appropriate employee in the Employee table 310.

Figure 3D:
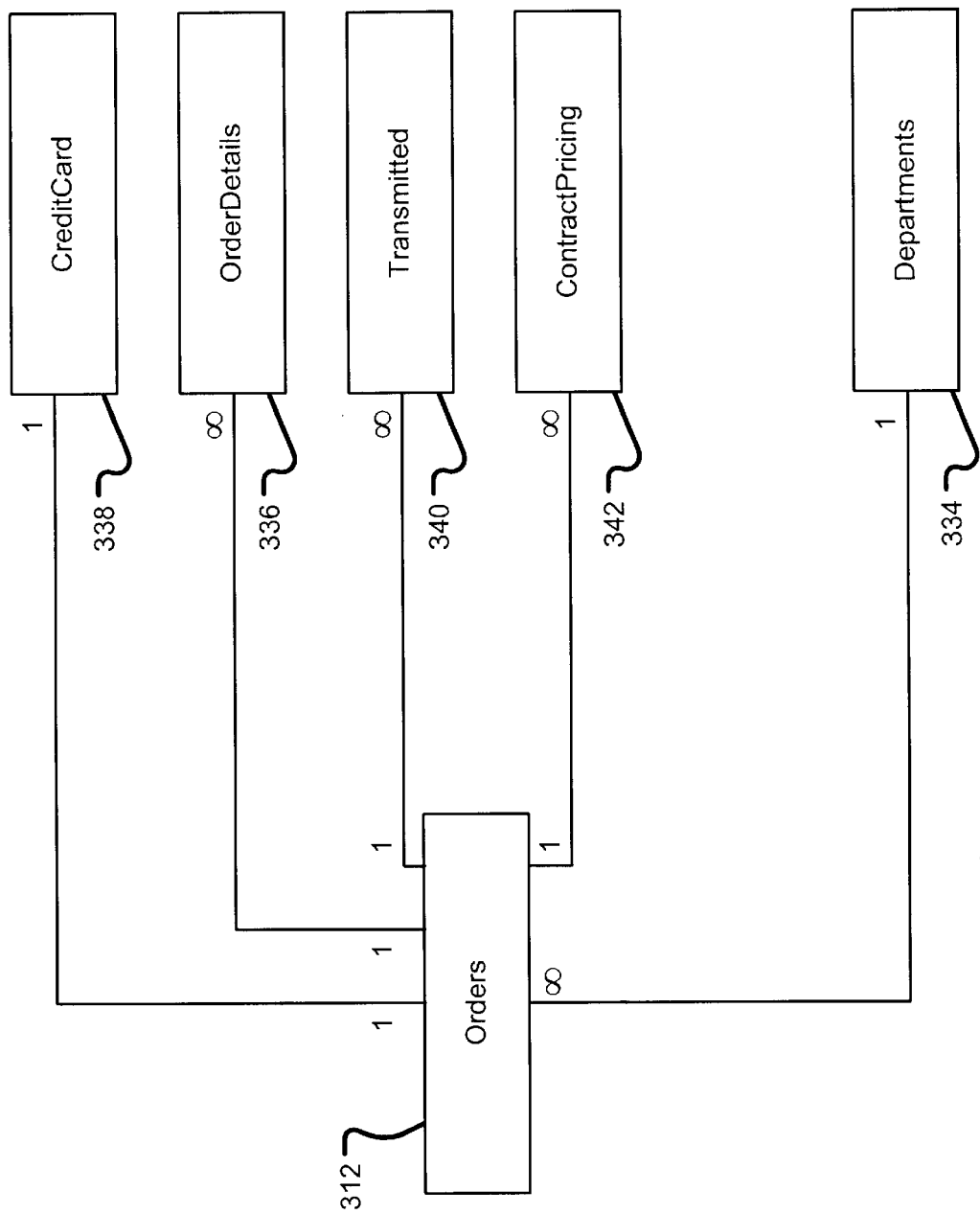

FIG. 3D depicts table relationships associated with an "Orders" table in an embodiment of the present invention. An "Orders" table 312 may contain information relating to various Orders, including without limitation some of the data associated with FIG. 10. In one embodiment, the Orders table 312 contains order header information. In addition, each line item detail of an order is recorded in the "Order-Details" table 336, which references the associated order header in the Order table 312. Combined, the Orders table 312 and the OrderDetails table 336 store "order data". A "CreditCard" table 338 includes data for processing an order payment using a credit card number and references the associated order in the Orders table 312. A "Transmitted" table 340 includes some of the data associated with the fields 1044 in FIG. 10 and references the associated orders in the Orders table 312. A "ContractPricing" table 342 includes information relating to discounts based on specific contracts among parent companies, vendors, customers, representatives, and the brokerage, and references associated orders in the Order table 312. A "Departments" table 344 includes data describing the customer's department from which the order originates or is destined, and is referenced from the Orders table 312.

Figure 3E:
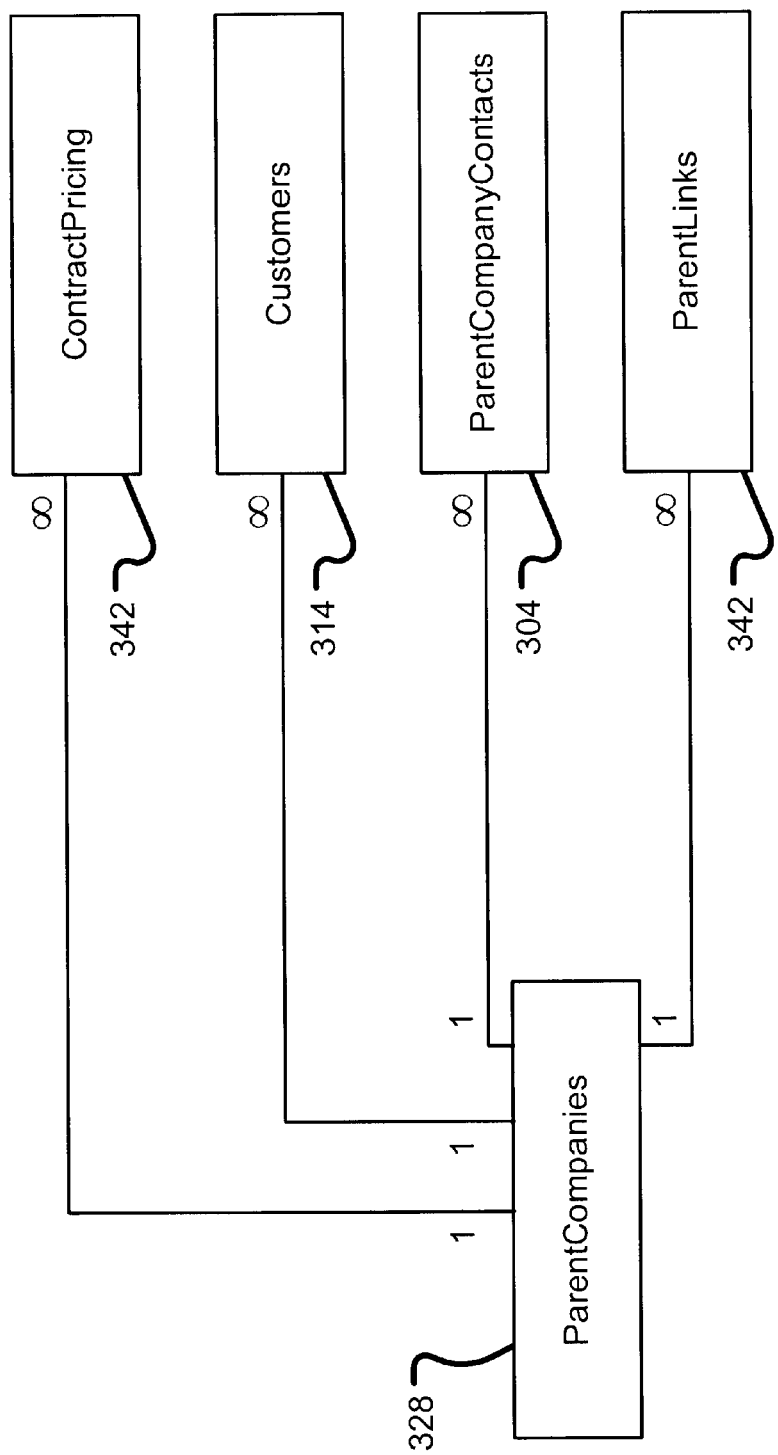

FIG. 3E depicts table relationships associated with a "ParentCompanies" table in an embodiment of the present invention. The "ParentCompanies" table 328 may contain information relating to various parent companies of customers and vendors, including without limitation some of the data associated with FIG. 5. The "ContractPricing" table 342 includes information relating to discounts based on specific contracts among parent companies and at least one of vendors, customers, representatives, and the brokerage, and references associated parent company in the ParentCompanies table 328. The "Customers" table 314 references the parent company of each customer in the ParentCompany table 328, if the customer has a parent company. The "ParentCompanyContacts" table 304 references the parent company with which a given contact is associated. A "ParentLinks" table 342 includes URLink data for associated parent companies.

Figure 3F:
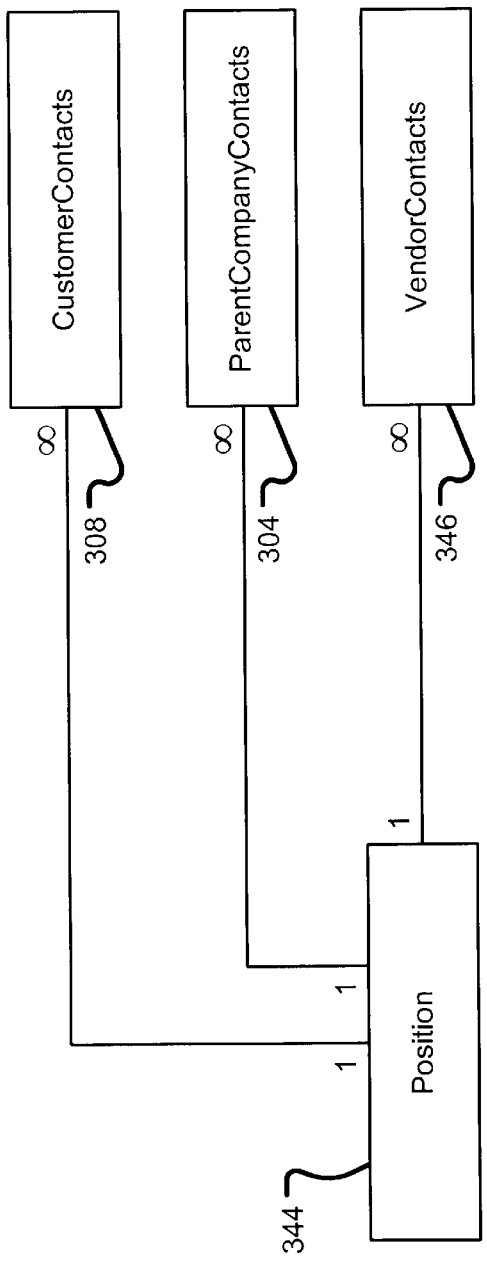

FIG. 3F depicts table relationships associated with a "Position" table in an embodiment of the present invention. The "Position" table 344 may contain information relating to a contacts position within a customer's business, a parent company's business, or a vendor's business (e.g., field 850 in FIG. 8). Associations with the corresponding customer, parent company, and vendor are made in tables 304, 308, and 346.

Figure 3G:
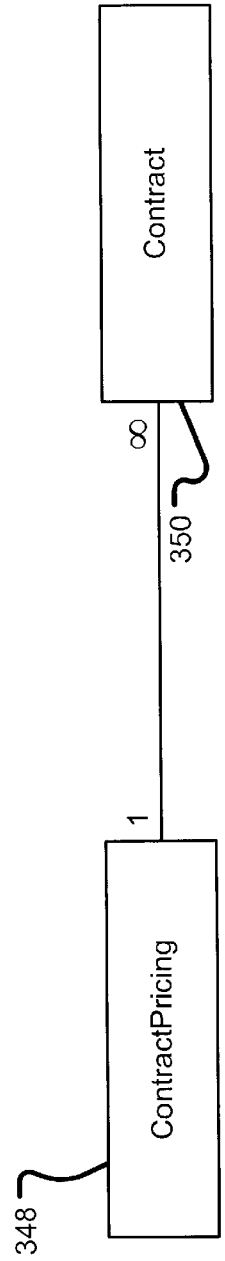

FIG. 3G depicts table relationships associated with a "ContractPricing" table in an embodiment of the present invention. The "ContractPricing" table 348 may contain information relating to specialty pricing defined by contracts with various parent companies, representatives, customers, and vendors. A "Contract" table 350 includes the terms of a given contract and references in corresponding pricing in the ContractPricing table 348.

Figure 3H:
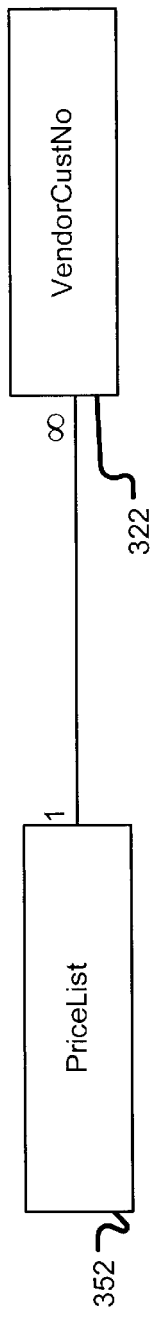

FIG. 3H depicts table relationships associated with a "PriceList" table in an embodiment of the present invention. The "PriceList" table 352 may contain information relating to various price lists, such as price list associated wholesale customers, retail customers, and distributor customers. The "VendorCustNo" table 322 contains information relating to the "Cust#" tab 624 of FIG. 6 and references data in the PriceList table 352.

Figure 3I:
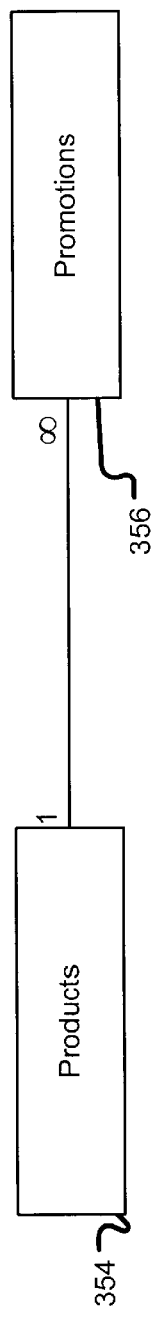

FIG. 3I depicts table relationships associated with a "Products" table in an embodiment of the present invention. The "Products" table 354 may contain information relating to various products available through the brokerage or other merchandising entity, such as a retailer, vendor, etc. The "Promotions" table 356 contains information relating to the "Promotions" fields 908 of FIG. 9 and references the associated products data in the Products table 352.

Figure 3J:
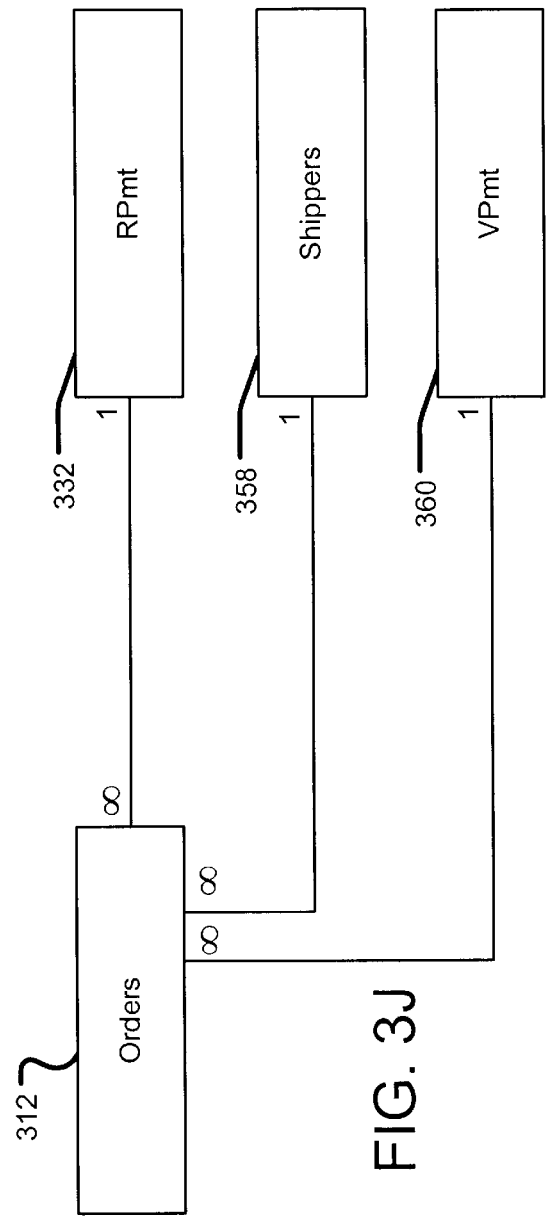

FIG. 3J depicts additional table relationships associated with an "Orders" table in an embodiment of the present invention. The "Orders" table 312 may contain information relating to various products available through the brokerage or other merchandising entity, such as a retailer, vendor, etc. The "RPmt" table 332 contains information relating to the representative payments (e.g., commissions) and references the associated order data in the Order table 312. A "Shippers" table 358 contains information relating to the shipping company or companies used to transport the order referenced in the Orders table 312 (see the "Ship Via" field in fields 1024 of FIG. 10). A "VPmt" table 360 contains information relating to the payment to the vendor for the product ordered and references the associated order in the Orders table 312.

Figure 3K:
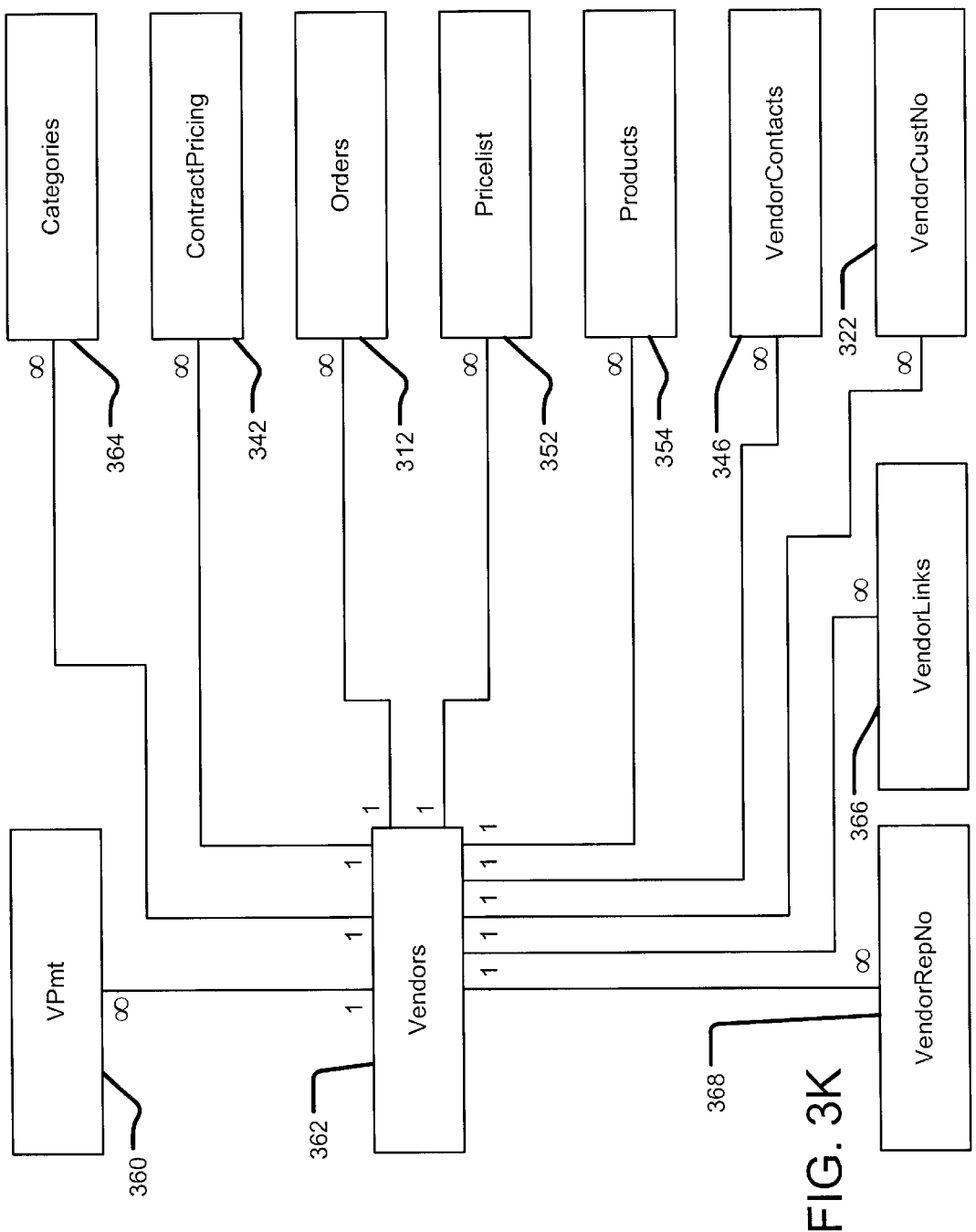

FIG. 3K depicts table relationships associated with a "Vendors" table in an embodiment of the present invention. The "Vendors" table 362 may contain information relating to various vendors represented by the brokerage (see FIG. 7).

A "VPmt" table 360 contains information relating to the payment to the vendor for the product ordered and references the associated vendor in the Vendors table 362. A "Categories" table 364 contains information describing commission categories or commission percentages associated with a given category of product for a given vendor. The Categories table 364 also references the associated vendor in the Vendors table 362. The "ContractPricing" table 342 references the vendor associated with a given element of contract pricing, based on a contract between a vendor and other party (e.g., customer, representative, brokerage, etc.). The "Orders" table 312 references the vendor involved in the order. The "Pricelist" table 352 references the vendor associated with a given prices list. The "Products" table 354 references the referenced vendor that can supply a given product in the Vendor table 362. The "VendorContacts" table 346 references a vendor with which a contact is associated. The "VendorCustNo" table 322 contains an identifier that a referenced vendor associates with a given customer. The "VendorLinks" table 366 identifies URLinks associated with referenced vendors. The "VendorLinks" table 334 identifies an identifier that a referenced vendor has assigned to a given representative.

In one embodiment of the present invention, the order and order details are filtered out when generating or synchronizing with the replica that is stored to the hosting server. In many circumstances, the order and order detail data comprise a significant portion of the merchandising database size, and therefore, the automatic filtering of such data from the replica minimizes the storage, time, and bandwidth costs of maintaining the e-commerce web site using the replica. Alternatively, other filtering schemes may also be employed in accordance with the data needs of the web application on the hosting server. In one embodiment, the entire merchandising database may be generated as a replica on the hosting server.

Likewise, custom filtering schemes may be applied to generating and synchronizing between a server replica (see replica 114 in FIG. 1) and a client replica (see replica 126 in FIG. 1). Furthermore, a client can transmit an entire client replica to another storage location (e.g., the hosting server or some other remote storage location) for subsequent retrieval. This technique is particularly useful when employed with cell phones and personal digital assistants with limited storage capacity.

In addition, the synchronization between the merchandising database and replica (or between the client replica and the hosting server replica) synchronizes only changed data between the two databases. No intermediate copy or translation operation is required. Instead, the system synchronizes changed fields in both databases, resolving any conflicts in accordance with user input or other conflict resolution mechanisms.

In an embodiment of the present invention, the merchandising database also includes display characteristics parameters that configure the presentation of the order guide (i.e., an order web page) to the consumer. In one embodiment, an order guide may be referred to as a "purchase order guide). The display characteristic parameters are set by the business user in a setup and configuration module (not shown) provided by the embodiment of the business application. The display characteristic parameters are recorded in the merchandising database in the form of a BLOB ("Binary Large Object"). A BLOB is a database field that can hold large amounts of arbitrarily formatted data, including custom formatted display parameters, images, audio, video, long text blocks, or any digitized information. The display characteristics can specify any display characteristics of the order web pages, including data that would be defined in a web page style page. The BLOB is included in the server replica when the replica is generated. The web application reads the BLOB to configure the display characteristics of the order web pages, just as a style sheet might be read by a web application.

When the replica is synchronized with the merchandising database, changes to the BLOB caused by user access to the setup and configuration modules are updated in the replica's BLOB, thereby updating the display characteristics of the order web pages. In this manner, a business user can maintain and customize his or her web site without maintaining a prolonged connection to the web server and without dealing with the complexities of style sheets and web programming. This approach takes advantage of an embodiments support for intermittent connections between the business application and the server.

Figure 4:
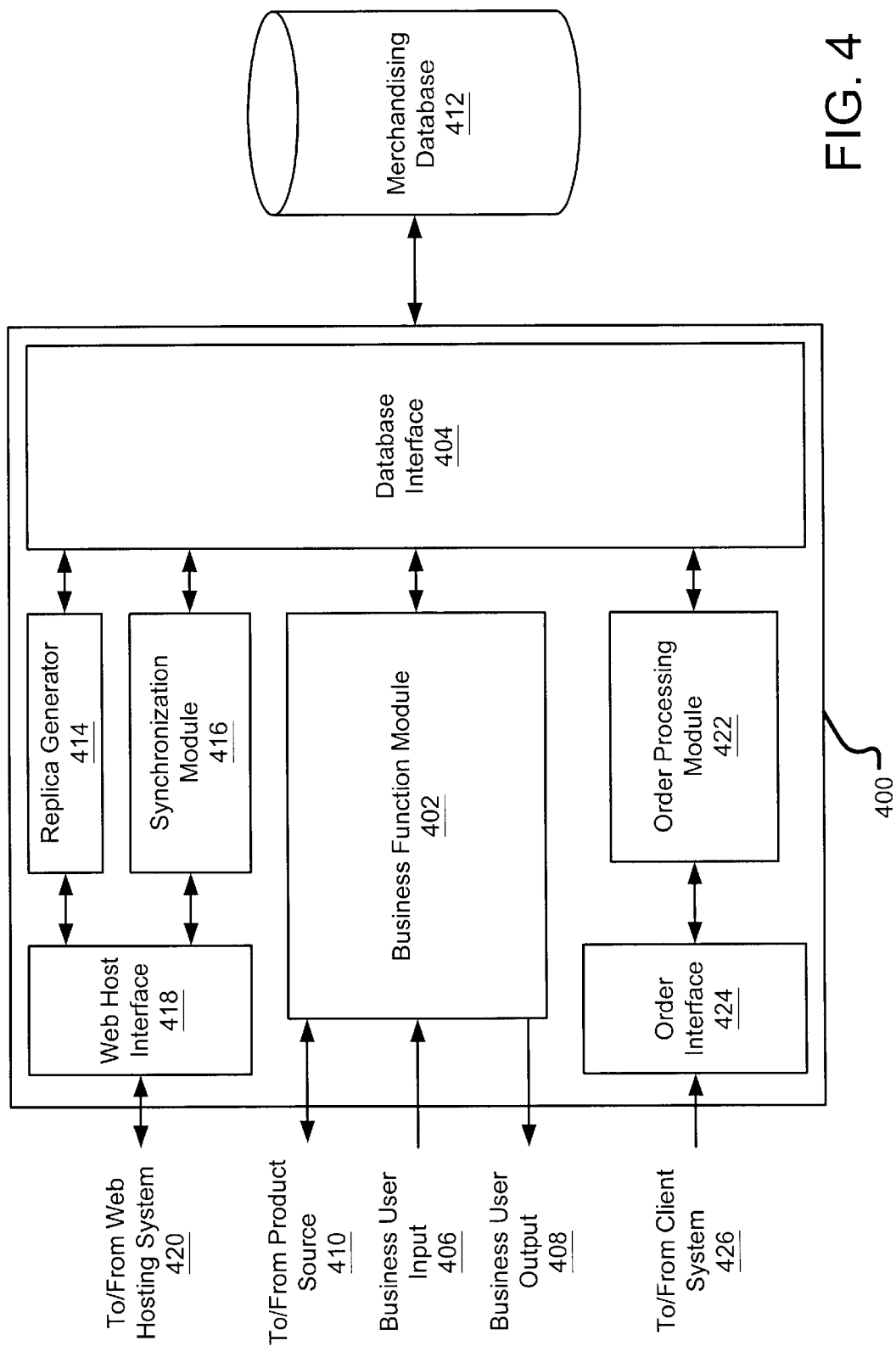
FIG. 4 illustrates components of a business application in an embodiment of the present invention.

FIG. 4 illustrates components of a business application in an embodiment of the present invention. A business application 400 may include a primary business function module 402 for performing necessary business operations, such as those discussed with regard to the screen shots of FIGS. 5 through 12. The business function processor 402 can receive input from the business user via business user input 406 (e.g., keyboard, mouse, microphone, touch screen, etc.) and present output to the business user via business user output 408 (e.g., video display, speaker, etc.) in a manner similar to other business applications, such as database application, word processors, etc. In addition, the business function module 402 can also communicate with external product sources 410, such as vendors represented by a brokerage. Information received from the external product sources 410, such as inventory updates, new products and pricing, may be analyzed and recorded in the merchandising database 412, which the business function module 402 accesses via the database interface 404. In an embodiment of the present invention, the database interface is provided by Microsoft Access, which provides function calls through which an application can access a database.

When configuring an e-commerce system of the present invention, a user can generate a partial replica for export to a web server. In the illustrated embodiment, the replica generator 414 filters merchandising data stored in the merchandising database 412 for exportation in a partial replica. In one embodiment of the present invention, the replica generator 414 employs predefined filtering rules to minimize the data communicated to and stored at the Web hosting server. Although not required in the present invention, the partial replica is likely to include only a partial subset of the merchandising data from the merchandising database 412 to minimize bandwidth requirements, upload times, and storage requirements on the host server. In an embodiment of the present invention, a set of tables and fields from the merchandising database 412 are configured in a filter, which accesses the merchandising database through the database interface 404 and outputs the resulting partial replica through the web host interface 418 for storage on the Web hosting system 420. After the partial replica is exported to the Web hosting server 420, the communication link between Web hosting server 420 and the business application 400 may be terminated (i.e., hence, an intermittent connection).

To maintain consistency between the partial replica in the Web hosting server 420 and the merchandising database 412, the partial replica and the merchandising database 412 may be synchronized. Responsive to a synchronization event (e.g., triggered by a synchronization schedule, a user command, or a modification to the merchandising database), a synchronization module 416 performs a bidirectional synchronization of data in the partial replica (see replica 210, for example) and the merchandizing database. In this synchronization process, for example, modified fields in the replica are written to corresponding fields in the merchandising database and vice versa.

During synchronization, corresponding fields in the replica and the merchandising database, for example, may have been changed since the last synchronization event, resulting in "conflicts" in the current synchronization. As such, an embodiment of the present invention may include functionality for resolving such conflicts. One embodiment, for example, displays the data from the modified fields to the user, who may select the data that he or she wishes to be applied in the next synchronization. In order to maintain the most current synchronization between the merchandising database and the replica, a user may immediately resynchronize after resolving the conflicts. In the resynchronization event, the conflicting fields are resolved according to the user's selection. Alternatively, some resolutions may be accomplished through the use of heuristic processes, predetermined conflict resolution rules, or other conflict resolution mechanisms.

In an embodiment of the present invention, merchandising data exported in the partial replica is not limited to product information. Merchandising information may also include customer information, contract information, prices, web page style information, customer preferences, promotional material, etc. When such data is modified (e.g., through the business function module 402), synchronization will then update the corresponding material in the partial replica, assuming the fields are included in the filtering configuration of the replica generator 414.

As discussed, the partial replica is exported to the Web hosting server to allow a customer to access the merchandising data in the partial replica. In one embodiment, such access is facilitated through a web page that is populated with a given subset of the merchandising data from the partial replica and transmitted to the customer's client system 426. Thereafter, the customer may send order data for one or more given products through the order interface 424. The order data is then processed by the order processing module 422, which updates the merchandising database 412 with the order parameters. Alternatively, the order processing module 422 can communicate directly with or be integrated with the business function module 402, which can also access and modify the merchandising data in the merchandising database 412. For example, instead of sending the order data directly to the business application 400, the client system can send order data via the partial replica at the Web hosting server. Accordingly, when the partial replica and the merchandising database are synchronized, the order data will be recorded in the merchandising database, where the business function module 402 can process the order data and communicate the order to the appropriate vendor. The business function module 402 can also transmit the order parameters to the appropriate product source (e.g., vendor) for fulfillment of the order.

Figure 5:
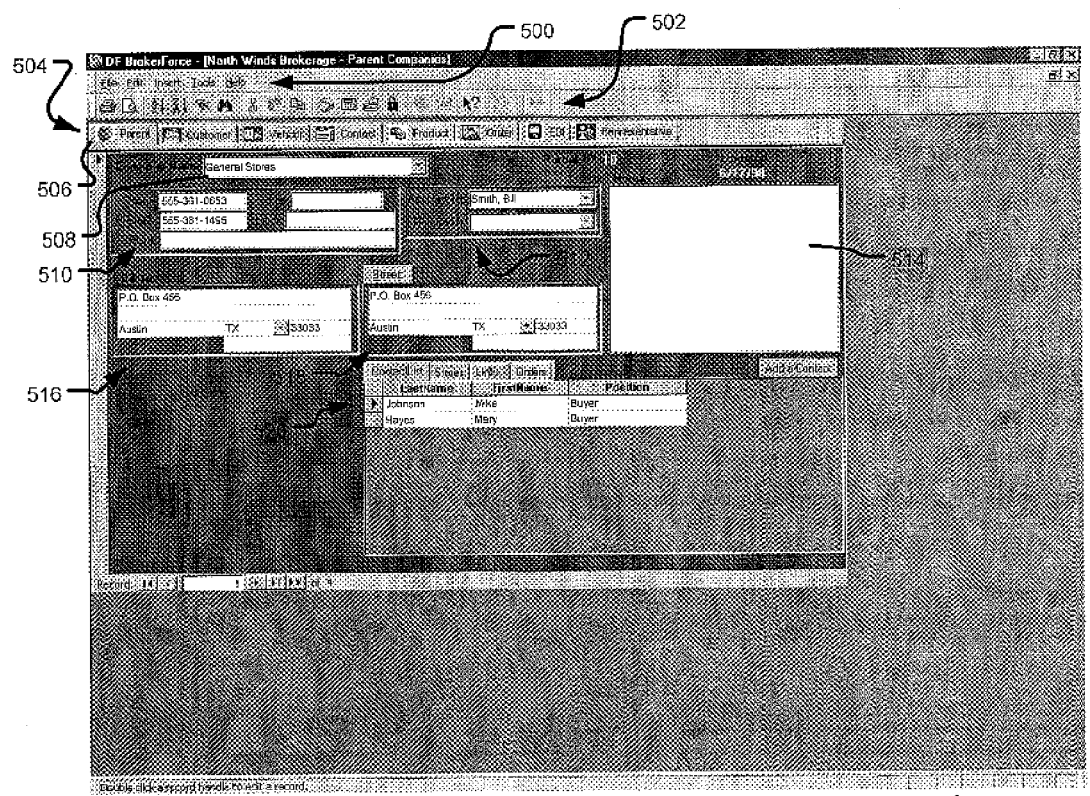
FIG. 5 depicts a business application screenshot of a "Parent" window in an embodiment of the present invention.

FIG. 5 depicts a business application screenshot of a "Parent" window in an embodiment of the present invention. The illustrated business application is implemented using Microsoft® Access, although other database application environments and programming languages may be employed within the scope of the present invention. The illustrated screenshots in FIGS. 5 through 12 represent exemplary displays of a business application in an embodiment of the present invention.

Across the top of the main window extend a standard Microsoft® Access application menu bar 500 and toolbar 502. A set of tabs extends across the top of a child window. In the illustrated embodiment, the "Parent" tab 506 is selected; therefore, the elements of a "Parent" window are displayed. Other tabs supported in the illustrated embodiment include "Customer", "Vendor", "Contact", "Product", "Order", "EDI", and "Representative", although other types of tabs may also be supported within the scope of the present invention. The windows associated with other tabs are described with regard to other Figures.

The "Parent" window provides access to merchandising data relating to a given parent company (i.e., "parent company data"). A Parent company may be associated with merchandising data shared by multiple customers, vendors, representatives, contacts, and products. Exemplary fields may include without limitation a company name field 508, electronic communications fields 510, account representative and referral information fields 512, and a notes field 514. Fields 516 represent a billing address at the indicated parent company. Fields 518 represent a shipping address at the indicated parent company. Fields 520 represent contact information at the indicated parent company. The data in these fields are stored in the merchandising database and are available for reading and writing through the "Parent" window of the business application.

Figure 6:
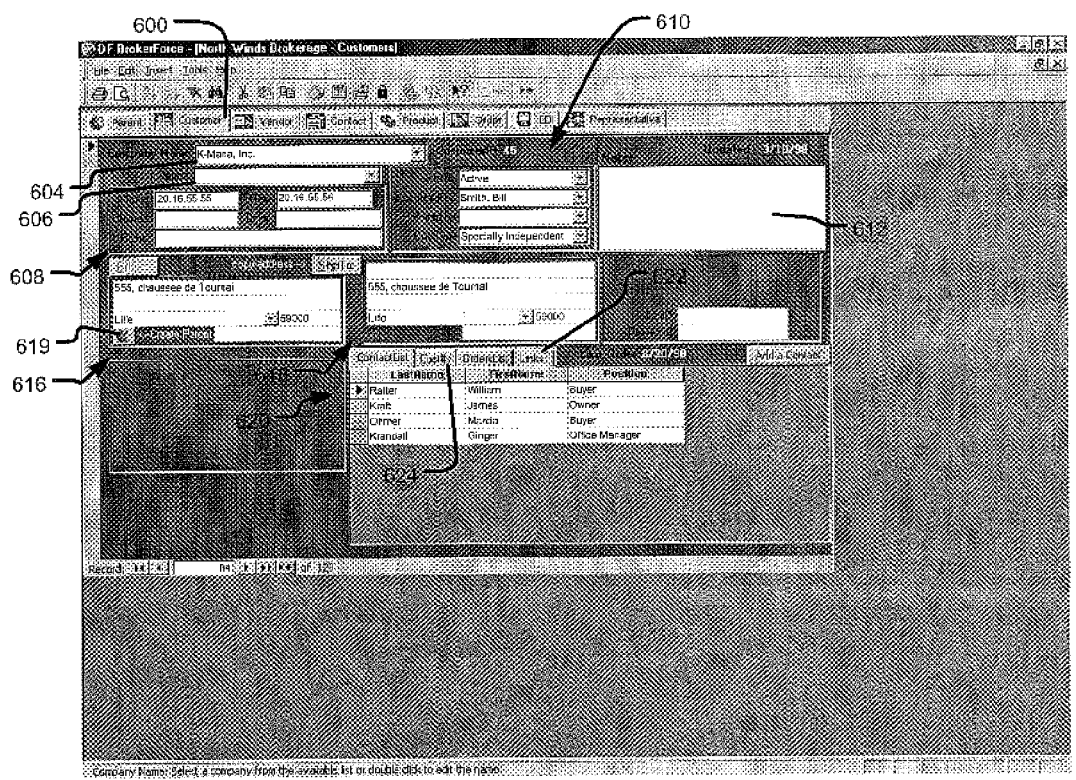
FIG. 6 depicts a business application screenshot of a "Customer" window in an embodiment of the present invention.

FIG. 6 depicts a business application screenshot of a "Customer" window in an embodiment of the present invention. In the illustrated embodiment, the "Customer" tab 600 is selected; therefore, the elements of a "Customer" window are displayed. The "Customer" window provides access to merchandising data relating to a given customer (i.e., "customer data"). In the illustrated embodiment, a "customer" represents a retailer that purchases wholesale products from vendors or manufactures. Exemplary fields may include without limitation a customer name field 604, the customer's parent company name field 606, electronic communications fields 608, a notes field 612, and fields 610 indicating the account status, the account representative, referral information and a customer type. Exemplary customer types may include without limitation Airline Catering, Basket Business, Bed N' Breakfast, Café, Candy And Gifts, Candy Manufacturer, Candy Store, and Card Store. Many other retailers, wholesalers, manufacturers, and service providers may be included as customer types. Field 613 indicates a Tax ID number. Field 614 indicates a password that can be used to login to a given account via the web application on the hosting server. Alternatively or additionally, the password can be used to securing transmissions, such as replications, synchronizations, orders, or web site accesses. Fields 616 represent a billing address at the indicated customer company. Fields 618 represent a shipping address at the indicated customer company. Control 619 allows a user to create a parent company associated with the current customer. Fields 620 represent contact information at the indicated customer company. The "Links" tab 622 can display URL-inks for the selected customer. The data in these fields are stored in the merchandising database and are available for reading and writing through the "Customer" window of the business application.

FIG. 7 depicts a business application screenshot of a "Vendor" window in an embodiment of the present invention. In the illustrated embodiment, the "Vendor" tab 700 is selected; therefore, the elements of a "Vendor" window are displayed. The "Vendor" window provides access to merchandising data relating to a given vendor (e.g., a company that manufactures or imports a given product or product line). Such data is referred to as "vendor data". Exemplary fields may include without limitation a vendor name field 704, electronic communications fields 706, a notes field 708 and a vendor description field 710. Fields 712 represent a billing address at the indicated vendor company. Fields 714 represent a shipping address at the indicated vendor company. Fields 720 represent contact information at the indicated vendor company. The logo field 722 indicates the logo of the vendor that is to be displayed on the host-server-resident web page relating to the vendor's products and on orders (e.g., order emails, order forms, order faxes, etc.). By right-clicking on the logo field 722, a user can enter a pathname or URL to a graphic file that can be used by the web application when presenting product data to a customer on an order Web page, for example. The data in these fields are stored in the merchandising database and are available for reading and writing through the "Vendor" window of the business application.

The line card check box 724 enables the inclusion of a given vendor's products on the e-commerce web site. If the line card check box 724 is not checked, the vendor and its products may be omitted from the replica, either through a replication or synchronization event. Alternatively, a flag may be set in the replica that signals the web application to ignore information for the given vendor when generating web site information. The inventory check box 726 controls whether inventory fields should be displayed on web-based product forms (See FIGS. 13–16) and line card reports, and whether the user should be prompted if an order exceeds available inventory for a given product. The back order check box 728 indicates whether the vendor fills back orders. If so, a business user may be prompted if an invoice, received from a vendor, varies by a predetermined price percentage from the current balance. The business user will be prompted to append the remaining balance (i.e., the current balance minus the invoice amount) to a back order or to amend the order to alleviate the unfilled portion of the order.

Figure 8:
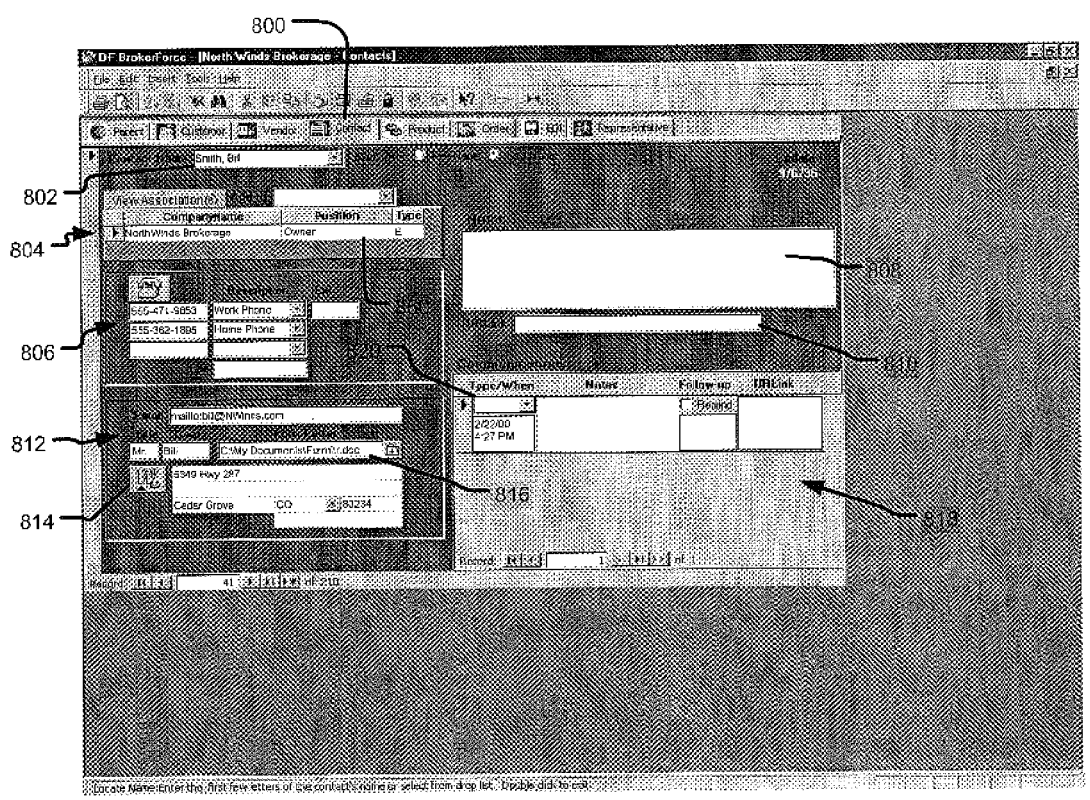
FIG. 8 depicts a business application screenshot of a "Contact" window in an embodiment of the present invention.

FIG. 8 depicts a business application screenshot of a "Contact" window in an embodiment of the present invention. In the illustrated embodiment, the "Contact" tab 800 is selected; therefore, the elements of a "Contact" window are displayed. The "Contact" window provides access to merchandising data relating to of individual contacts at companies (i.e., "contact data"), such as parent companies, customers, vendors and other individuals. Contact information regarding agency representatives may also be accessed through the "Contacts" window. Exemplary fields may include without limitation a contact name field 802 and fields 804 indicating the associations that the contact has with vendors, customers, etc. The "Contacts" window also includes electronic communications fields 806, a notes field 808 and a URLink 810 for indicating a web site address, such as a Uniform Resource Locator (URL). Additional contact information (e.g., email address and mailing address) is indicated in fields 812. Button 814 allows a user to generate a letter, a template of which is indicated in field 816) to the indicated contact. The Communications fields 818 provide an interface for logging or recording times, dates, notes and other information about individual communications with the indicated contact. Types of communications (see field 820) may include, without limitation, "Conference", "Document", "E-mail", "Excel", "Fax", "Letter", "Meeting", "Note", "Phone Call", "Power Point", "Task", and "Word". The data in these fields are stored in the merchandising database and are available for reading and writing through the "Contact" window of the business application.

Figure 9:
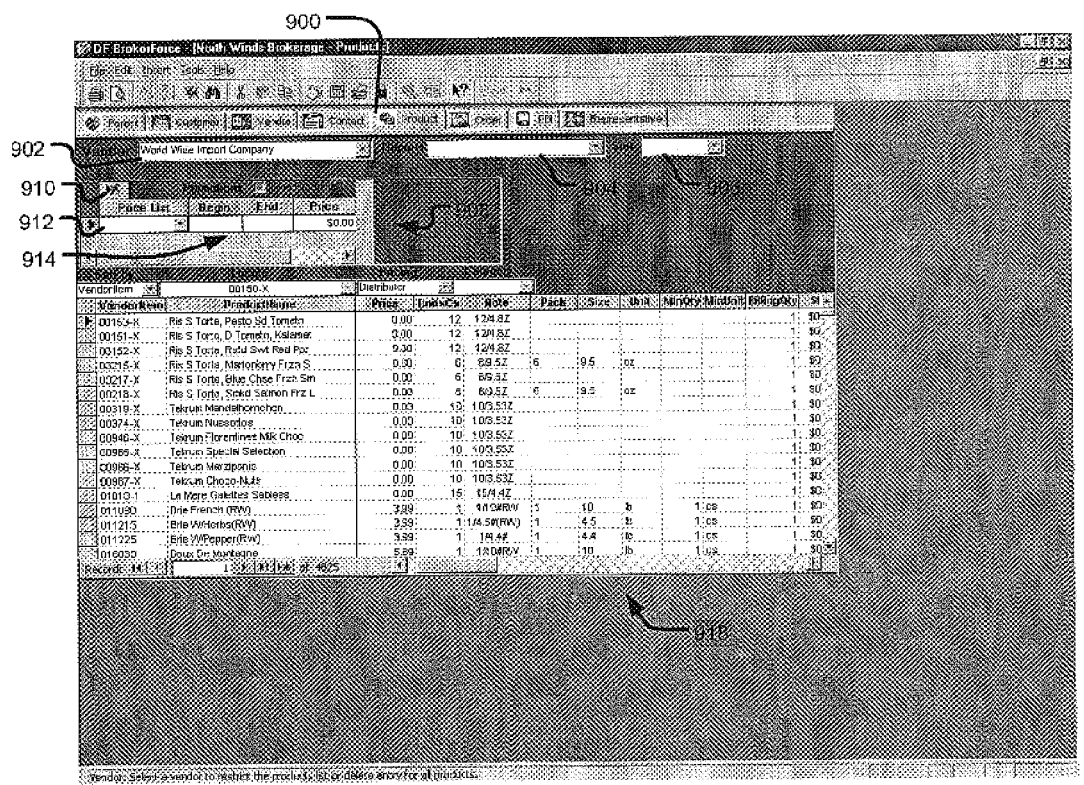
FIG. 9 depicts a business application screenshot of a "Product" window in an embodiment of the present invention.

FIG. 9 depicts a business application screenshot of a "Product" window in an embodiment of the present invention. In the illustrated embodiment, the "Product" tab 900 is selected; therefore, the elements of a "Product" window are displayed. The "Product" window provides access to merchandising data relating to a given product (i.e., product data). In the illustrated embodiment, a "product" represents an item or service offered for sale by a vendor. Exemplary fields may include without limitation a Vendor name field 902 (i.e., the vendor that provides the indicated products), a report field 904 for selecting from a set of predetermined (viewable and printable) reports, and a sort parameter field 906, which indicates the column of product entries by which the product list should be sorted.

The "Promotions" control group 908 provides access and controls to promotional information (e.g., sale items and terms). If more than two promotions are available for a given product, the "Promotions" control group 908 supports a scrollbar to allow access to all promotions. In the illustrated embodiment of the present invention, the promotions are allocated in accordance with a price list, such as Distributor or Wholesale. Accordingly, the "Price List" field 912 indicates the price list corresponding to a given promotion. The "Begin" and "End" fields 914 indicate the term or duration of the promotion. The "Price" field indicates the price for the selected product and the associated price list. In a field not displayed in the illustrated screenshot, the commission associated with a given promotion is also indicated. A "delete" button 910 allows a user to delete an expired or incorrect promotion. The "Filter Products?" check box 916 allows a user to filter the vendor's products to display only those products with a promotion associated with them. In table 918, the vendor's products and other details are displayed. In an embodiment of the present invention, the data in the fields described relative to FIG. 9 is stored in the merchandising database and are available for reading and writing through the "Product" window of the business application.

Figure 10:
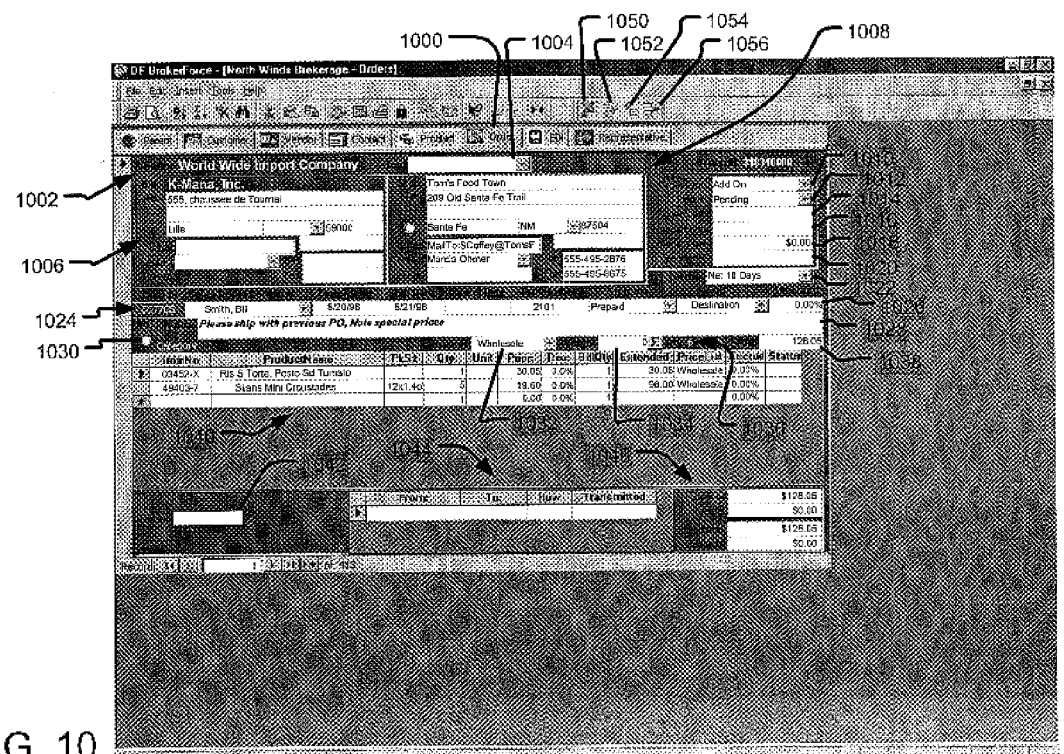
FIG. 10 depicts a business application screenshot of an "Order" window in an embodiment of the present invention.

FIG. 10 depicts a business application screenshot of an "Order" window in an embodiment of the present invention. In the illustrated embodiment, the "Order" tab 1000 is selected; therefore, the elements of an "Order" window are displayed. Customized toolbar selections are associated with the "Order" window. "Export" button 1050 provides access to an order spreadsheet that can be exported to a file. "Duplicate Order" button 1052 allows a user to create a new order having information that is the same as the current order. "Fill Backorder" creates a back order (i.e., a new order in the database) and allows the business user to edit the back order in accordance with new shipping information, pricing information, etc. "Reduce Inventory" button 1054 allows a user to alter inventory information provided by the vendor, in accordance with the current order.

The "Order" window provides access to merchandising data relating to a given order for one or more products (i.e., "order data"). In the illustrated embodiment, an "order" represents a request for product(s) from a customer to a vendor. In an embodiment of the present example, the order information may be received from the customer via an automatically processed order form received in email. Alternatively, the order information can be entered manually by the business user in response to a phone call, fax, email, or other communication. Exemplary fields may include without limitation a Vendor name field 1002 (i.e., the vendor by which the ordered products will be provided) and a department field 1004 that identifies a given department at the customer (e.g., produce, bakery, floral, etc.). A billing address and other contact information are provided in fields 1006. A shipping address and other contact information are provided in fields 1008.

The order type field 1010 indicates order characteristics, such as Normal, Opening Order, Over 90 days, Preorder File, Replacement, Samples, Show Order, Special Order, Thanksgiving, Trade Show, Valentines, and Weekly. The status field 1012 indicates the status of the order, including Archive, Backorder, Bid, Canceled, Credit Hold, Disputed, Incomplete, Invoiced, Outstanding, Paid, Pending, Rejected, Rep Paid, Sample, and Shipped. The invoice number may be indicated in field 1014. The date that the invoice was sent by the vendor to the customer may be indicated in field 1016. The invoice amount may be indicated in field 1018. The corresponding Vendor purchase order number may be indicated in VendorPO field 1020. The terms field 1022 indicates the terms of payment between the customer and the vendor for the indicated order.

Fields 1024 indicates the customer identification number, the associated sales representative, the date that the order was placed by the customer, and a desired shipping date (or the begin ship date). The fields 1024 also include a date by which the order can be cancelled by the customer without penalty, a customer purchase order number, and shipping information (i.e., "Ship Via" and "FOB"). Field 1026 indicates a discount to be applied to the order. The "Order" window also includes a "Notes" field 1028 indicating instructions entered by the customer when placing the order. The UPC indicator 1030 allows products look-up based on UPC codes that are scanned in with a UPC scanner. The pricing field 1032 indicates the type of pricing employed for the present order, including options such as "Wholesale", "Distributor", "Volume1", "Volume2", and "Contract". The anticipated weight of the order is identified in field 1034 for shipping cost purposes. The quantity of items in the order is indicated in field 1036. The total amount of the order (minus shipping) is indicated in Amount field 1038.

Table 1040 identifies the individual products ordered, including item numbers, descriptions, sizes, quantities, prices, discounts, pricing types for individual products, and the status of the orders for individual products, etc. "Unit" indicates how the product is billed (e.g., by the case or each). "BillQty" indicates an adjustment factor for items ordered in one unit but billed in another (e.g., 1 wheel of cheese=20 lbs×$4.50/lbs). "Extended" indicates a subtotal for a line item (e.g., Extended equals Qty−Price−Discount×BillQty). Field 1042 may indicate the URL to the indicated vendor's web site. Fields 1044 may indicate a log of transmissions relating to the order (e.g., to the vendor, to the customer, etc.). Fields 1046 indicate calculations and totals for the indicated order. The data in these fields are stored in the merchandising database and are available for reading and writing through the "Order" window of the business application.

Figure 11:
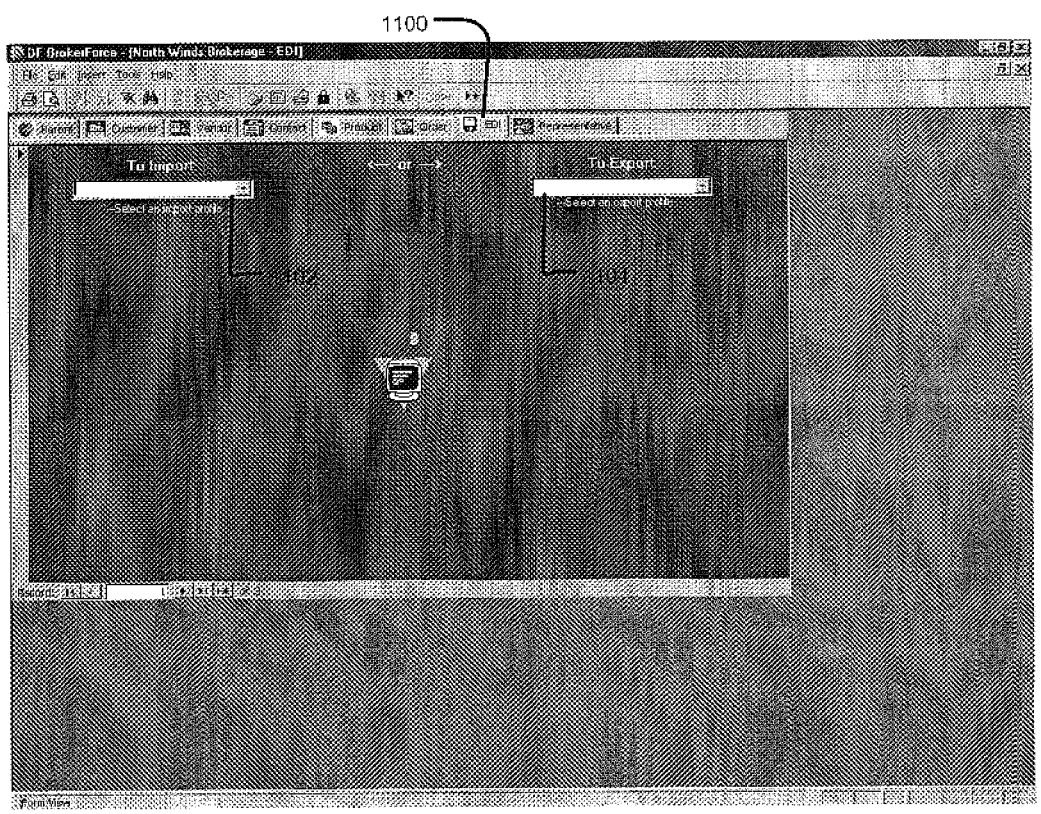
FIG. 11 depicts a business application screenshot of an "EDI" window in an embodiment of the present invention.

FIG. 11 depicts a business application screenshot of an "EDI" window in an embodiment of the present invention. In the illustrated embodiment, the "EDI" tab 1100 is selected; therefore, the elements of an "EDI" window are displayed. The "EDI" window allows a user to perform EDI functions, such as importing data to or exporting data from the merchandising database, generating replicas, and synchronizing the merchandising database with a replica. For example, if a vendor provides catalog information in electronic form, a user can provide an import profile or format that maps the catalog information into appropriate fields of the merchandising database. As such, the business application can support nearly automatic updating of vendor information. Imports, however, are not limited to catalog data, but can also import any other information that can be mapped to fields in the merchandising database, such as contact information from electronic business cards, order information, etc. Exporting, in contrast, can be used to provide merchandising data to another system by mapping merchandising data fields to fields of the other system using an export profile or format. This feature, for example, may be used to transmit orders to a vendor that supports an EDI communication. Exemplary fields may include without limitation an Import field 1100 and an Export field 1102, which identify functions or formats used in the corresponding import, export, replication, or synchronization function. As a function is selected, additional fields are display as appropriate for the selected function. The data in these fields are stored in the merchandising database and are available for reading and writing through the "EDI" window of the business application. For example, the profiles identified in previous imports/exports are stored in the merchandising database and may be selected using the drop down box associated with the fields.

In addition, the EDI window provides access to other EDI functions, such as synchronization and replication. After specification of a replica indicator (e.g., a pathname or URL to a given replica) and a merchandising database indicator (e.g., a pathname or URL to a given merchandising database), the synchronization module 416 of FIG. 4 can be directed to perform a unidirectional or bidirectional synchronization between the replica and the merchandising database, in accordance with the tables and fields shared between the two databases. Alternatively, after specification of a given merchandising database and a destination replica, the replica generator 414 of FIG. 4 can generate a replica in accordance with predetermined filtering rules. In this manner, a partial replica can be generated and recorded on a Web hosting server. Thereafter, a web application executing on the Web hosting server can present merchandising data from the partial replica to a customer accessing Web hosting server.

Figure 12:
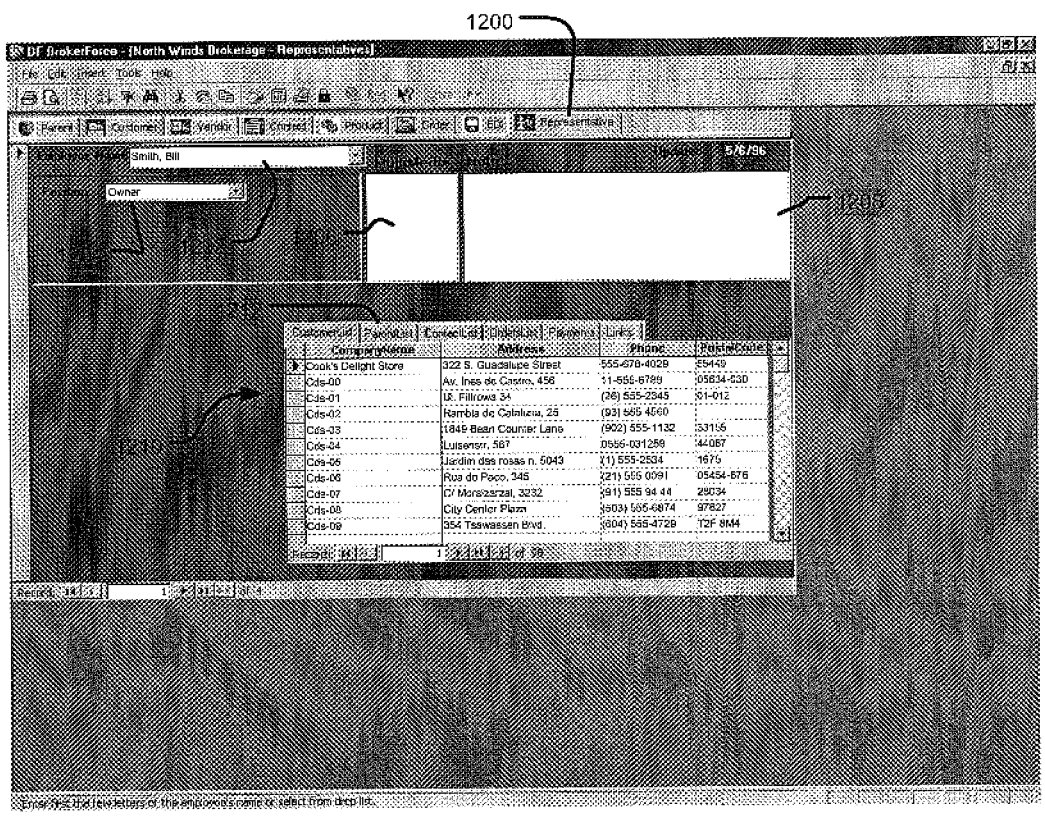
FIG. 12 depicts a business application screenshot of a "Representative" window in an embodiment of the present invention.

FIG. 12 depicts a business application screenshot of a "Representative" window in an embodiment of the present invention. In the illustrated embodiment, the "Representative" tab 1200 is selected; therefore, the elements of a "Representative" window are displayed. The "Representative" window provides access to merchandising data relating to a given reprehensive and the companies the representative represents (i.e., "representative data"). Exemplary fields may include without limitation a representative name field 1202, a position title field 1204 for the representative, a multimedia field 1206 for displaying a logo, a photograph, an animation, a video, etc., and a notes field 1208. A table 1210 indicates under the "CustomerList" tab, the companies represented by the representative. The data in these fields are stored in the merchandising database and are available for reading and writing through the "Vendor" window of the business application.

As FIGS. 5 through 12 illustrate displays of an exemplary business application, FIGS. 13 through 15 illustrate Web page displays a customer may view when accessing the partial replica through a web page displayed through a browser. As discussed, a browser or other client-based application can be used to access the partial replica stored at the host computer system. A customer can read access merchandising data from the partial replica and, optionally, modify the merchandising data in the partial replica, providing the customer has the necessary authorization to do so. In this manner, a customer can place orders or make changes to orders, company and contact information, etc., which can be bi-directionally synchronized with the merchandising database at the agency, where the changes can also be reviewed by the agency personnel before the changes are recorded. Alternatively, modification of such data or placement of orders may be effected through a second communications link, such as an email communication with the agency.

FIG. 13 depicts a screenshot of an "Order" web page in an embodiment of the present invention. In the illustration, a user has accessed a partial replica on a Web hosting server. A web application generated in association with the business application at the agency is activated to send appropriate web pages to connected customers. For example, assume the customer is a purchasing manager for a specialty cheese shop, who placing orders for products from European Imports, Ltd. through the Bill Fitzgerald Brokerage. Although the illustrated web page screenshots are depicted within a Microsoft Internet Explorer window, other browser applications may be used to access the partial replica within the scope of the present invention.

Some elements of the displayed web page 1300 are standard elements provided by the web application, while other elements are specific to the individual agency. The agency's specifications and custom display elements can be exported in the partial replica for use by the web application. The name, font, and size of the agency's title 1302 can be specified by the agency in the illustrated embodiment. Furthermore, the logo may be exported to the partial replica. If either of these display elements, or other display elements, are modified by the agency, a synchronization between the merchandising database and the partial replica will update the generated web pages.

Fields 1304 includes a customer name field, a requested ship date field, and a selected vendor field. The customer name is determined based on a login process for entering the web site. Notice that the login process also invokes a secure communication connection between the client computer and the host server, as evidenced by the padlock icon 1305. After login, the customer specifies a desired ship date and selects the vendor from whom he or she wishes to order products. As a result of this operation, a web page resembling the screenshot of FIG. 13 is displayed (i.e., displaying frames 1306 and 1308). When first entering the web page (i.e., the initial display of the web page), the frame 1308 displays only the boxed controls 1310. The "Key word, item#, or UPC" field can be used in combination with the "Search" button to search for matching. After the first search operation, a list similar to the list 1312 is shown in the frame 1308. By selecting a specific category, the search results can be filtered. In one embodiment, leaving the "Key word, item#, or UPC" field blank and selecting the "ALL" category results in a display (in a scroll window) of all possible products sold by the selected vendor through the given brokerage. By selecting the "Item#" button corresponding to a particular product, the product is added to the product table 1314, as discussed with regard to FIG. 14.

FIG. 14 depicts screenshot of an "Order" web page populated with selected products in an embodiment of the present invention. The product table 1400 now shows three items selected for ordering from European Imports Ltd. The Totals fields 1402 show the results calculated in response to an "Add/Recalculate" operation invoked by pressing button 1404. In addition, in one embodiment of the present invention, the "Header/Submit" button 1406 and the "Clear Form" button are displayed after the first item is entered into the product table 1400. Depressing the "Header/Submit" button 1406 submits the product table 1400 as an order. Depressing the button 1408 clears the contents from the product table 1400. Within the product table 1400, quantities of products ordered can be modified by changing number in the Qty field. In addition, product-specific notes can be entered into the Note field.

One enhancement to the "Order" web page involves the method of recalculating the data in the "Totals" fields 1402. In one embodiment, all data fields are re-looked up in the replica and re-processed when the consumer depresses the "Add/Recalculate". This operation can be quite time consuming when many line items are included in an order. As such, in an enhanced embodiment, a flag is maintained for each line item element. As such, if a consumer changes a quantity in one line item, the "changed" flag for the quantity data in that line item is set. If other line item elements are modified, corresponding flags are also set. When the consumer depresses the "Add/Recalculate" button, line items having changed elements are looked up again in the database (e.g., if the Item# has been modified), the Extended (Price) for the changed line items is recalculated (e.g., if the Qty or Price is modified), and/or the data in the Totals fields are recalculated (e.g., (e.g., if any Qty or Price in the order is modified). In this manner, only changed line items are re-looked up, significantly improving the web server response time.

FIG. 15 depicts a screenshot of an "Order Review" web page in an embodiment of the present invention. Fields 1500 indicate the shipping address, which may be retrieved from the customer information in the partial replica. The product review table 1502 displays the products selected for ordering. The order may be submitted by depressing the Submit button 1504. The "Order Review" web page is printer friendly, so that the order can be printed by the consumer using the browser's printing functions. In an alternative embodiment, a customer may also associate a customer PO number with the order.

Figure 16:
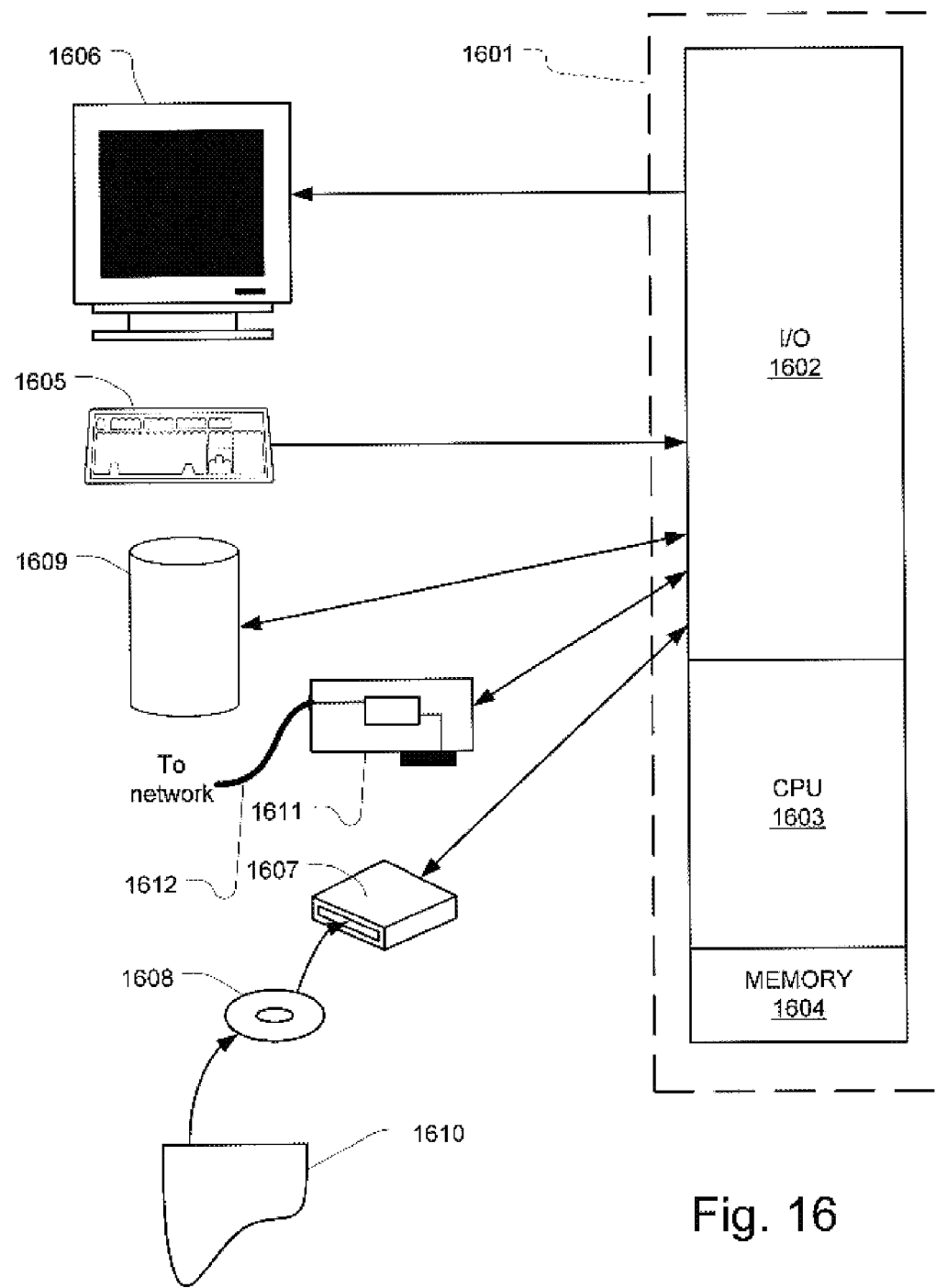
FIG. 16 depicts an exemplary computer system that can be useful in an embodiment of the present invention.

FIG. 16 depicts a general purpose computer capable of executing a program product embodiment of the present invention. One operating environment in which the present invention is potentially useful encompasses the general purpose computer. In such a system, data and program files may be input to the computer, which reads the files and executes the programs therein. Some of the elements of a general purpose computer are shown in FIG. 16 wherein a processor 1601 is shown having an input/output (I/O) section 1602, a Central Processing Unit (CPU) 1603, and a memory section 1604. The present invention is optionally implemented in software devices loaded in memory 1604 and/or stored on a configured CD-ROM 1608 or storage unit 1609 thereby transforming the computer system in FIG. 16 to a special purpose machine for implementing the present invention.

The I/O section 1602 is connected to keyboard 1605, display unit 1606, disk storage unit 1609, and disk drive unit 1607. Generally, in contemporary systems, the disk drive unit 1607 is a CD-ROM driver unit capable of reading the CD-ROM medium 1608, which typically contains programs 1610 and data. Computer program products containing mechanisms to effectuate the systems and methods in accordance with the present invention may reside in the memory section 1604, on a disk storage unit 1609, or on the CD-ROM medium 1608 of such a system. Alternatively, disk drive unit 1607 may be replaced or supplemented by a floppy drive unit, a tape drive unit, or other storage medium drive unit. The network adapter 1611 is capable of connecting the computer system to a network via the network link 1612. Examples of such systems include without limitation SPARC systems offered by Sun Microsystems, Inc., personal computers offered by IBM Corporation and by other manufacturers of IBM-compatible personal computers, and other systems running a UNIX-based or other operating system. In accordance with the present invention, software instructions directed toward accepting and relaying purchase orders using an intermittent connection to a merchandising database, a partial replica, or a client replica may be executed by CPU 1603, and merchandising data may be stored on disk storage unit 1609, disk drive unit 1607 or other storage medium units coupled to the system.

Figure 17:
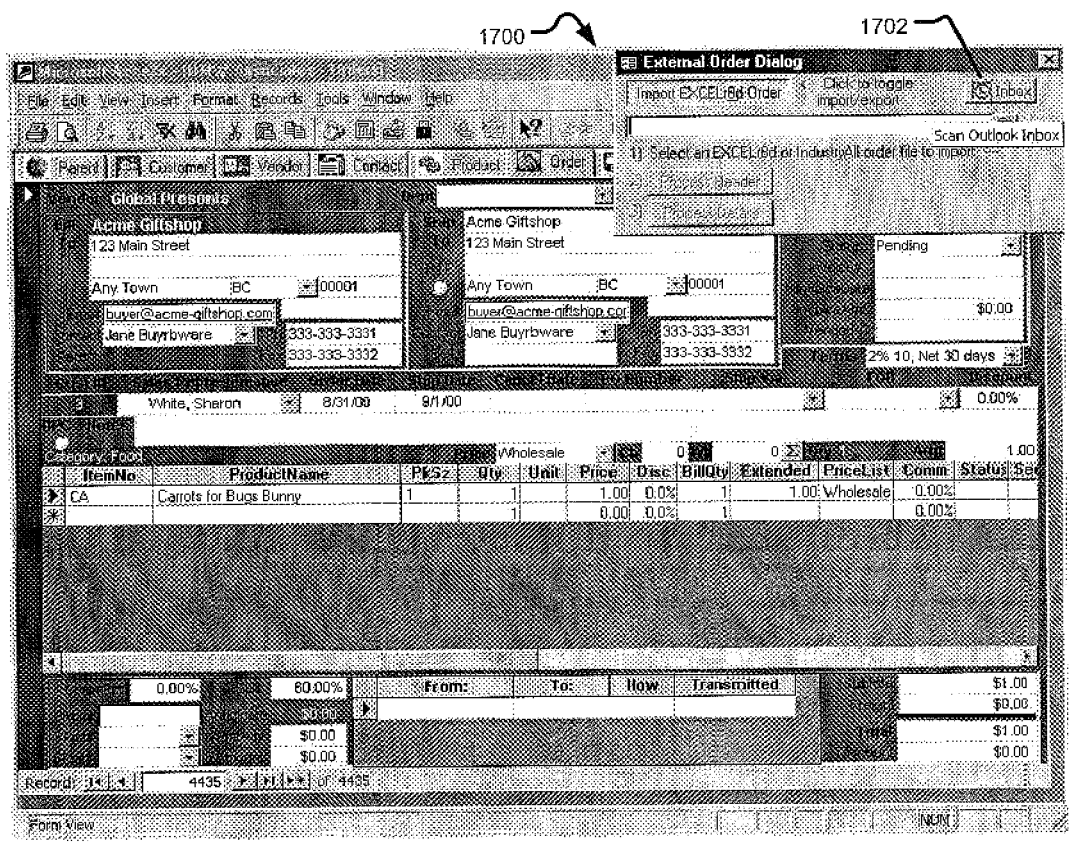
FIG. 17 depicts a screenshot of order processing by a business application in an embodiment of the present invention.

FIG. 17 depicts a screenshot of order processing by a business application in an embodiment of the present invention. The dialog box 1700 includes an Inbox button 1702, which a business user can select to scan the business user's inbox for orders that have been received via email. In one embodiment, the order processing module of the business application scans the contents of the inbox searching for email header information indicating that a particular email document contains an order.

Figure 18:
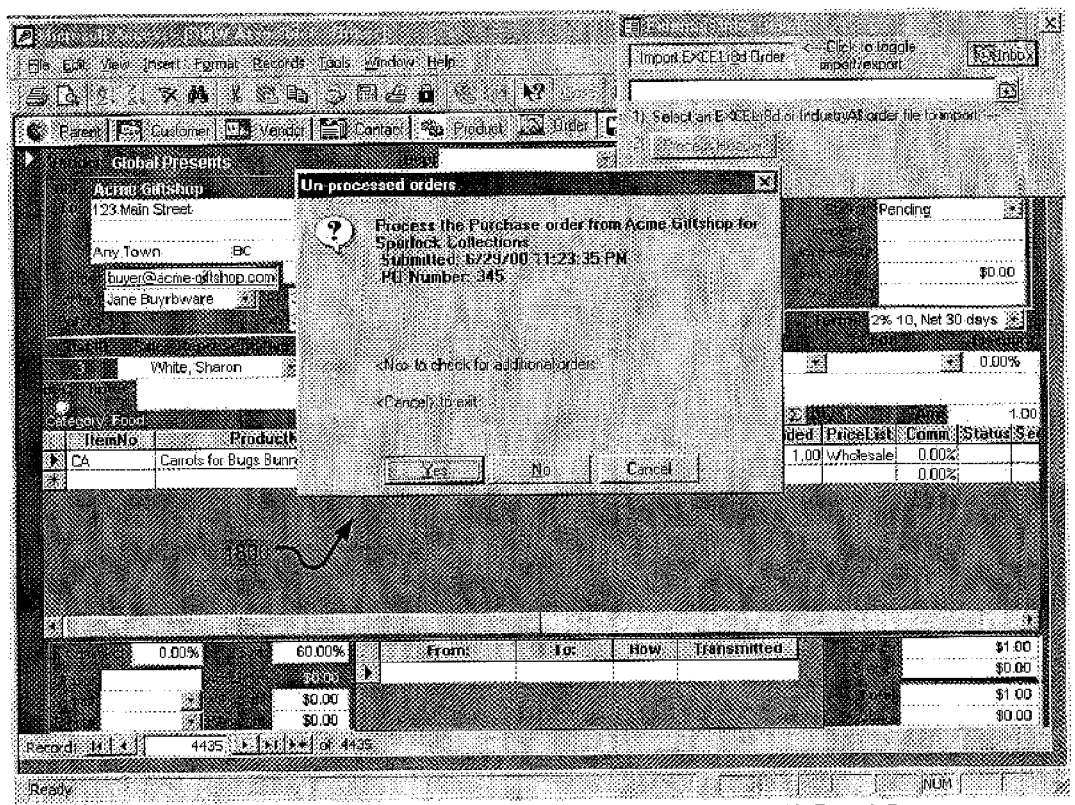
FIG. 18 depicts a screenshot of a dialog box indicating that an email order has been located in the inbox of the business user in an embodiment of the present invention.

FIG. 18 depicts a screenshot of a dialog box indicating that an email order has been located in the inbox of the business user in an embodiment of the present invention. The dialog box 1800 asks the business user if the located email order is to be processed by the order processing module. If the business user responds by depressing the "YES" button, the located email order is automatically processed. If the business user responds by depressing the "NO" button, the order processing module continues searching the inbox for additional email orders.

In some embodiments, automatic processing can result the merchandising database being updated with appropriate order information. The business user can then manually contact the appropriate vendor through traditional channels (e.g., phone, fax, email, dial-up). In alternative embodiments, the new order information can also be communicated directly and automatically to the appropriate vendor, through an additional email ordering process to the vendor, through a fax to the vendor, through EDI with the vendor, and through other automatic means.

Figure 19:
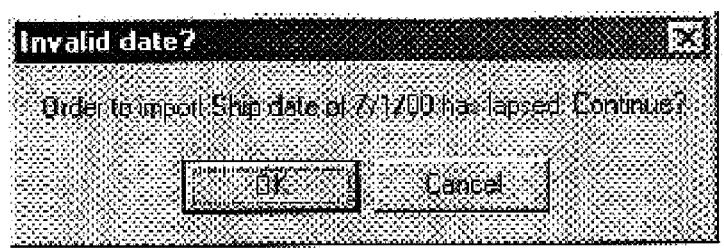
FIG. 19 depicts a message box indicating a date variance in an embodiment of the present invention.

FIG. 19 depicts a message box indicating a date variance in an embodiment of the present invention. During order processing, predetermined variances are processed by the order processing module or some other module in the business application. Potential variances are compared against variance rules to determine whether a given element of order data is within a given tolerance. For example, the variance processing that results in message box 1900 compares the order ship date to the current date and determines that the order ship date has passed. Accordingly, the business user has the option of accepting the order, even though the ship date has lapsed, or canceling the order. If the order is accepted, the order processing proceeds normally. However, if the order is canceled, a notice may be sent to the consumer describing the variance and the resulting cancellation.

FIG. 20 depicts operations for processing orders using a merchandising database in an embodiment of the present invention. Operation 2000 generates a replica from the merchandising database. In one embodiment of the present invention, the replica contains merchandising data that is filtered from the merchandising database. For example, one type of replica may omit order data (e.g., order headers and order details). Operation 2002 establishes a communications link between the Web hosting server and the business application. Operation 2004 transmits the replica to the Web hosting server, and then operation 2006 terminates the communications link.

Operation 2008 receives an order from a consumer via an independent communications link (i.e., not the identical communications link in which the replica was transmitted to the Web hosting server). Operation 2010 modified the merchandising database in accordance with the order. For example, a new order header and new order details are added to the merchandising database.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of embodiment of the invention. Since many embodiments of the invention can be made without departing from the spirit and scope of the invention, the invention resides in the claims hereinafter appended.

I claim:

1. A merchandising system for processing a customer order in association with a web hosting computer, a client computer, and a business application computer, the web hosting computer and the business application computer being intermittently connected by a communications link, the merchandising system comprising:

a merchandising database containing merchandising data including order data pertaining to customer orders for merchandise, the merchandising system managing merchandising data received from a plurality of vendors;

a web host interface establishing a communications link between the business application computer and the web hosting computer;

a replica generator executing on the business application computer to filter out at least the order data from the merchandising database to create a replica of the merchandise database containing the merchandising data without the order data for transmission to the web hosting computer across the intermittently connected communications link;

a web application executing on the web hosting computer and generating an order guide that displays the merchandising data from the replica on the client computer; and a synchronization module synchronizing the replica with the merchandising database to cause only modifications made to the merchandising database to be updated in the replica.

2. The merchandising system of claim 1 further comprising:

an order processing module that processes an email order received from the web application, based on an order placed by a consumer through the order guide.

3. The merchandising system of claim 1 further comprising:

a business function module executing on the business application computer to manage the merchandising database.

4. The merchandising system of claim 2 wherein the business function module provides access to product data stored in the merchandising database.

5. The merchandising system of claim 2 wherein the business function module provides access to vendor data stored in the merchandising database.

6. The merchandising system of claim 2 wherein the business function module provides access to customer data stored in the merchandising database.

7. The merchandising system of claim 2 wherein the business function module provides access to order data stored in the merchandising database.

8. The merchandising system of claim 1 further comprising:

a client replica generator executing on the web hosting computer to create a client replica for transmission to the client computer across an intermittent connection between the client computer and the web hosting computer.

9. The merchandising system of claim 7 wherein the client replica remains stored at the client computer after the intermittent connection between the client computer and the web hosting computer is terminated to provide a consumer with access to merchandising data stored in the client replica.

10. A merchandising system for processing a customer order in association with a web hosting computer, a client computer, and a business application computer, the web hosting computer and the business application computer being intermittently connected by a communications link, the merchandising system comprising:

a merchandising database containing merchandising data including order data pertaining to customer orders for merchandise and display characteristic parameters, the merchandising system managing merchandising data received from a plurality of vendors;

a replica generator executing on the business application computer to filter out at least the order data from the merchandising database to create a replica of the merchandising database containing the merchandising data without the order data for transmission to the web hosting computer across the intermittently connected communications link between the business application computer and the web hosting computer, the replica including the display characteristic parameters;

a web application receiving the replica at the web hosting computer from across the intermittently connected communications link and generating an order guide for displaying the merchandising data from the replica on the client computer, the order guide having display characteristics configured in accordance with the display characteristic parameters recorded in the replica; and a synchronization module synchronizing the replica with the merchandising database to cause only modifications made to the merchandising database to be updated in the replica.

11. The merchandising system of claim 9 further comprising:

a replica generator executing on the web hosting computer to create a client replica for transmission to the client computer across an intermittent connection between the client computer and the web hosting computer.

12. The merchandising system of claim 10 wherein the client replica remains stored at the client computer after the intermittent connection between the client computer and the web hosting computer is terminated to provide a consumer with access to the merchandising data stored in the client replica.

13. A computer program product encoding a computer program for executing on a business application computer system a computer process for processing orders for a plurality of vendors using a merchandising database storing merchandising data including order data, the orders being generated responsive to at least one selection entered at a client computer coupled to a web hosting computer, the computer process comprising:

generating a replica containing a subset of the merchandising data from the merchandising database by filtering out the order data pertaining to customer orders for merchandise;

establishing a communications link between the business application computer system and the web hosting computer;

transmitting the replica of the merchandising database to the web hosting computer for display in a web page on a client computer;

disconnecting the communications link between the business application computer system and the web hosting computer, responsive to the operation of transmitting the replica;

receiving an order from a customer based on the replica originating at the client computer, the order being received after the disconnecting operation via an independent communications link;

modifying the merchandising database in accordance with the order;

reconnecting the business application computer system to the web hosting computer;

synchronizing the replica with the merchandising database to cause only modifications associated with the modifying operation on the merchandising database to be updated in the replica, when the business application computer system is disconnected from the web hosting computer; and disconnecting the business application computer system from the web hosting computer.

14. The computer program product of claim 11 wherein the computer process further comprises:

detecting a conflict between the replica and the merchandising database;

presenting the conflict to a user; and resolving the conflict based on user input.

15. The computer program product of claim 11 wherein the computer process further comprises:

adding one or more display characteristic parameters to the replica, the display characteristic parameters specifying display characteristics of an order guide.

16. The computer program product of claim 13 wherein the computer process further comprises:

using the display characteristic parameters from the replica to dynamically generate the order guide.

17. The computer program product of claim 11 wherein the computer process further comprises:

detecting a variance in the order based on an expected value;

presenting the variance to a user for resolution; and resolving the variance based on user input.

18. A method of processing orders for a plurality of vendors using a merchandising database storing merchandising data including order data, the orders being generated responsive to at least one selection entered at a client computer coupled to a web hosting computer, the method comprising:

generating a replica at a business application computer containing a subset of the merchandising data from the merchandising database by filtering out the order data pertaining to customer orders for merchandise;

establishing a communications link between the business application computer and the web hosting computer;

transmitting the replica of the merchandising database to the web hosting computer for display in a web page on a client computer;

disconnecting the communication link between the business application computer and the web hosting computer, responsive to the operation of transmitting the replica;

receiving an order based on the replica from a customer originating at the client computer, the order being received after the disconnecting operation via an independent communications link;

modifying the merchandising database in accordance with the order;

reconnecting the business application computer system to the web hosting computer;

synchronizing the replica with the merchandising database to cause only modifications associated with the modifying operation on the merchandising database to be updated in the replica, when the business application computer is disconnected from the web hosing computer; and disconnecting the business application computer system from the web hosting computer.

19. The method of claim 18 further comprising:

reconnecting the business application computer system to the Web hosting computer;

synchronizing the replica with the merchandising database to cause only modifications associated with the modifying operation on the merchandising database to be updated in the replica, when the business application computer system is disconnected from the Web hosting computer; and disconnecting the business application computer system from the Web hosting computer.

20. The method of claim 15 wherein the generating operation comprises:

adding one or more display characteristic parameters to the replica, the display character parameters specifying display characteristics of an order guide.

21. The method of claim 16 further comprising:

using the display characteristic parameters from the replica to dynamically generate the order guide.

22. The method of claim 15 further comprising:

manipulating data in the merchandising database via the business application computer.

23. A merchandising system for managing merchandising data received from a plurality of vendors in association with a web hosting computer and a business application computer, the web hosting computer and the business application computer being communicatively coupled by an intermittently connected by a communications link, the merchandising system comprising:

a merchandising database containing merchandising data including order data pertaining to customer orders for merchandise and being managed by the business application computer;

a replica generator executing on the business application computer to filter out at least the order data from the merchandising database to create a replica of the merchandising database containing the merchandising data without the order data for transmission to the web hosting computer across the intermittently connected communications link for display on a web page of a client computer; and a synchronization module synchronizing the replica with the merchandising database to cause only modifications made to the merchandising database to be updated in the replica.

24. A method of managing merchandising data received from a plurality of vendors in association with a web hosting computer and a business application computer, the web hosting computer and the business application computer being communicatively coupled by an intermittently connected communications link, the method comprising:

maintaining a merchandising database containing the merchandising data and being managed by the business application computer, the merchandising data in the merchandising database including order data pertaining to consumer orders for the merchandise;

filtering out at least the order data from the merchandising database to create a replica of the merchandising database containing the merchandising data without the order data;

transmitting the replica to the web hosting computer across the intermittently connected communications link; and synchronizing the replica with the merchandising database to cause only modifications made to the merchandising database to be updated in the replica.

25. A computer program product encoding a computer program for executing a computer process for managing merchandising data received from a plurality of vendors in association with a web hosting computer and a business application computer, the web hosting computer and the business application computer being communicatively coupled by an intermittently connected communications link, the computer process comprising:

maintaining a merchandising database containing the merchandising data and being managed by the business application computer, the merchandising data in the merchandising database including order data pertaining to customer orders for merchandise;

filtering out at least the order data from the merchandising database to create a replica of the merchandising database containing the merchandising data without the order data;

transmitting the replica to the web hosting computer across the intermittently connected communications link for display in a web page on a client computer;

synchronizing the replica with the merchandising database to cause only modifications made to the merchandising database to be updated in the replica.

26. A merchandising system for managing merchandising data received from a plurality of vendors in association with a web hosting computer, a client computer, and a business application computer, the web hosting computer and the business application computer being communicatively coupled by an intermittently connected communications link, the merchandising system comprising:

a merchandising database containing the merchandising data including order data pertaining to customer orders for merchandise and display characteristic parameters and being managed by the business application computer;

a replica generator executing on the business application computer to generate a replica, said replica comprising a subset of the merchandising data from the merchandising database by filtering out at least the order data for transmission to the web hosting computer from across the intermittently connected communications link to allow generation of an order guide for displaying the merchandising data from the replica in a web page on the client computer, the order guide having display characteristics configured in accordance with the display characteristic parameters recorded in the replica; and a synchronization module synchronizing the replica with the merchandising database to cause only modifications made to the merchandising database to be updated in the replica.

27. A method of managing merchandising data received from a plurality of vendors in association with a web hosting computer, a client computer, and a business application computer, the web hosting computer and the business application computer being communicatively coupled by an intermittently connected communications link, the method comprising:

maintaining a merchandising database containing merchandising data that is managed by the business application computer, the merchandising data in the merchandising database including order data pertaining to customer orders for merchandise and display characteristic parameters;

accessing the merchandising database and generating a replica of a subset of the merchandising data from the merchandising database by filtering out at least the order data, the replica including the display characteristic parameters; and transmitting the replica to the web hosting computer from across the intermittently connected communications link to allow generation of an order guide for displaying the merchandising data from the replica in a web page on the client computer, the order guide having display characteristics configured in accordance with the display characteristic parameters recorded in the replica; and synchronizing the replica with the merchandising database to cause only modifications made to the merchandising database to be updated in the replica.

28. A computer program product encoding a computer program for executing a computer process for managing merchandising data received from a plurality of vendors in association with a web hosting computer, a client computer, and a business application computer, the web hosting computer and the business application computer being communicatively coupled by an intermittently connected communications link, the computer process comprising:

maintaining a merchandising database containing the merchandising data and being managed by the business application computer, the merchandising data in the merchandising database including order data pertaining to customer orders for merchandise and display characteristic parameters;

accessing the merchandising database and generating a replica of a subset of the merchandising data from the merchandising database by filtering out at least the order data, the replica including the display characteristic parameters; and transmitting the replica to the web hosting computer from across the intermittently connected communications link to allow generation of an order guide for displaying the merchandising data from the replica in a web page on the client computer, the order guide having display characteristics configured in accordance with the display characteristic parameters recorded in the replica;

synchronizing the replica with the merchandising database to cause only modifications made to the merchandising database to be updated in the replica.

29. A merchandising system for processing a customer order in association with a web hosting computer, a client computer, and a business application computer, the web hosting computer and the business application computer being communicatively coupled by an intermittently connected communications link, the merchandising system comprising:

a merchandising database containing the merchandising data including order data pertaining to customer orders for the merchandise, the merchandising system managing merchandising data received from a plurality of vendors;

a web host interface establishing the communications link with the web hosting computer;

a replica generator executing on the business application computer to filter out at least the order data form the merchandising database to create a replica containing the merchandising data without the order data for transmission to the web hosting computer across the intermittently connected communications link;

a web application executing on the web hosting computer and generating an order guide that displays at least a portion of the merchandising data from the replica on the client computer; and a synchronization module synchronizing the merchandising database and the replica.

30. A computer program product encoding a computer program for executing on a business application computer system a computer process for processing orders for a plurality of vendors using a merchandising database storing merchandising data including vendor data received from a plurality of vendors describing merchandise offered for sale by the vendors and order data pertaining to consumer orders for the merchandise, the orders being generated responsive to at least one selection entered at the client computer coupled to a web hosting computer, the computer process comprising:

generating a replica containing a subset of the merchandising data from the merchandising database by filtering out the order data pertaining to customer orders for merchandise;

establishing a communications link between the business application computer system and the web hosting computer;

transmitting the replica of the merchandising database to the web hosting computer for display in a web page on a client computer;

disconnecting the communications link between the business application computer system and the web hosting computer, responsive to the operation of transmitting the replica;

receiving an order from a customer based on the replica and originating at the client computer, the order being received after the disconnecting operation via an independent communications link;

modifying the merchandising database in accordance with the order;

reconnecting the business application computer system to the web hosting computer; and synchronizing the replica and the merchandising database.

31. A method of processing orders for a plurality of vendors using a merchandising database storing merchandising data including vendor data received from a plurality of vendors describing merchandise offered for sale by the vendors, the orders being generated responsive to at least one selection entered at a client computer coupled to a web hosting computer, the computer process comprising generating a replica at a business application computer containing the a subset of the merchandising data from the merchandising database by filtering out the order data pertaining to customer orders for merchandise;

establishing a communications link between the business application computer and the web hosting computer;

transmitting the replica of the merchandising database to the web hosting computer for display in a web page on a client computer;

disconnecting the communication link between the business application computer system from the web hosting computer, responsive to the operation of transmitting the replica;

receiving an order based from a customer on the replica, originating at the client computer, the order being received after the disconnecting operation via an independent communications link; and modifying the merchandising database in accordance with the order; and synchronizing the merchandising database with the replica.

* * * * *

UNITED STATES PATENT AND TRADEMARK OFFICE
CERTIFICATE OF CORRECTION

| | | |
|---|---|---|
| PATENT NO. | : 6,901,380 B1 | Page 1 of 18 |
| APPLICATION NO. | : 09/658286 | |
| DATED | : May 31, 2005 | |
| INVENTOR(S) | : Bremers | |

It is certified that error appears in the above-identified patent and that said Letters Patent is hereby corrected as shown below:

PLEASE DELETE THE TITLE PAGE 1 AND INSERT THE TITLE PAGE 1 AS ATTACHED.

PLEASE DELETE COLUMNS 1 LINE 1 - COLUMNS 32 LINE 52; AND INSERT COLUMNS 1 LINE 1 - COLUMNS 32 LINE 47 AS ATTACHED.

Signed and Sealed this

Fourteenth Day of April, 2009

JOHN DOLL
*Acting Director of the United States Patent and Trademark Office*

(12) United States Patent
Bremers

(10) Patent No.: US 6,901,380 B1
(45) Date of Patent: May 31, 2005

(54) MERCHANDISING SYSTEM, METHOD, AND PROGRAM PRODUCT UTILIZING AN INTERMITTENT NETWORK CONNECTION

(75) Inventor: Robert C. Bremers, Louisville, CO (US)

(73) Assignee: Dataforce, Inc., Louisville, CO (US)

( * ) Notice: Subject to any disclaimer, the term of this patent is extended or adjusted under 35 U.S.C. 154(b) by 599 days.

(21) Appl. No.: 09/658,286

(22) Filed: Sep. 8, 2000

Related U.S. Application Data

(60) Provisional application No. 60/189,755, filed on Mar. 16, 2000, and provisional application No. 60/153,410, filed on Sep. 10, 1999.

(51) Int. Cl.$^7$ .................................... G06F 17/60
(52) U.S. Cl. ........................ 705/27; 707/100
(58) Field of Search .................. 705/27, 26; 707/120, 707/100

(56) References Cited

U.S. PATENT DOCUMENTS

| 4,194,242 | A | | 3/1980 | Robbins |
| 5,319,542 | A | * | 6/1994 | King et al. .................. 705/27 |
| 5,592,375 | A | | 1/1997 | Salmon et al. |
| 5,694,551 | A | * | 12/1997 | Doyle et al. .................. 705/26 |
| 5,710,887 | A | | 1/1998 | Chelliah et al. |
| 5,758,328 | A | | 5/1998 | Giovannoli |
| 5,758,337 | A | * | 5/1998 | Hammond .................. 707/6 |
| 5,842,178 | A | | 11/1998 | Giovannoli |
| 5,848,421 | A | * | 12/1998 | Brichta et al. .............. 707/200 |

(Continued)

FOREIGN PATENT DOCUMENTS

| EP | 0 697 669 A2 | * | 2/1996 |
| WO | WO 94/28497 | * | 12/1994 |
| WO | WO 97/22943 | * | 6/1997 |

OTHER PUBLICATIONS

Webpages "store.yahoo.com"—excised from web.archive.org. Dated Mar. 2, 1999 [A], Feb. 9, 1999 [B], Feb. 21, 1999 [C].*
"The online Selling Game" (Abel, Amee. Sep. 1999. Home Office Computing).*
"Take a Load off" (Ray, Garrett N. Sep. 2, 1996. Computerworld).*

(Continued)

*Primary Examiner*—Jeffrey A. Smith
*Assistant Examiner*—Sabrina Chang
(74) *Attorney, Agent, or Firm*—Hensley Kim & Edgington, LLC

(57) ABSTRACT

A business application integrates a company's internal business systems with an e-commerce web site, so that company personnel can manage their business with a business application that seamlessly exports relevant, up-to-date data to a web site designed to interact with customers across the Web. The business application provides business functions for manipulating merchandising data stored in a merchandising database. In addition, to accommodate an intermittent connection to the Internet or otherwise to the web hosting server, the business application supports the generation of a replica, from the merchandising database, that can be exported to a web hosting server. A web application executing at the web hosting server generates web pages based on merchandising data stored in the partial replica. The customer can provide feedback, possibly representing purchase orders or customer information changes, for example, that can be automatically entered into the company's business system. Alternatively, the customer can download a client replica, generated from the partial replica at the web hosting server, for use during periods of disconnection from the web hosting server. Thereafter, the client replica and the partial replica can be synchronized to update each other with modified data. Furthermore, the partial replica and the merchandising database can also be synchronized.

30 Claims, 27 Drawing Sheets

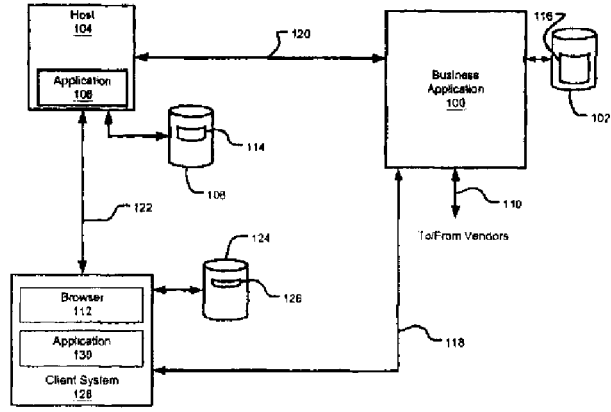

MERCHANDISING SYSTEM, METHOD, AND PROGRAM PRODUCT UTILIZING AN INTERMITTENT NETWORK CONNECTION

CROSS-REFERENCE TO RELATED APPLICATIONS

The present application claims benefit of U.S. Provisional Patent Application No. 60/153,410 entitled "A MERCHANDISING SYSTEM TO ACCEPT AND RELAY PURCHASE ORDERS ONLINE WITH METHODS FOR MAINTAINING THE DATABASE UTILIZING AN INTERMITTENT CONNECTION" and filed Sep. 10, 1999, and U.S. Provisional Patent Application No. 60/189,755, entitled "MERCHANDISING SYSTEM UTILIZING A CLIENT REPLICA FOR ACCEPTING AND RELAYING ORDERS" and filed Mar. 16, 2000, both of which are incorporated herein by reference for all that they disclose and teach.

TECHNICAL FIELD

The invention relates generally to electronic commerce systems, and more particularly to a merchandising system utilizing an intermittent network connection.

BACKGROUND OF THE RELATED ART

Electronic commerce ("e-commerce") is relevant to many segments of the economy. For many years, companies have used Electronic Data Interchange (EDI) technology to communicate data, such as purchase orders, invoices, and electronic payments, via a communication network with other companies. Because EDI relies on contractually established procedures and interfaces, EDI primarily addresses a predetermined set of company-to-company transactions. Furthermore, setup and maintenance of EDI systems can be an expensive prospect, often precluding its use by smaller companies.

In the past, the communications connections between companies have included dial-up access and direct connections between the companies' networks. Furthermore, the technical sophistication that is required to support an EDI system is significant. With the advent of the Internet, more companies have easy access to the Web sites and extranets of other companies, promising to lower the costs of EDI for the foreseeable future. Nevertheless, cost and technical requirements remain significant obstacles preventing some companies from employing EDI.

Another more recently developing segment of e-commerce involves retailers and customers. In the retailing segment of e-commerce, a customer can go online to access a retailer's e-commerce web site to conduct business, such as researching and purchasing products and services, managing their financial assets, and obtaining technical support. The web site provides an interface to data, such as customer data, product data, and transaction data, and applications, such as a purchase application or a credit card processing application. It is said that most retailers must now have an Internet presence to be competitive players in their markets. However, the costs and technical complexity of developing and maintaining an e-commerce web site also prevent some retailers from doing business on the Web.

A third segment of e-commerce relates to wholesale transactions between vendors and retailers. For example, a grocery store may order a shipment of cheese from a cheese vendor, such as KRAFT or a small specialty cheese supplier/distributor. For some vendors, particularly smaller vendors, the grocer places such orders through a wholesale broker, who represents multiple vendors. Typically, such orders are placed via telephone calls or faxes between the grocer and the broker, who calls or faxes the vendor to place the order. While a large vendor may have the resources to maintain an e-commerce web site for such orders, smaller vendors and brokers tend to be left out of the e-commerce world because of cost and technical complexity issues.

Typically, an e-commerce website is hosted on a web server computer. Some companies internally maintain the web server and develop the software executing on the web server. Alternatively, many companies exist to provide such Web hosting services to a wide variety of businesses. Likewise, the development of web pages and application executed on the web server can also be contracted out to web development companies. However, to smaller companies, the costs and/or technical sophistication required to establish and maintain a web presence, even with the assistance of these Web hosting and development companies, may prevent their participation in the e-commerce revolution. Often, the economies of scale that would initially allow such a larger company to invest the resources into developing and maintaining an e-commerce solution are not available to a smaller company. Even approaches that allow a company to access and maintain its e-commerce web site (on another company's web hosting server) through a browser interface present financial obstacles (e.g., significant storage, connection, and bandwidth charges) and technical obstacles (e.g., the time and substantial technical understanding to make customizations through an interface that is not the same as the company's standard business application's interface). Accordingly, another approach for providing an easy, low-cost e-commerce solution is desirable.

SUMMARY OF THE INVENTION

The above and other problems are solved by a system that integrates a company's internal business systems with an e-commerce web site, so that company personnel can manage their business with a business system that seamlessly imports and/or exports relevant, up-to-date data to a web site designed to interact with customers across the Web. Furthermore, an embodiment of such a system may provide feedback, possibly representing purchase orders or customer information changes, for example, that can be automatically entered into the company's business system.

In one embodiment of the present invention, a user can maintain the web site data and display characteristics (e.g., web site fonts, layout, images, etc.), as well as process consumer and vendor transactions, without having to maintain the data and operation via an alternative user interface. For example, the business application can provide the exclusive interface to the merchandising data, web site display characteristics, and order processing. In such an embodiment, no intermediary or translation module is required to map data (more particularly, data in given tables, rows, and fields) into alternative data configuration for use on the web site. Instead, the databases associated with the business application and the replica used by a web application at the web site may be consistent (and still need not be identical) so as to facilitate rapid synchronization. For example, in one embodiment, only marked differences between the merchandising database and the replica are synchronized, thereby reducing the time and bandwidth required for synchronization, although the present invention is by no means limited to this particular embodiment.

In one embodiment of the present invention, a merchandising system for processing a customer order in association with a Web hosting computer, a client computer, and a business application computer is provided. The Web hosting computer and the business application computer are intermittently connected by a communications link. A merchandising database contains order data. A web host interface establishes the communications link with the web hosting computer. A replica generator executes on the business application computer to filter out at least the order data from the merchandising database, to create a replica, and to transmit the replica to the web hosting computer across the intermittent connection. A web application executes on the web hosting computer to generate an order guide that displays data from the replica on the client computer system.

In another embodiment of the present invention, a merchandising system for processing a customer order in association with a Web hosting computer, a client computer, and a business application computer is provided. The Web hosting computer and the business application computer are intermittently connected by a communications link. A merchandising database contains order data and display characteristic parameters. A business application accesses the merchandising database and generates a replica of at least a portion of the merchandising database. A web application receives the replica at the Web hosting computer and generates an order guide displaying data from the replica on the client computer system. The order guide includes display characteristics configured in accordance with display characteristic parameters recorded in the replica.

In another embodiment of the present invention, a method of processing orders using a merchandising database storing merchandising data is provided. The orders are generated responsive to at least one selection entered at a client computer coupled to a Web hosting computer. A replica is generated containing at least some of the merchandising data from the merchandising database. A communications link is established between a business application computer system executing a business application and the Web hosting computer. The replica of the merchandising database is transmitted to the Web hosting computer for display in a web page on a client computer. The communications link is disconnected between the business application computer system and the Web hosting computer, responsive to the operation of transmitting the replica. An order based on the replica and originating at the client computer is received after the disconnecting operation via an independent communications link. The merchandising database is modified in accordance with the order.

In other implementations of the present invention, articles of manufacture are provided as computer program products. One embodiment of a computer program product provides a computer program storage medium readable by a computer system and encoding a computer program for executing a computer process for processing orders using a merchandising database storing merchandising data. Another embodiment of a computer program product may be provided in computer data signal embodied in a carrier wave by a computing system and encoding the computer program for processing orders using a merchandising database storing merchandising data. The computer program product encodes a computer program for executing on a computer system a computer process for processing orders using a merchandising database storing merchandising data. The orders are generated responsive to at least one selection entered at a client computer coupled to a Web hosting computer. A replica is generated containing at least some of the merchandising data from the merchandising database. A communications link is established between a business application computer system executing a business application and the Web hosting computer. The replica of the merchandising database is transmitted to the Web hosting computer for display in a web page on a client computer. The communications link is disconnected between the business application computer system and the Web hosting computer, responsive to the operation of transmitting the replica. An order based on the replica and originating at the client computer is received after the disconnecting operation via an independent communications link. The merchandising database is modified in accordance with the order.

These and various other features as well as other advantages, which characterize the present invention, will be apparent from a reading of the following detailed description and a review of the associated drawings.

BRIEF DESCRIPTION OF THE DRAWINGS

FIG. 1 illustrates a merchandising system in an embodiment of the present invention.

FIG. 2 illustrates more details of a merchandising system in an embodiment of the present invention.

FIGS. 3A-3K illustrate an exemplary database schema of a merchandising database in an embodiment of the present invention.

FIG. 4 illustrates components of a business application in an embodiment of the present invention.

FIG. 5 depicts a business application screenshot of a "Parent" window in an embodiment of the present invention.

FIG. 6 depicts a business application screenshot of a "Customer" window in an embodiment of the present invention.

FIG. 7 depicts a business application screenshot of a "Vendor" window in an embodiment of the present invention.

FIG. 8 depicts a business application screenshot of a "Contact" window in an embodiment of the present invention.

FIG. 9 depicts a business application screenshot of a "Product" window in an embodiment of the present invention.

FIG. 10 depicts a business application screenshot of an "Order" window in an embodiment of the present invention.

FIG. 11 depicts a business application screenshot of an "EDI" window in an embodiment of the present invention.

FIG. 12 depicts a business application screenshot of a "Representative" window in an embodiment of the present invention.

FIG. 13 depicts a screenshot of an "Order" web page in an embodiment of the present invention.

FIG. 14 depicts screenshot of an "Order" web page populated with selected products in an embodiment of the present invention.

FIG. 15 depicts a screenshot of an "Order Review" web page in an embodiment of the present invention.

FIG. 16 depicts an exemplary computer system that can be useful in an embodiment of the present invention.

FIG. 17 depicts a screenshot of order processing by a business application in an embodiment of the present invention.

FIG. 18 depicts a screenshot of a dialog box indicating that an email order has been located in the inbox of the business user in an embodiment of the present invention.

FIG. 19 depicts a message box indicating a date variance in an embodiment of the present invention.

FIG. 20 depicts operations for processing orders using a merchandising database in an embodiment of the present invention.

DETAILED DESCRIPTION OF EMBODIMENTS OF THE INVENTION

FIG. 1 illustrates a merchandising system in an embodiment of the present invention. An exemplary business application 100 assists a user in performing important business functions, such as taking orders, tracking commissions, managing a product catalog, and managing customer relationships. For example, a user may be an employee of a broker agency, having one or more independent sales representatives who represent vendors in wholesale transactions in a given geographic or demographic market. Although an independent sales representative (or "broker") is discussed in association with an exemplary embodiment of the present invention, other users are contemplated with the scope of the present invention, including without limitation manufacturers, distributors, and retailers. In addition, some specific users and consumers of embodiments of the present invention may include without limitation retailers providing web-based shopping list, recipe, or bridal registry support, rack jobbers, construction project managers, hardware stores helping home owners with organizing home repair or improvement projects, adventure outfitters organizing and outfitting an outing, and travel vendors or travel integrators providing a complete solution for travelers.

For clarification of the exemplary embodiment involving the broker agency, it should be understood that a broker agency typically employees for contracts with one or more independent sales representatives. Another term for a broker, provided by the U.S. Department of Labor, is a "manufacturer's agent", wherein a broker agency is a "manufacturer's agency". Each sales representative represents a set of manufacturers, distributors, or service providers to other entities in a supply chain. In a concrete example, a representative may represent a specialized tea vendor in wholesale transactions with a regional retailer (e.g., grocery store or tea shop). The retailer would contact the representative and place an order for a given tea. The representative would then contact the vendor to place the order and have the tea shipped to the retailer. Each of the parties to the transaction (i.e., the retailer, the representative, and the vendor) gain benefit from this relationship. For example, the retailer can contact a representative to order a variety of products from multiple vendors, rather than contacting each vendor individually. The vendors receive marketing and customer contact services through the brokerage in exchange for a commission provided to the brokerage and the representatives for each order.

Continuing with the example of a broker agency, the business application 100 provides the broker agency with an interface to the agency's business, such as data relating to vendors, customers, orders, products, prices, commissions, and individual agents/representatives employed by the agency. Such data may be stored in a merchandising database 116 of storage medium 102, which is coupled to the business application 100. The business application 100 also provides important business functionality, such as conditions tracking, order processing, reporting, and automated pricing. The business function capabilities of an exemplary business application are discussed in more detail relative to other Figures in this description.

The business application 100 may also include a communications link 110 for communicating with the computer systems of one or more vendors. The communications link 110 represents a logical or physical data link between two or more entities. In embodiments of the present invention, a communications link may include without limitation the Internet, the WAN, a LAN, a broadband network, a satellite or otherwise wireless communications link (e.g., such as wireless link supporting WAP, the Wireless Application Protocol), a dial-up connection, and other known communications links. Through the communications link 110, the business application 100 may receive relevant merchandising data from each vendor the agency represents. Exemplary merchandising data may include without limitation product and service catalogs, invoices, price lists, status of orders, payment terms, shipping terms, and communications from the vendor. The merchandising data communicated by communications link 110 may be stored by the business application 100 in the merchandising database 116 along with other business and merchandising data generated by or collected from other sources.

In addition, the business application 100 also allows the agency to export a relevant portion (i.e., a filtered replica 114) of its merchandising database 116 to a storage medium 108 of a Web hosting server 104 to support an e-commerce application 106, which executes on the server 104. The filtered or partial replica 110 is a subset of the merchandising database 116 and may also be considered another merchandising database in its own right. For example, in the illustrated embodiment, the replica is used to support a consumer's placement of orders. As such, historical order details are not required through an e-commerce application 106 and may be filtered out when the replica is generated. Replicas may contain a unique identifier to assist in determining the level of trust associated with the replica and its user. Such an identifier may be encrypted, signed, or authenticated by certificate. In addition, although a partial replica is associated with the illustrated embodiment in FIG. 1, it should be understood that some embodiments of the present invention may employ a full replica (i.e., including all data from the merchandising database 116) at the web hosting server 104, depending on the configuration of the merchandising database and the operational requirements of the e-commerce application or the structural requirements of a client replica 126.

The e-commerce application 106 provides the agency with the capability of marketing products for the agency-represented vendors to a larger market (i.e., potentially unrestricted by geographical limitations). In addition, the e-commerce application 106 presents the agency with the opportunity to market products and process orders more efficiently than via the traditional telephone and fax communication channels.

When the business application 100 exports the filtered replica 114 to the Web hosting server 104 via a communications link 120, the application 100 preferably connects with the server 104 via an intermittent connection (i.e., the connection is established during the transfer of data between the business application 100 and the Web hosting server 104, and thereafter terminated). Alternatively, the connection may remain in place while communications over the connection are intermittent. By maintaining intermittent connections or communications, the agency may save communication charges and preserve resources by updating the filtered replica 114 periodically, rather than continuously. For example, the filtered replica 114 can represent a "snapshot" of a relevant subset of the business and merchandising data exported from the merchandising database 116.

It should be understood that a connection between a business application computer system and a Web hosting computer may be logical in nature and does not imply a physical connection. Indeed, wireless communications are also contemplated within the scope of the present invention. In contrast to a physical connection, a logical connection can be established between two computers on the basis of various communication protocols in which the sender and the receiver are identified in accordance with a predefined scheme. For example, TCP/IP ("Transmission Control Protocol/Internet Protocol") connections employ an addressing scheme in which a communications link is established between a sender and a receiver on the basis of unique address assigned to both. As such, the sender can transmit a message addressed to the receiver into the Internet. Within the Internet, routers direct the message to the appropriate receiver based on the message's destination address.

An alternative communications link can be established by email, in which addressing is based on an email address of a receiver. Although some email systems may be based on TCP/IP addressing at one level of the communications protocol stack (e.g., the email addresses of the sender and receiver may sometimes be resolved to individual TCP/IP addresses), email itself is based on a different type of addressing (e.g., "receiving@destination.com"). In fact, email origins and destinations, and indeed some forms of email itself, need not be based on TCP/IP addressing. As such, the TCP/IP connection between the Web hosting computer and the business application computer is deemed to be an independent communications link to that established by email. In addition, individual logical connections, separated by one or more intermittent disconnections, are deemed to be independent communications links. Alternative communications links may also be employed, including without limitation telephone communications, fax communications, dial-up connections, wireless communications including wireless Internet connections and satellite links, and postal mail.

In an embodiment of the present invention, a retailer or other purchasing entity (e.g., a "customer" or a customer's representative) may use a browser 112 on client system 128 to access via a communications link 122 a web page generated or otherwise provided by the e-commerce application 106. Through this web page interface, the customer may browse product information, place or modify orders, and communicate with the agency or vendors associated with the merchandising information (e.g., product numbers, descriptions, available quantities, lead times, back orders, inventory characteristics, etc.) of the partial replica 114 stored in the storage media 108.

In an alternative embodiment, another replica 126 may be exported from the replica 114 and stored on client storage medium 124. This embodiment allows a customer to take advantage of an intermediate connection with the host 104. The replica 126 may be full or partial, depending on the given application of the system. Once exported to the client system, the replica 126 can be accessed by a client-based application 130. Such an application 130 can allow the customer to read or modify the replica 126 or select items for ordering via communications link 118, which provides a logical connection between the client system 128 and the business application 100 that is independent of the logical connection between the host 104 and the business application 100. The partial replicas 126 and 114 also support bi-directional synchronization there between.

In one embodiment, the communications links 118, 120, and 122 may be Internet connection through an Internet Service Provider (ISP) or some other network access point. Alternatively, direct dial-up connections or any other direct or indirect connections to the host server 104, the browser 112, and the business application 100 are contemplated within the scope of the present invention. It should be understood, however, that although three separate communication links are shown in FIG. 1, all of the communication links may include Internet connections through one or more network access points or service providers. For example, in one configuration, the communications link 122 may be an Internet connection through the customer's ISP to the host server 104, while the communications link 118 may be the Internet connection to the customer's ISP coupled to an email communication through the ISP's mail server or some other mail service. This example, however, should not be read to limit such a mail service from being hosted on the server 104.

The partial replica 114 can also be bi-directionally synchronized with the merchandising database 116 with sufficient frequency, despite the intermittent connection, to maintain adequate consistency between the two sets of data. For example, if a user merely read accesses the merchandising database 116 or if a customer merely read accesses the partial replica 114, no synchronization is necessary. Likewise, if the customer places an order for one item based on an available quantity represented in the partial replica, the application 106 can flag that one item as tentatively purchased while the order is communicated to the business application 100 via communications link 118. If the order is consummated within the business application 100 and the merchandising database 116, a synchronization between the business merchandising database and the partial replica 114 can occur upon the next scheduled synchronization event, in response to an acknowledgement of the order from the vendor, or in response to another asynchronous event that triggers a synchronization (e.g., an inventory update received from a vendor). At the time of the synchronization, modifications in either or both of the merchandising database 116 and the partial replica 114 can be communicated via communications link 120 to maintain consistency between the two databases.

In an embodiment of the present invention, an order generally consists of two parts: (1) an order header, and (2) line item details. The order header may include without limitation shipment and payment information, such as parties to the order, a shipping address, a billing address, payment terms, order date, contact phone numbers, and a cancel date. In the line item details portion of an order, information such as an order identifier, an item or product number, the quantity, the price, and other order options (e.g., color or size) may be included for each product ordered. Other information may also be included within the order header and line item details within the scope of the present invention.

FIG. 2 illustrates more details of a merchandising system in an embodiment of the present invention. The business application 200 is coupled to the merchandising database storing merchandising data at a business application computer 204. The merchandising database 202 is manipulated through the business application 200 in the course of the agency's business operations. An authorized representative or administrator who has an account in the business application 200 may interact with the business application 200 by way of an input device 228 (e.g., the keyboard, a balance, the touch screen, or a microphone) and an output device 230 (e.g., a monitor, a printer, or a speaker). The broker agency may continue to receive retailer's orders by phone and fax, entering the orders into the merchandising database 202 via the business application 200. Alternatively, orders may be received electronically, such as via e-mail, HTTP (hypertext transport protocol) communications, ftp (file transfer protocol), dial-up connections, and other electronic communication means via a communications link 222. In an embodiment of the present invention, electronically received orders may be entered into the merchandising database 202 automatically, and the orders may be transferred to the appropriate vendors automatically via a communications link 206 (e.g., a network connection, a phone line, a fax line, etc.).

In an embodiment of the present invention, incoming orders may be processed by the business application 200 to detect and potentially resolve variances before being authorized and communicated to a vendor. Variances can be detected based on expected value (e.g., variances may include an order having an amount greater than a given credit limit or a lapsed shipping date). A notice of a variance may be presented to a business user for resolution (e.g., authorizing a higher credit limit or modifying the shipping date).

A filtering process (i.e. used in a replication operation), represented by the funnel symbol 208, processes the merchandising data in the merchandising database 202 and generates a replica 210 of some or all of the merchandising data. The merchandising database 202 can include a wide variety of merchandising data, some of which is unnecessary to the operation of an e-commerce application 212. Accordingly, the replica 210 is preferably, although not necessarily, smaller than the original merchandising database 202. The filtering process, therefore, minimizes the bandwidth required to transmit the replica to the Web hosting server 214 and minimizes the storage space occupied by the replica at the Web hosting server 214. The replica 210 is then transferred via a communications link 224 for storage in a storage medium of the Web hosting server 214. Because use of communication channels and Web hosting servers are commonly charged on a communications bandwidth/time basis and a storage space basis, respectively, generation and transmission of (and synchronization with) the minimized replica 224 is a more cost-effective Web-resident representation of relevant merchandising data than the entire merchandising database 202.

The filtering processing may also be employed during synchronization so that only fields included in both the merchandising database 202 and the replica 224 are synchronized, and furthermore, fields that are not to be included in one or the other are removed from the appropriate database 116 or replica 114. For example, in one embodiment of the present invention, order details are omitted from the replica 114 during replication and synchronization. However, between synchronization, order details from new orders may be placed by consumers via the web site and thereafter recorded in the replica 114. Accordingly, during synchronization, the new order details in the replica 114 are added to the merchandising database 116 and deleted from the replica 114. In this manner, orders can be communicated via the synchronization operation through the replica without historical order details being perpetually maintained in the replica 114. Alternatively, orders may be communicated to the business application 200 via an independent communication link, such as email.

In an alternative embodiment of the present invention, a client replica generator 250 can be executed on the Web hosting server 214 upon request from a customer using the client system 216. The client replica generator 250 can generate a client replica (see client replica 126 in FIG. 1) that is recorded at the client system 216. Accordingly, once the client replica is recorded at the client system 216, the client system 216 can disconnect from the Web hosting server 214 and continue to have access to appropriate merchandising data recorded in the client replica. If changes are made to the data in the client replica, the customer can trigger a synchronization between the partial replica 210 at the Web hosting server 214 and the client replica at the client system 216. Thereafter, the partial replica 210 can also be synchronized with the merchandising database 202 for processing by the business application 200. This process accommodates intermittent connections between the business application 200 and the Web hosting server 214, as well as between the Web hosting server 214 and the client system 216.

In an embodiment of the present invention, a retailer or other purchasing entity may use a browser on a client system 216 to access one or more web pages 218 generated by the e-commerce application 212. Through this web page interface, the purchaser may browse product information, place or modify orders, and communicate with the agency or vendors associated with the product information of the replica 210, which is preferably stored in a storage medium coupled to or within the Web hosting server 214. A client-based replica 232 in the client system 216 may also be exported from and synchronized with the web-hosting server 214 to support intermittent connection there between.

The e-commerce application 212 in the illustrated embodiment employs an Active Server Page (ASP) that is coupled to the replica data to dynamically generate the web page 218. Alternatively, other means of generating authoring language data (e.g., data in formats such as Hypertext Markup Language (HTML), Standard Generalized Markup Language (SGML), Jscript, Java, Extensible Markup Language and (XML)) and communicating with back end databases and applications (i.e., Common Gateway Interface (CGI)) are contemplated within the scope of the present invention. Screenshots of exemplary web pages are illustrated in FIGS. 13 through 15. The customer can access the merchandising data stored in the replica 210 on the Web hosting server 214 and submit an order 220 to the business application 200.

It should be understood at the communications link 222 by which the order 220 is transferred to the business application 200 may be independent of or different than the communications link 224. This distinction is particularly important when the communications link 224 is used to establish an intermittent connection between the business application 200 and the Web hosting server 214. A purchaser may access the merchandising data in the replica 210 on the Web hosting server 214 and place orders to the business application 200 even when the business application 200 is not connected to the Web hosting server 214. Alternatively, the communications link 222 may be the same as the communications link 224, particularly if the connection between the business application 200 and the Web hosting server 214 is active (i.e., not terminated).

In one embodiment of the present invention, the order 220 is communicated to the business application 200 through an e-mail subsystem 226. For example, the purchaser submits the order 220 through the web page 218, and an e-mail subsystem 226 causes the order 226 to be included in an e-mail message addressed to an authorized entity that has an account in the business application 200. It should be understood that the email subsystem 226 in an embodiment of the present invention can be coupled to an email server via a network connection to assist in the delivery of the order 220. It should also be understood that the web page 218 may be a displayed representation of authoring language data received from the Web hosting server (e.g., in a Hypertext Transport Protocol (HTTP) response).

In a vendor setup operation (e.g., the process of adding a new vendor to the merchandising database 202 for display the "Vendor" window shown in FIG. 7), an indication can also be specified to cause a copy of an order (e.g., an email order) to be sent directly to the vendor in the vendor's chosen format, essentially duplicating the order being sent to the business application 200. In an alternative embodiment, an indication can be specified that causes a copy of the order to be sent to the customer or the appropriate representative as the order is sent to the vendor.

FIGS. 3A-3K illustrate an exemplary database schema of a merchandising database in an embodiment of the present invention. Each block represents a table in the relational merchandising database of an embodiment of the present invention. Alternative embodiments may include fewer tables, different tables, or additional tables in accordance with the data needs and functional needs of the merchandising system. In addition, aspects of the present invention may be implemented in other database forms, including a flat database.

Each block is marked in association with a "1" or a "∞". If two blocks are connected by a line having a "1" on one block and a "∞" on the other block, the connection represents a "one-to-many" relationship. Alternative, if the connection is marked with a "1" on each side, the connection represents a "one-to-one" relationship. In a relational database, unique identifiers associated with given table rows are used to relate data in one table to data in another. A "one-to-one" indicates that a Table A can have only one matching record in Table B, and each recording in Table B can have only one matching recording in Table A. A "one-to-many" relationship indicates that a record in Table A can have many matching records in Table B, but a record in Table B can have only one matching record in Table A.

FIG. 3A depicts table relationships associated with a "Contacts" table in an embodiment of the present invention. A "Contacts" table 300 may contain information relating to various contacts, including without limitation some of the information displayed in FIG. 8. A "VendorContacts" table 302 includes references to the Contacts table 300 (e.g., unique identifiers of rows in the Contacts table 300) identifying those contacts in the Contacts table 300 that are related to vendors. A "ParentCompanyContacts" table 304 includes references to the Contacts table 300 identifying those contacts in the Contacts table 300 that are related to a given parent company. A "Communications" table 306 includes contains information relating to the Communications fields 818 of FIG. 8 and references data in the Contacts table 300. A "CustomerContacts" table 308 includes references to the Contacts table 300 and a "Customers" table (see Customers table 314 in FIG. 3B) identifying those contacts in the Contacts table 300 that are related to a referenced customer in Customers table 314 of FIG. 3B. An "Employees" table 310 includes references to the Contacts table 300 to identify those contacts in the Contacts table 300 that are related to a given employees of the business (e.g., the brokerage), such as manufacturer's agents. An "Orders" table 312 includes some of the information relating to the "Order" window of FIG. 10 and references the Contacts table 300 to identify those contacts in the Contacts table 300 that are related to a given order.

FIG. 3B depicts table relationships associated with a "Customers" table in an embodiment of the present invention. A "Customers" table 314 may contain information relating to various Customers, including without limitation some of the information displayed in FIG. 6. A "Customer-Contacts" table 308 (also shown in FIG. 3A) includes references to the Customers table 314 and the Contacts table 300 of FIG. 3A identifying those customers in the Customers table 314 that are related to contacts in the Contacts table 300 of FIG. 3A. A "CustomerLinks" table 316 includes information relating the URLinks, such as data displayed by the Links" tab 622. The Order table 312 (see also FIG. 3A) also references the data in the Customers table 314. A "VendorCustNo" table 322 includes contains information relating to the "Cust#" tab 624 of FIG. 6 and references data in the Customers table 314. A "CustomerType" table 324 includes data indicating the customer type (see Customer Type field in fields 610 of FIG. 6) and references to the Customers table 314. A "CPmt" table 326 includes data relating to customer payments on given orders.

FIG. 3C depicts table relationships associated with an "Employees" table in an embodiment of the present invention. An "Employees" table 310 may contain information relating to various Customers, including without limitation some of the data associated with FIG. 12. A "Customers" table 314 (also shown in FIG. 3B) includes references to the Employees table 310 as well as other tables and identifies those customers related to employees in the Employees table 310. For example, an employee may be a manufacturer's agent working for a brokerage. Accordingly, the employee may be associated with one or more of the brokerage's customers through on-site visits, orders, or other means. The "Orders" table 312 includes references to employee data in the Employees table 310. A "ParentCompanies" table 328 includes data relating to the parent companies accessible through the "Parent" window in FIG. 5, and references the Employees table 310, as represented by the "ParentList tab 1212 of FIG. 12. A "RepLinks" table 330 includes URLinks to web sites and data associated with a given employee and references the given employees in the Employees table 310. The "RPmt" table 332 includes data relating to commission payments to employees (e.g., representatives) and references the appropriate employee data in the Employee table 310. The "VendorRepNo" table 334 includes data identifying the employee using a vendor's identifier and references the appropriate employee in the Employee table 310.

FIG. 3D depicts table relationships associated with an "Orders" table in an embodiment of the present invention. An "Orders" table 312 may contain information relating to various Orders, including without limitation some of the data associated with FIG. 10. In one embodiment, the Orders table 312 contains order header information. In addition, each line item detail of an order is recorded in the "Order-Details" table 336, which references the associated order header in the Order table 312. Combined, the Orders table 312 and the OrderDetails table 336 store "order data". A "CreditCard" table 338 includes data for processing an order payment using a credit card number and references the associated order in the Orders table 312. A "Transmitted" table 340 includes some of the data associated with the fields 1044 in FIG. 10 and references the associated orders in the Orders table 312. A "ContractPricing" table 342 includes information relating to discounts based on specific contracts among parent companies, vendors, customers, representatives, and the brokerage, and references associated orders in the Order table 312. A "Departments" table 344 includes data describing the customer's department from which the order originates or is destined, and is referenced from the Orders table 312.

FIG. 3E depicts table relationships associated with a "ParentCompanies" table in an embodiment of the present invention. The "ParentCompanies" table 328 may contain information relating to various parent companies of customers and vendors, including without limitation some of the data associated with FIG. 5. The "ContractPricing" table 342 includes information relating to discounts based on specific contracts among parent companies and at least one of vendors, customers, representatives, and the brokerage, and references associated parent company in the ParentCompanies table 328. The "Customers" table 314 references the parent company of each customer in the ParentCompany table 328, if the customer has a parent company. The "ParentCompanyContacts" table 304 references the parent company with which a given contact is associated. A "ParentLinks" table 342 includes URLink data for associated parent companies.

FIG. 3F depicts table relationships associated with a "Position" table in an embodiment of the present invention. The "Position" table 344 may contain information relating to a contacts position within a customer's business, a parent company's business, or a vendor's business (e.g., field 850 in FIG. 8). Associations with the corresponding customer, parent company, and vendor are made in tables 304, 308, and 346.

FIG. 3G depicts table relationships associated with a "ContractPricing" table in an embodiment of the present invention. The "ContractPricing" table 348 may contain information relating to specialty pricing defined by contracts with various parent companies, representatives, customers, and vendors. A "Contract" table 350 includes the terms of a given contract and references in corresponding pricing in the ContractPricing table 348.

FIG. 3H depicts table relationships associated with a "PriceList" table in an embodiment of the present invention. The "PriceList" table 352 may contain information relating to various price lists, such as price list associated wholesale customers, retail customers, and distributor customers. The "VendorCustNo" table 322 contains information relating to the "Cust#" tab 624 of FIG. 6 and references data in the PriceList table 352.

FIG. 3I depicts table relationships associated with a "Products" table in an embodiment of the present invention. The "Products" table 354 may contain information relating to various products available through the brokerage or other merchandising entity, such as a retailer, vendor, etc. The "Promotions" table 356 contains information relating to the "Promotions" fields 908 of FIG. 9 and references the associated products data in the Products table 352.

FIG. 3J depicts additional table relationships associated with an "Orders" table in an embodiment of the present invention. The "Orders" table 312 may contain information relating to various products available through the brokerage or other merchandising entity, such as a retailer, vendor, etc. The "RPmt" table 332 contains information relating to the representative payments (e.g., commissions) and references the associated order data in the Order table 312. A "Shippers" table 358 contains information relating to the shipping company or companies used to transport the order referenced in the Orders table 312 (see the "Ship Via" field in fields 1024 of FIG. 10). A "VPmt" table 360 contains information relating to the payment to the vendor for the product ordered and references the associated order in the Orders table 312.

FIG. 3K depicts table relationships associated with a "Vendors" table in an embodiment of the present invention. The "Vendors" table 362 may contain information relating to various vendors represented by the brokerage (see FIG. 7).

A "VPmt" table 360 contains information relating to the payment to the vendor for the product ordered and references the associated vendor in the Vendors table 362. A "Categories" table 364 contains information describing commission categories or commission percentages associated with a given category of product for a given vendor. The Categories table 364 also references the associated vendor in the Vendors table 362. The "ContractPricing" table 342 references the vendor associated with a given element of contract pricing, based on a contract between a vendor and other party (e.g., customer, representative, brokerage, etc.). The "Orders" table 312 references the vendor involved in the order. The "Pricelist" table 352 references the vendor associated with a given prices list. The "Products" table 354 references the referenced vendor that can supply a given product in the Vendor table 362. The "VendorContacts" table 346 references a vendor with which a contact is associated. The "VendorCustNo" table 322 contains an identifier that a referenced vendor associates with a given customer. The "VendorLinks" table 366 identifies URLinks associated with referenced vendors. The "VendorLinks" table 334 identifies an identifier that a referenced vendor has assigned to a given representative.

In one embodiment of the present invention, the order and order details are filtered out when generating or synchronizing with the replica that is stored to the hosting server. In many circumstances, the order and order detail data comprise a significant portion of the merchandising database size, and therefore, the automatic filtering of such data from the replica minimizes the storage, time, and bandwidth costs of maintaining the e-commerce web site using the replica. Alternatively, other filtering schemes may also be employed in accordance with the data needs of the web application on the hosting server. In one embodiment, the entire merchandising database may be generated as a replica on the hosting server.

Likewise, custom filtering schemes may be applied to generating and synchronizing between a server replica (see replica 114 in FIG. 1) and a client replica (see replica 126 in FIG. 1). Furthermore, a client can transmit an entire client replica to another storage location (e.g., the hosting server or some other remote storage location) for subsequent retrieval. This technique is particularly useful when employed with cell phones and personal digital assistants with limited storage capacity.

In addition, the synchronization between the merchandising database and replica (or between the client replica and the hosting server replica) synchronizes only changed data between the two databases. No intermediate copy or translation operation is required. Instead, the system synchronizes changed fields in both databases, resolving any conflicts in accordance with user input or other conflict resolution mechanisms.

In an embodiment of the present invention, the merchandising database also includes display characteristics parameters that configure the presentation of the order guide (i.e., an order web page) to the consumer. In one embodiment, an order guide may be referred to as a "purchase order guide". The display characteristic parameters are set by the business user in a setup and configuration module (not shown) provided by the embodiment of the business application. The display characteristic parameters are recorded in the merchandising database in the form of a BLOB ("Binary Large Object"). A BLOB is a database field that can hold large amounts of arbitrarily formatted data, including custom formatted display parameters, images, audio, video, long text blocks, or any digitized information. The display characteristics can specify any display characteristics of the order web pages, including data that would be defined in a web page style page. The BLOB is included in the server replica when the replica is generated. The web application reads the BLOB to configure the display characteristics of the order web pages, just as a style sheet might be read by a web application.

When the replica is synchronized with the merchandising database, changes to the BLOB caused by user access to the setup and configuration modules are updated in the replica's BLOB, thereby updating the display characteristics of the order web pages. In this manner, a business user can maintain and customize his or her web site without maintaining a prolonged connection to the web server and without dealing with the complexities of style sheets and web programming. This approach takes advantage of an embodiments support for intermittent connections between the business application and the server.

FIG. 4 illustrates components of a business application in an embodiment of the present invention. A business application 400 may include a primary business function module 402 for performing necessary business operations, such as those discussed with regard to the screen shots of FIGS. 5 through 12. The business function processor 402 can receive input from the business user via business user input 406 (e.g., keyboard, mouse, microphone, touch screen, etc.) and present output to the business user via business user output 408 (e.g., video display, speaker, etc.) in a manner similar to other business applications, such as database application, word processors, etc. In addition, the business function module 402 can also communicate with external product sources 410, such as vendors represented by a brokerage. Information received from the external product sources 410, such as inventory updates, new products and pricing, may be analyzed and recorded in the merchandising database 412, which the business function module 402 accesses via the database interface 404. In an embodiment of the present invention, the database interface is provided by Microsoft Access, which provides function calls through which an application can access a database.

When configuring an e-commerce system of the present invention, a user can generate a partial replica for export to a web server. In the illustrated embodiment, the replica generator 414 filters merchandising data stored in the merchandising database 412 for exportation in a partial replica. In one embodiment of the present invention, the replica generator 414 employs predefined filtering rules to minimize the data communicated to and stored at the Web hosting server. Although not required in the present invention, the partial replica is likely to include only a partial subset of the merchandising data from the merchandising database 412 to minimize bandwidth requirements, upload times, and storage requirements on the host server. In an embodiment of the present invention, a set of tables and fields from the merchandising database 412 are configured in a filter, which accesses the merchandising database through the database interface 404 and outputs the resulting partial replica through the web host interface 418 for storage on the Web hosting system 420. After the partial replica is exported to the Web hosting server 420, the communication link between Web hosting server 420 and the business application 400 may be terminated (i.e., hence, an intermittent connection).

To maintain consistency between the partial replica in the Web hosting server 420 and the merchandising database 412, the partial replica and the merchandising database 412 may be synchronized. Responsive to a synchronization event (e.g., triggered by a synchronization schedule, a user command, or a modification to the merchandising database), a synchronization module 416 performs a bidirectional synchronization of data in the partial replica (see replica 210, for example) and the merchandising database. In this synchronization process, for example, modified fields in the replica are written to corresponding fields in the merchandising database and vice versa.

During synchronization, corresponding fields in the replica and the merchandising database, for example, may have been changed since the last synchronization event, resulting in "conflicts" in the current synchronization. As such, an embodiment of the present invention may include functionality for resolving such conflicts. One embodiment, for example, displays the data from the modified fields to the user, who may select the data that he or she wishes to be applied in the next synchronization. In order to maintain the most current synchronization between the merchandising database and the replica, a user may immediately resynchronize after resolving the conflicts. In the resynchronization event, the conflicting fields are resolved according to the user's selection. Alternatively, some resolutions may be accomplished through the use of heuristic processes, predetermined conflict resolution rules, or other conflict resolution mechanisms.

In an embodiment of the present invention, merchandising data exported in the partial replica is not limited to product information. Merchandising information may also include customer information, contract information, prices, web page style information, customer preferences, promotional material, etc. When such data is modified (e.g., through the business function module 402), synchronization will then update the corresponding material in the partial replica, assuming the fields are included in the filtering configuration of the replica generator 414.

As discussed, the partial replica is exported to the Web hosting server to allow a customer to access the merchandising data in the partial replica. In one embodiment, such access is facilitated through a web page that is populated with a given subset of the merchandising data from the partial replica and transmitted to the customer's client system 426. Thereafter, the customer may send order data for one or more given products through the order interface 424. The order data is then processed by the order processing module 422, which updates the merchandising database 412 with the order parameters. Alternatively, the order processing module 422 can communicate directly with or be integrated with the business function module 402, which can also access and modify the merchandising data in the merchandising database 412. For example, instead of sending the order data directly to the business application 400, the client system can send order data via the partial replica at the Web hosting server. Accordingly, when the partial replica and the merchandising database are synchronized, the order data will be recorded in the merchandising database, where the business function module 402 can process the order data and communicate the order to the appropriate vendor. The business function module 402 can also transmit the order parameters to the appropriate product source (e.g., vendor) for fulfillment of the order.

FIG. 5 depicts a business application screenshot of a "Parent" window in an embodiment of the present invention. The illustrated business application is implemented using Microsoft® Access, although other database application environments and programming languages may be employed within the scope of the present invention. The illustrated screenshots in FIGS. 5 through 12 represent exemplary displays of a business application in an embodiment of the present invention.

Across the top of the main window extend a standard Microsoft® Access application menu bar 500 and toolbar 502. A set of tabs extends across the top of a child window. In the illustrated embodiment, the "Parent" tab 506 is selected; therefore, the elements of a "Parent" window are displayed. Other tabs supported in the illustrated embodiment include "Customer", "Vendor", "Contact", "Product", "Order", "EDI", and "Representative", although other types of tabs may also be supported within the scope of the present invention. The windows associated with other tabs are described with regard to other Figures.

The "Parent" window provides access to merchandising data relating to a given parent company (i.e., "parent company data"). A Parent company may be associated with merchandising data shared by multiple customers, vendors, representatives, contacts, and products. Exemplary fields may include without limitation a company name field 508, electronic communications fields 510, account representative and referral information fields 512, and a notes field 514. Fields 516 represent a billing address at the indicated parent company. Fields 518 represent a shipping address at the indicated parent company. Fields 520 represent contact information at the indicated parent company. The data in these fields are stored in the merchandising database and are available for reading and writing through the "Parent" window of the business application.

FIG. 6 depicts a business application screenshot of a "Customer" window in an embodiment of the present invention. In the illustrated embodiment, the "Customer" tab 600 is selected; therefore, the elements of a "Customer" window are displayed. The "Customer" window provides access to merchandising data relating to a given customer (i.e., "customer data"). In the illustrated embodiment, a "customer" represents a retailer that purchases wholesale products from vendors or manufactures. Exemplary fields may include without limitation a customer name field 604, the customer's parent company name field 606, electronic communications fields 608, a notes field 612, and fields 610 indicating the account status, the account representative, referral information and a customer type. Exemplary customer types may include without limitation Airline Catering, Basket Business, Bed N'Breakfast, Café, Candy And Gifts, Candy Manufacturer, Candy Store, and Card Store. Many other retailers, wholesalers, manufacturers, and service providers may be included as customer types. Field 613 indicates a Tax ID number. Field 614 indicates a password that can be used to login to a given account via the web application on the hosting server. Alternatively or additionally, the password can be used to securing transmissions, such as replications, synchronizations, orders, or web site accesses. Fields 616 represent a billing address at the indicated customer company. Fields 618 represent a shipping address at the indicated customer company. Control 619 allows a user to create a parent company associated with the current customer. Fields 620 represent contact information at the indicated customer company. The "Links" tab 622 can display URL-inks for the selected customer. The data in these fields are stored in the merchandising database and are available for reading and writing through the "Customer" window of the business application.

FIG. 7 depicts a business application screenshot of a "Vendor" window in an embodiment of the present invention. In the illustrated embodiment, the "Vendor" tab 700 is selected; therefore, the elements of a "Vendor" window are displayed. The "Vendor" window provides access to merchandising data relating to a given vendor (e.g., a company that manufactures or imports a given product or product line). Such data is referred to as "vendor data". Exemplary fields may include without limitation a vendor name field 704, electronic communications fields 706, a notes field 708 and a vendor description field 710. Fields 712 represent a billing address at the indicated vendor company. Fields 714 represent a shipping address at the indicated vendor company. Fields 720 represent contact information at the indicated vendor company. The logo field 722 indicates the logo of the vendor that is to be displayed on the host-server-resident web page relating to the vendor's products and on orders (e.g., order emails, order forms, order faxes, etc.). By right-clicking on the logo field 722, a user can enter a pathname or URL to a graphic file that can be used by the web application when presenting product data to a customer on an order Web page, for example. The data in these fields are stored in the merchandising database and are available for reading and writing through the "Vendor" window of the business application.

The line card check box 724 enables the inclusion of a given vendor's products on the e-commerce web site. If the line card check box 724 is not checked, the vendor and its products may be omitted from the replica, either through a replication or synchronization event. Alternatively, a flag may be set in the replica that signals the web application to ignore information for the given vendor when generating web site information. The inventory check box 726 controls whether inventory fields should be displayed on web-based product forms (See FIGS. 13-16) and line card reports, and whether the user should be prompted if an order exceeds available inventory for a given product. The back order check box 728 indicates whether the vendor fills back orders. If so, a business user may be prompted if an invoice, received from a vendor, varies by a predetermined price percentage from the current balance. The business user will be prompted to append the remaining balance (i.e., the current balance minus the invoice amount) to a back order or to amend the order to alleviate the unfilled portion of the order.

FIG. 8 depicts a business application screenshot of a "Contact" window in an embodiment of the present invention. In the illustrated embodiment, the "Contact" tab 800 is selected; therefore, the elements of a "Contact" window are displayed. The "Contact" window provides access to merchandising data relating to of individual contacts at companies (i.e., "contact data"), such as parent companies, customers, vendors and other individuals. Contact information regarding agency representatives may also be accessed through the "Contacts" window. Exemplary fields may include without limitation a contact name field 802 and fields 804 indicating the associations that the contact has with vendors, customers, etc. The "Contacts" window also includes electronic communications fields 806, a notes field 808 and a URLink 810 for indicating a web site address, such as a Uniform Resource Locator (URL). Additional contact information (e.g., email address and mailing address) is indicated in fields 812. Button 814 allows a user to generate a letter, a template of which is indicated in field 816) to the indicated contact. The Communications fields 818 provide an interface for logging or recording times, dates, notes and other information about individual communications with the indicated contact. Types of communications (see field 820) may include, without limitation, "Conference", "Document", "E-mail", "Excel", "Fax", "Letter", "Meeting", "Note", "Phone Call", "Power Point", "Task", and "Word". The data in these fields are stored in the merchandising database and are available for reading and writing through the "Contact" window of the business application.

FIG. 9 depicts a business application screenshot of a "Product" window in an embodiment of the present invention. In the illustrated embodiment, the "Product" tab 900 is selected; therefore, the elements of a "Product" window are displayed. The "Product" window provides access to merchandising data relating to a given product (i.e., product data). In the illustrated embodiment, a "product" represents an item or service offered for sale by a vendor. Exemplary fields may include without limitation a Vendor name field 902 (i.e., the vendor that provides the indicated products), a report field 904 for selecting from a set of predetermined (viewable and printable) reports, and a sort parameter field 906, which indicates the column of product entries by which the product list should be sorted.

The "Promotions" control group 908 provides access and controls to promotional information (e.g., sale items and terms). If more than two promotions are available for a given product, the "Promotions" control group 908 supports a scrollbar to allow access to all promotions. In the illustrated embodiment of the present invention, the promotions are allocated in accordance with a price list, such as Distributor or Wholesale. Accordingly, the "Price List" field 912 indicates the price list corresponding to a given promotion. The "Begin" and "End" fields 914 indicate the term or duration of the promotion. The "Price" field indicates the price for the selected product and the associated price list. In a field not displayed in the illustrated screenshot, the commission associated with a given promotion is also indicated. A "delete" button 910 allows a user to delete an expired or incorrect promotion. The "Filter Products?" check box 916 allows a user to filter the vendor's products to display only those products with a promotion associated with them. In table 918, the vendor's products and other details are displayed. In an embodiment of the present invention, the data in the fields described relative to FIG. 9 is stored in the merchandising database and are available for reading and writing through the "Product" window of the business application.

FIG. 10 depicts a business application screenshot of an "Order" window in an embodiment of the present invention. In the illustrated embodiment, the "Order" tab 1000 is selected; therefore, the elements of an "Order" window are displayed. Customized toolbar selections are associated with the "Order" window. "Export" button 1050 provides access to an order spreadsheet that can be exported to a file. "Duplicate Order" button 1052 allows a user to create a new order having information that is the same as the current order. "Fill Backorder" creates a back order (i.e., a new order in the database) and allows the business user to edit the back order in accordance with new shipping information, pricing information, etc. "Reduce Inventory" button 1054 allows a user to alter inventory information provided by the vendor, in accordance with the current order.

The "Order" window provides access to merchandising data relating to a given order for one or more products (i.e., "order data"). In the illustrated embodiment, an "order" represents a request for product(s) from a customer to a vendor. In an embodiment of the present example, the order information may be received from the customer via an automatically processed order form received in email. Alternatively, the order information can be entered manually by the business user in response to a phone call, fax, email, or other communication. Exemplary fields may include without limitation a Vendor name field 1002 (i.e., the vendor by which the ordered products will be provided) and a department field 1004 that identifies a given department at the customer (e.g., produce, bakery, floral, etc.). A billing address and other contact information are provided in fields 1006. A shipping address and other contact information are provided in fields 1008.

The order type field 1010 indicates order characteristics, such as Normal, Opening Order, Over 90 days, Preorder File, Replacement, Samples, Show Order, Special Order, Thanksgiving, Trade Show, Valentines, and Weekly. The status field 1012 indicates the status of the order, including Archive, Backorder, Bid, Canceled, Credit Hold, Disputed, Incomplete, Invoiced, Outstanding, Paid, Pending, Rejected, Rep Paid, Sample, and Shipped. The invoice number may be indicated in field 1014. The date that the invoice was sent by the vendor to the customer may be indicated in field 1016. The invoice amount may be indicated in field 1018. The corresponding Vendor purchase order number may be indicated in VendorPO field 1020. The terms field 1022 indicates the terms of payment between the customer and the vendor for the indicated order.

Fields 1024 indicates the customer identification number, the associated sales representative, the date that the order was placed by the customer, and a desired shipping date (or the begin ship date). The fields 1024 also include a date by which the order can be cancelled by the customer without penalty, a customer purchase order number, and shipping information (i.e., "Ship Via" and "FOB"). Field 1026 indicates a discount to be applied to the order. The "Order" window also includes a "Notes" field 1028 indicating instructions entered by the customer when placing the order. The UPC indicator 1030 allows products look-up based on UPC codes that are scanned in with a UPC scanner. The pricing field 1032 indicates the type of pricing employed for the present order, including options such as "Wholesale", "Distributor", "Volume1", "Volume2", and "Contract". The anticipated weight of the order is identified in field 1034 for shipping cost purposes. The quantity of items in the order is indicated in field 1036. The total amount of the order (minus shipping) is indicated in Amount field 1038.

Table 1040 identifies the individual products ordered, including item numbers, descriptions, sizes, quantities, prices, discounts, pricing types for individual products, and the status of the orders for individual products, etc. "Unit" indicates how the product is billed (e.g., by the case or each). "BillQty" indicates an adjustment factor for items ordered in one unit but billed in another (e.g., 1 wheel of cheese=20 lbs×$4.50/lbs). "Extended" indicates a subtotal for a line item (e.g., Extended equals Qty–Price–Discount×BillQty). Field 1042 may indicate the URL to the indicated vendor's web site. Fields 1044 may indicate a log of transmissions relating to the order (e.g., to the vendor, to the customer, etc.). Fields 1046 indicate calculations and totals for the indicated order. The data in these fields are stored in the merchandising database and are available for reading and writing through the "Order" window of the business application.

FIG. 11 depicts a business application screenshot of an "EDI" window in an embodiment of the present invention. In the illustrated embodiment, the "EDI" tab 1100 is selected; therefore, the elements of an "EDI" window are displayed. The "EDI" window allows a user to perform EDI functions, such as importing data to or exporting data from the merchandising database, generating replicas, and synchronizing the merchandising database with a replica. For example, if a vendor provides catalog information in electronic form, a user can provide an import profile or format that maps the catalog information into appropriate fields of the merchandising database. As such, the business application can support nearly automatic updating of vendor information. Imports, however, are not limited to catalog data, but can also import any other information that can be mapped to fields in the merchandising database, such as contact information from electronic business cards, order information, etc. Exporting, in contrast, can be used to provide merchandising data to another system by mapping merchandising data fields to fields of the other system using an export profile or format. This feature, for example, may be used to transmit orders to a vendor that supports an EDI communication. Exemplary fields may include without limitation an Import field 1100 and an Export field 1102, which identify functions or formats used in the corresponding import, export, replication, or synchronization function. As a function is selected, additional fields are display as appropriate for the selected function. The data in these fields are stored in the merchandising database and are available for reading and writing through the "EDI" window of the business application. For example, the profiles identified in previous imports/exports are stored in the merchandising database and may be selected using the drop down box associated with the fields.

In addition, the EDI window provides access to other EDI functions, such as synchronization and replication. After specification of a replica indicator (e.g., a pathname or URL to a given replica) and a merchandising database indicator (e.g., a pathname or URL to a given merchandising database), the synchronization module 416 of FIG. 4 can be directed to perform a uni-directional or bi-directional synchronization between the replica and the merchandising database, in accordance with the tables and fields shared between the two databases. Alternatively, after specification of a given merchandising database and a destination replica, the replica generator 414 of FIG. 4 can generate a replica in accordance with predetermined filtering rules. In this manner, a partial replica can be generated and recorded on a Web hosting server. Thereafter, a web application executing on the Web hosting server can present merchandising data from the partial replica to a customer accessing Web hosting server.

FIG. 12 depicts a business application screenshot of a "Representative" window in an embodiment of the present invention. In the illustrated embodiment, the "Representative" tab 1200 is selected; therefore, the elements of a "Representative" window are displayed. The "Representative" window provides access to merchandising data relating to a given reprehensive and the companies the representative represents (i.e., "representative data"). Exemplary fields may include without limitation a representative name field 1202, a position title field 1204 for the representative, a multimedia field 1206 for displaying a logo, a photograph, an animation, a video, etc., and a notes field 1208. A table 1210 indicates under the "CustomerList" tab, the companies represented by the representative. The data in these fields are stored in the merchandising database and are available for reading and writing through the "Vendor" window of the business application.

As FIGS. 5 through 12 illustrate displays of an exemplary business application, FIGS. 13 through 15 illustrate Web page displays a customer may view when accessing the partial replica through a web page displayed through a browser. As discussed, a browser or other client-based application can be used to access the partial replica stored at the host computer system. A customer can read access merchandising data from the partial replica and, optionally, modify the merchandising data in the partial replica, providing the customer has the necessary authorization to do so. In this manner, a customer can place orders or make changes to orders, company and contact information, etc., which can be bi-directionally synchronized with the merchandising database at the agency, where the changes can also be reviewed by the agency personnel before the changes are recorded. Alternatively, modification of such data or placement of orders may be effected through a second communications link, such as an email communication with the agency.

FIG. 13 depicts a screenshot of an "Order" web page in an embodiment of the present invention. In the illustration, a user has accessed a partial replica on a Web hosting server. A web application generated in association with the business application at the agency is activated to send appropriate web pages to connected customers. For example, assume the customer is a purchasing manager for a specialty cheese shop, who placing orders for products from European Imports, Ltd. through the Bill Fitzgerald Brokerage. Although the illustrated web page screenshots are depicted within a Microsoft Internet Explorer window, other browser applications may be used to access the partial replica within the scope of the present invention.

Some elements of the displayed web page 1300 are standard elements provided by the web application, while other elements are specific to the individual agency. The agency's specifications and custom display elements can be exported in the partial replica for use by the web application. The name, font, and size of the agency's title 1302 can be specified by the agency in the illustrated embodiment. Furthermore, the logo may be exported to the partial replica. If either of these display elements, or other display elements, are modified by the agency, a synchronization between the merchandising database and the partial replica will update the generated web pages.

Fields 1304 includes a customer name field, a requested ship date field, and a selected vendor field. The customer name is determined based on a login process for entering the web site. Notice that the login process also invokes a secure communication connection between the client computer and the host server, as evidenced by the padlock icon 1305. After login, the customer specifies a desired ship date and selects the vendor from whom he or she wishes to order products. As a result of this operation, a web page resembling the screenshot of FIG. 13 is displayed (i.e., displaying frames 1306 and 1308). When first entering the web page (i.e., the initial display of the web page), the frame 1308 displays only the boxed controls 1310. The "Key word, item#, or UPC" field can be used in combination with the "Search" button to search for matching. After the first search operation, a list similar to the list 1312 is shown in the frame 1308. By selecting a specific category, the search results can be filtered. In one embodiment, leaving the "Key word, item#, or UPC" field blank and selecting the "ALL" category results in a display (in a scroll window) of all possible products sold by the selected vendor through the given brokerage. By selecting the "Item#" button corresponding to a particular product, the product is added to the product table 1314, as discussed with regard to FIG. 14.

FIG. 14 depicts screenshot of an "Order" web page populated with selected products in an embodiment of the present invention. The product table 1400 now shows three items selected for ordering from European Imports Ltd. The Totals fields 1402 show the results calculated in response to an "Add/Recalculate" operation invoked by pressing button 1404. In addition, in one embodiment of the present invention, the "Header/Submit" button 1406 and the "Clear Form" button are displayed after the first item is entered into the product table 1400. Depressing the "Header/Submit" button 1406 submits the product table 1400 as an order. Depressing the button 1408 clears the contents from the product table 1400. Within the product table 1400, quantities of products ordered can be modified by changing number in the Qty field. In addition, product-specific notes can be entered into the Note field.

One enhancement to the "Order" web page involves the method of recalculating the data in the "Totals" fields 1402. In one embodiment, all data fields are re-looked up in the replica and re-processed when the consumer depresses the "Add/Recalculate". This operation can be quite time consuming when many line items are included in an order. As such, in an enhanced embodiment, a flag is maintained for each line item element. As such, if a consumer changes a quantity in one line item, the "changed" flag for the quantity data in that line item is set. If other line item elements are modified, corresponding flags are also set. When the consumer depresses the "Add/Recalculate" button, line items having changed elements are looked up again in the database (e.g., if the Item# has been modified), the Extended (Price) for the changed line items is recalculated (e.g., if the Qty or Price is modified), and/or the data in the Totals fields are recalculated (e.g., (e.g., if any Qty or Price in the order is modified). In this manner, only changed line items are re-looked up, significantly improving the web server response time.

FIG. 15 depicts a screenshot of an "Order Review" web page in an embodiment of the present invention. Fields 1500 indicate the shipping address, which may be retrieved from the customer information in the partial replica. The product review table 1502 displays the products selected for ordering. The order may be submitted by depressing the Submit button 1504. The "Order Review" web page is printer friendly, so that the order can be printed by the consumer using the browser's printing functions. In an alternative embodiment, a customer may also associate a customer PO number with the order.

FIG. 16 depicts a general purpose computer capable of executing a program product embodiment of the present invention. One operating environment in which the present invention is potentially useful encompasses the general purpose computer. In such a system, data and program files may be input to the computer, which reads the files and executes the programs therein. Some of the elements of a general purpose computer are shown in FIG. 16 wherein a processor 1601 is shown having an input/output (I/O) section 1602, a Central Processing Unit (CPU) 1603, and a memory section 1604. The present invention is optionally implemented in software devices loaded in memory 1604 and/or stored on a configured CD-ROM 1608 or storage unit 1609 thereby transforming the computer system in FIG. 16 to a special purpose machine for implementing the present invention.

The I/O section 1602 is connected to keyboard 1605, display unit 1606, disk storage unit 1609, and disk drive unit 1607. Generally, in contemporary systems, the disk drive unit 1607 is a CD-ROM driver unit capable of reading the CD-ROM medium 1608, which typically contains programs 1610 and data. Computer program products containing mechanisms to effectuate the systems and methods in accordance with the present invention may reside in the memory section 1604, on a disk storage unit 1609, or on the CD-ROM medium 1608 of such a system. Alternatively, disk drive unit 1607 may be replaced or supplemented by a floppy drive unit, a tape drive unit, or other storage medium drive unit. The network adapter 1611 is capable of connecting the computer system to a network via the network link 1612. Examples of such systems include without limitation SPARC systems offered by Sun Microsystems, Inc., personal computers offered by IBM Corporation and by other manufacturers of IBM-compatible personal computers, and other systems running a UNIX-based or other operating system. In accordance with the present invention, software instructions directed toward accepting and relaying purchase orders using an intermittent connection to a merchandising database, a partial replica, or a client replica may be executed by CPU 1603, and merchandising data may be stored on disk storage unit 1609, disk drive unit 1607 or other storage medium units coupled to the system.

FIG. 17 depicts a screenshot of order processing by a business application in an embodiment of the present invention. The dialog box 1700 includes an Inbox button 1702, which a business user can select to scan the business user's inbox for orders that have been received via email. In one embodiment, the order processing module of the business application scans the contents of the inbox searching for email header information indicating that a particular email document contains an order.

FIG. 18 depicts a screenshot of a dialog box indicating that an email order has been located in the inbox of the business user in an embodiment of the present invention. The dialog box 1800 asks the business user if the located email order is to be processed by the order processing module. If the business user responds by depressing the "YES" button, the located email order is automatically processed. If the business user responds by depressing the "NO" button, the order processing module continues searching the inbox for additional email orders.

In some embodiments, automatic processing can result the merchandising database being updated with appropriate order information. The business user can then manually contact the appropriate vendor through traditional channels (e.g., phone, fax, email, dial-up). In alternative embodiments, the new order information can also be communicated directly and automatically to the appropriate vendor, through an additional email ordering process to the vendor, through a fax to the vendor, through EDI with the vendor, and through other automatic means.

FIG. 19 depicts a message box indicating a date variance in an embodiment of the present invention. During order processing, predetermined variances are processed by the order processing module or some other module in the business application. Potential variances are compared against variance rules to determine whether a given element of order data is within a given tolerance. For example, the variance processing that results in message box 1900 compares the order ship date to the current date and determines that the order ship date has passed. Accordingly, the business user has the option of accepting the order, even though the ship date has lapsed, or canceling the order. If the order is accepted, the order processing proceeds normally. However, if the order is canceled, a notice may be sent to the consumer describing the variance and the resulting cancellation.

FIG. 20 depicts operations for processing orders using a merchandising database in an embodiment of the present invention. Operation 2000 generates a replica from the merchandising database. In one embodiment of the present invention, the replica contains merchandising data that is filtered from the merchandising database. For example, one type of replica may omit order data (e.g., order headers and order details). Operation 2002 establishes a communications link between the Web hosting server and the business application. Operation 2004 transmits the replica to the Web hosting server, and then operation 2006 terminates the communications link.

Operation 2008 receives an order from a consumer via an independent communications link (i.e., not the identical communications link in which the replica was transmitted to the Web hosting server). Operation 2010 modified the merchandising database in accordance with the order. For example, a new order header and new order details are added to the merchandising database.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of embodiment of the invention. Since many embodiments of the invention can be made without departing from the spirit and scope of the invention, the invention resides in the claims hereinafter appended.

I claim:

1. A merchandising system for processing a customer order in association with a web hosting computer, a client computer, and a business application computer, the web hosting computer and the business application computer being intermittently connected by a communications link, the merchandising system comprising:
a merchandising database containing merchandising data including order data pertaining to customer orders for merchandise, the merchandising system managing merchandising data received from a plurality of vendors;
a web host interface establishing the communications link between the business application computer and the web hosting computer;
a replica generator executing on the business application computer to filter out at least the order data from the merchandising database to create a replica of the merchandising database containing the merchandising data without the order data for transmission to the web hosting computer across the intermittently connected communications link;
a web application executing on the web hosting computer and generating an order guide that displays the merchandising data from the replica on the client computer; and
a synchronization module synchronizing the replica with the merchandising database to cause only modifications made to the merchandising database to be updated in the replica.

2. The merchandising system of claim 1 further comprising:
an order processing module that processes an email order received from the web application, based on an order placed by a customer through the order guide.

3. The merchandising system of claim 1 further comprising:
a business function module executing on the business application computer to manage the merchandising database.

4. The merchandising system of claim 3 wherein the business function module provides access to product data stored in the merchandising database.

5. The merchandising system of claim 3 wherein the business function module provides access to vendor data stored in the merchandising database.

6. The merchandising system of claim 3 wherein the business function module provides access to customer data stored in the merchandising database.

7. The merchandising system of claim 3 wherein the business function module provides access to the order data stored in the merchandising database.

8. The merchandising system of claim 1 further comprising:
a client replica generator executing on the web hosting computer to create a client replica for transmission to the client computer across an intermittent connection between the client computer and the web hosting computer.

9. The merchandising system of claim 8 wherein the client replica remains stored at the client computer after the intermittent connection between the client computer and the web hosting computer is terminated to provide a customer with access to merchandising data stored in the client replica.

10. A merchandising system for processing a customer order in association with a web hosting computer, a client computer, and a business application computer, the web hosting computer and the business application computer being intermittently connected by a communications link, the merchandising system comprising:
a merchandising database containing merchandising data including order data pertaining to customer orders for merchandise and display characteristic parameters, the merchandising system managing merchandising data received from a plurality of vendors;
a replica generator executing on the business application computer to filter out at least the order data from the merchandising database to create a replica of the merchandising database containing the merchandising data without the order data for transmission to the web hosting computer across the intermittently connected communications link between the business application computer and the web hosting computer, the replica including the display characteristic parameters;
a web application receiving the replica at the web hosting computer from across the intermittently connected communications link and generating an order guide for displaying the merchandising data from the replica on the client computer, the order guide having display characteristics configured in accordance with the display characteristic parameters recorded in the replica; and
a synchronization module synchronizing the replica with the merchandising database to cause only modifications made to the merchandising database to be updated in the replica.

11. The merchandising system of claim 10 further comprising:
a replica generator executing on the web hosting computer to create a client replica for transmission to the client computer across an intermittent connection between the client computer and the web hosting computer.

12. The merchandising system of claim 11 wherein the client replica remains stored at the client computer after the intermittent connection between the client computer and the web hosting computer is terminated to provide a customer with access to the merchandising data stored in the client replica.

13. A computer program product encoding a computer program for executing on a business application computer system a computer process for processing orders for a plurality of vendors using a merchandising database storing merchandising data including order data, the orders being generated responsive to at least one selection entered at a client computer coupled to a web hosting computer, the computer process comprising:

generating a replica containing a subset of the merchandising data from the merchandising database by filtering out the order data pertaining to customer orders for merchandise;

establishing a communications link between the business application computer system and the web hosting computer;

transmitting the replica of the merchandising database to the web hosting computer for display in a web page on a client computer;

disconnecting the communications link between the business application computer system and the web hosting computer, responsive to the operation of transmitting the replica;

receiving an order from a customer based on the replica originating at the client computer, the order being received after the disconnecting operation via an independent communications link;

modifying the merchandising database in accordance with the order;

reconnecting the business application computer system to the web hosting computer;

synchronizing the replica with the merchandising database to cause only modifications associated with the modifying operation on the merchandising database to be updated in the replica, when the business application computer system is disconnected from the web hosting computer; and disconnecting the business application computer system from the web hosting computer.

14. The computer program product of claim 13 wherein the computer process further comprises:

detecting a conflict between the replica and the merchandising database;

presenting the conflict to a user; and resolving the conflict based on user input.

15. The computer program product of claim 13 wherein the generating operation comprises:

adding one or more display characteristic parameters to the replica, the display characteristic parameters specifying display characteristics of an order guide.

16. The computer program product of claim 15 wherein the generating operation further comprises:

using the display characteristic parameters from the replica to dynamically generate the order guide.

17. The computer program product of claim 13 wherein the computer process further comprises:

detecting a variance in the order based on an expected value;

presenting the variance to a user for resolution; and resolving the variance based on user input.

18. A method of processing orders for a plurality of vendors using a merchandising database storing merchandising data including order data, the orders being generated responsive to at least one selection entered at a client computer coupled to a web hosting computer, the method comprising:

generating a replica at a business application computer containing a subset of the merchandising data from the merchandising database by filtering out the order data pertaining to customer orders for merchandise;

establishing a communications link between the business application computer and the web hosting computer;

transmitting the replica of the merchandising database to the web hosting computer for display in a web page on a client computer;

disconnecting the communications link between the business application computer and the web hosting computer, responsive to the operation of transmitting the replica;

receiving an order based on the replica from a customer originating at the client computer, the order being received after the disconnecting operation via an independent communications link;

modifying the merchandising database in accordance with the order;

reconnecting the business application computer system to the web hosting computer;

synchronizing the replica with the merchandising database to cause only modifications associated with the modifying operation on the merchandising database to be updated in the replica, when the business application computer is disconnected from the web hosting computer; and disconnecting the business application computer system from the web hosting computer.

19. The method of claim 18 wherein the generating operation comprises:

adding one or more display characteristic parameters to the replica, the display characteristic parameters specifying display characteristics of an order guide.

20. The method of claim 19 further comprising:

using the display characteristic parameters from the replica to dynamically generate the order guide.

21. The method of claim 18 further comprising:

manipulating data in the merchandising database via the business application computer.

22. A merchandising system for managing merchandising data received from a plurality of vendors in association with a web hosting computer and a business application computer, the web hosting computer and the business application computer being communicatively coupled by an intermittently connected by a communications link, the merchandising system comprising:

a merchandising database containing merchandising data including order data pertaining to customer orders for merchandise and being managed by the business application computer;

a replica generator executing on the business application computer to filter out at least the order data from the merchandising database to create a replica of the merchandising database containing the merchandising data without the order data for transmission to the web hosting computer across the intermittently connected communications link for display on a web page of a client computer; and a synchronization module synchronizing the replica with the merchandising database to cause only modifications made to the merchandising database to be updated in the replica.

23. A method of managing merchandising data received from a plurality of vendors in association with a web hosting computer and a business application computer, the web hosting computer and the business application computer being communicatively coupled by an intermittently connected communications link, the method comprising:

- maintaining a merchandising database containing the merchandising data and being managed by the business application computer, the merchandising data in the merchandising database including order data pertaining to customer orders for the merchandise;
- filtering out at least the order data from the merchandising database to create a replica of the merchandising database containing the merchandising data without the order data;
- transmitting the replica to the web hosting computer across the intermittently connected communications link; and
- synchronizing the replica with the merchandising database to cause only modifications made to the merchandising database to be updated in the replica.

24. A computer program product encoding a computer program for executing a computer process for managing merchandising data received from a plurality of vendors in association with a web hosting computer and a business application computer, the web hosting computer and the business application computer being communicatively coupled by an intermittently connected communications link, the computer process comprising:

- maintaining a merchandising database containing the merchandising data and being managed by the business application computer, the merchandising data in the merchandising database including order data pertaining to customer orders for merchandise;
- filtering out at least the order data from the merchandising database to create a replica of the merchandising database containing the merchandising data without the order data;
- transmitting the replica to the web hosting computer across the intermittently connected communications link for display in a web page on a client computer;
- synchronizing the replica with the merchandising database to cause only modifications made to the merchandising database to be updated in the replica.

25. A merchandising system for managing merchandising data received from a plurality of vendors in association with a web hosting computer, a client computer, and a business application computer, the web hosting computer and the business application computer being communicatively coupled by an intermittently connected communications link, the merchandising system comprising:

- a merchandising database containing the merchandising data including order data pertaining to customer orders for merchandise and display characteristic parameters and being managed by the business application computer;
- a replica generator executing on the business application computer to generate a replica, said replica comprising a subset of the merchandising data from the merchandising database by filtering out at least the order data, for transmission to the web hosting computer from across the intermittently connected communications link to allow generation of an order guide for displaying the merchandising data from the replica in a web page on the client computer, the order guide having display characteristics configured in accordance with the display characteristic parameters recorded in the replica; and
- a synchronization module synchronizing the replica with the merchandising database to cause only modifications made to the merchandising database to be updated in the replica.

26. A method of managing merchandising data received from a plurality of vendors in association with a web hosting computer, a client computer, and a business application computer, the web hosting computer and the business application computer being communicatively coupled by an intermittently connected communications link, the method comprising:

- maintaining a merchandising database containing merchandising data that is managed by the business application computer, the merchandising data in the merchandising database including order data pertaining to customer orders for merchandise and display characteristic parameters;
- accessing the merchandising database and generating a replica of subset of the merchandising data from the merchandising database by filtering out at least the order data, the replica including the display characteristic parameters;
- transmitting the replica to the web hosting computer from across the intermittently connected communications link to allow generation of an order guide for displaying the merchandising data from the replica in a web page on the client computer, the order guide having display characteristics configured in accordance with the display characteristic parameters recorded in the replica; and
- synchronizing the replica with the merchandising database to cause only modifications made to the merchandising database to be updated in the replica.

27. A computer program product encoding a computer program for executing a computer process for managing merchandising data received from a plurality of vendors in association with a web hosting computer, a client computer, and a business application computer, the web hosting computer and the business application computer being communicatively coupled by an intermittently connected communications link, the computer process comprising:

- maintaining a merchandising database containing the merchandising data and being managed by the business application computer, the merchandising data in the merchandising database including order data pertaining to customer orders for merchandise and display characteristic parameters;
- accessing the merchandising database and generating a replica of a subset of the merchandising data from the merchandising database by filtering out at least the order data, the replica including the display characteristic parameters;
- transmitting the replica to the web hosting computer from across the intermittently connected communications link to allow generation of an order guide for displaying the merchandising data from the replica in a web page on the client computer, the order guide having display characteristics configured in accordance with the display characteristic parameters recorded in the replica; and
- synchronizing the replica with the merchandising database to cause only modifications made to the merchandising database to be updated in the replica.

28. A merchandising system for processing a customer order in association with a web hosting computer, a client computer, and a business application computer, the web hosting computer and the business application computer being communicatively coupled by an intermittently connected communications link, the merchandising system comprising:

- a merchandising database containing the merchandising data including order data pertaining to customer orders for the merchandise, the merchandising system managing merchandising data received from a plurality of vendors;
- a web host interface establishing the communications link with the web hosting computer;
- a replica generator executing on the business application computer to filter out at least the order data from the merchandising database to create a replica containing the merchandising data without the order data for transmission to the web hosting computer across the intermittently connected communications link;
- a web application executing on the web hosting computer and generating an order guide that displays at least a portion of the merchandising data from the replica on the client computer; and
- a synchronization module synchronizing the merchandising database and the replica.

29. A computer program product encoding a computer program for executing on a business application computer system a computer process for processing orders for a plurality of vendors using a merchandising database storing merchandising data including vendor data received from a plurality of vendors describing merchandise offered for sale by the vendors and order data pertaining to customer orders for the merchandise, the orders being generated responsive to at least one selection entered at a client computer coupled to a web hosting computer, the computer process comprising:

- generating a replica containing a subset of the merchandising data from the merchandising database by filtering out the order data pertaining to customer orders for merchandise;
- establishing a communications link between the business application computer system and the web hosting computer;
- transmitting the replica of the merchandising database to the web hosting computer for display in a web page on a client computer;
- disconnecting the communications link between the business application computer system and the web hosting computer, responsive to the operation of transmitting the replica;
- receiving an order from a customer based on the replica and originating at the client computer, the order being received after the disconnecting operation via an independent communications link;
- modifying the merchandising database in accordance with the order;
- reconnecting the business application computer system to the web hosting computer; and
- synchronizing the replica and the merchandising database.

30. A method of processing orders for a plurality of vendors using a merchandising database storing merchandising data including vendor data received from a plurality of vendors describing merchandise offered for sale by the vendors, the orders being generated responsive to at least one selection entered at a client computer coupled to a web hosting computer, the method comprising:

- generating a replica at a business application computer containing a subset of the merchandising data from the merchandising database by filtering out the order data pertaining to customer orders for merchandise;
- establishing a communications link between the business application computer and the web hosting computer;
- transmitting the replica of the merchandising database to the web hosting computer for display in a web page on the client computer;
- disconnecting the communications link between the business application computer and the web hosting computer, responsive to the operation of transmitting the replica;
- receiving an order based from a customer on a replica, and originating at the client computer, the order being received after the disconnecting operation via an independent communications link;
- modifying the merchandising database in accordance with the order; and
- synchronizing the merchandising database with the replica.

* * * * *